United States Patent
Helft et al.

(10) Patent No.: US 11,301,623 B2
(45) Date of Patent: Apr. 12, 2022

(54) DIGITAL PROCESSING SYSTEMS AND METHODS FOR HYBRID SCALING/SNAP ZOOM FUNCTION IN TABLE VIEWS OF COLLABORATIVE WORK SYSTEMS

(71) Applicant: MONDAY.COM LTD., Tel Aviv (IL)

(72) Inventors: Eran Helft, Tel Aviv-Jaffa (IL); Shani Frankel, Jerusalem (IL)

(73) Assignee: Monday.com Ltd, Tel Aviv (IL)

( * ) Notice: Subject to any disclaimer, the term of this patent is extended or adjusted under 35 U.S.C. 154(b) by 0 days.

(21) Appl. No.: 17/232,754

(22) Filed: Apr. 16, 2021

(65) Prior Publication Data
US 2021/0248311 A1 Aug. 12, 2021

Related U.S. Application Data

(63) Continuation of application No. PCT/IB2021/000090, filed on Feb. 11, 2021, and a
(Continued)

(51) Int. Cl.
*G06F 40/177* (2020.01)
*G06F 40/186* (2020.01)
(Continued)

(52) U.S. Cl.
CPC .......... *G06F 40/177* (2020.01); *G06F 16/211* (2019.01); *G06F 16/221* (2019.01);
(Continued)

(58) Field of Classification Search
None
See application file for complete search history.

(56) References Cited

U.S. PATENT DOCUMENTS 5,479,602 A 12/1995 Baecker et al.
5,517,663 A 5/1996 Kahn
(Continued)

FOREIGN PATENT DOCUMENTS

CN 107422666 A 12/2017
CN 107623596 A 1/2018
(Continued)

OTHER PUBLICATIONS

D'Elessio et al., Monday.com Walkthrough 2018\All Features, Platforms & Thoughts, Mar. 1, 2018, pp. 1-55, 2018.
(Continued)

*Primary Examiner* — Howard Cortes
(74) *Attorney, Agent, or Firm* — Finnegan, Henderson, Farabow, Garrett & Dunner LLP

(57) ABSTRACT

Systems, methods, and computer-readable media for scaling tables having differing column types in collaborative network systems in tablature are disclosed. The systems and methods may involve maintaining a zoomable table having a plurality of columns, at least some of which display differently depending on zoom level; storing for a first column, a first column template associated with a first zoom range, wherein the first column template is configured to display information in a first format configured to scale within the first zoom range; storing for the first column, a second column template associated with a second zoom range different from the first zoom range, wherein the second column template is configured to display information in a second format different from the first format.

20 Claims, 18 Drawing Sheets

Related U.S. Application Data continuation-in-part of application No. PCT/IB2021/000024, filed on Jan. 14, 2021, and a continuation-in-part of application No. PCT/IB2020/000974, filed on Nov. 17, 2020, and a continuation-in-part of application No. PCT/IB2020/000658, filed on Aug. 7, 2020.

(60) Provisional application No. 63/122,439, filed on Dec. 7, 2020, provisional application No. 63/121,803, filed on Dec. 4, 2020, provisional application No. 63/078,301, filed on Sep. 14, 2020, provisional application No. 63/019,396, filed on May 3, 2020, provisional application No. 63/018,593, filed on May 1, 2020, provisional application No. 62/975,716, filed on Feb. 12, 2020.

(51) Int. Cl.
*G06Q 10/10* (2012.01)
*G06F 16/21* (2019.01)
*G06F 16/22* (2019.01)

(52) U.S. Cl.
CPC ....... *G06F 40/186* (2020.01); *G06Q 10/1093* (2013.01); *G06Q 10/101* (2013.01); *G06Q 10/103* (2013.01)

(56) References Cited

U.S. PATENT DOCUMENTS

| | | | |
|---|---|---|---|
| 5,682,469 A | 10/1997 | Linnett | |
| 5,696,702 A | 12/1997 | Skinner et al. | |
| 5,726,701 A | 3/1998 | Needham | |
| 5,787,411 A | 7/1998 | Groff et al. | |
| 5,880,742 A | 3/1999 | Rao et al. | |
| 5,933,145 A | 8/1999 | Meek | |
| 6,016,553 A | 1/2000 | Schneider et al. | |
| 6,023,695 A | 2/2000 | Osborn et al. | |
| 6,167,405 A | 12/2000 | Rosensteel, Jr. et al. | |
| 6,169,534 B1 | 1/2001 | Raffel et al. | |
| 6,185,582 B1 | 2/2001 | Zellweger et al. | |
| 6,195,794 B1 | 2/2001 | Buxton | |
| 6,266,067 B1 | 7/2001 | Owen et al. | |
| 6,275,809 B1 | 8/2001 | Tamaki et al. | |
| 6,377,965 B1 | 4/2002 | Hachamovitch et al. | |
| 6,385,617 B1 | 5/2002 | Malik | |
| 6,460,043 B1 | 10/2002 | Tabbara et al. | |
| 6,496,832 B2 | 12/2002 | Chi et al. | |
| 6,509,912 B1 | 1/2003 | Moran et al. | |
| 6,522,347 B1 | 2/2003 | Tsuji et al. | |
| 6,527,556 B1 | 3/2003 | Koskinen | |
| 6,606,740 B1 | 8/2003 | Lynn et al. | |
| 6,636,242 B2 | 10/2003 | Bowman-Amuah | |
| 6,647,370 B1 | 11/2003 | Fu et al. | |
| 6,661,431 B1 | 12/2003 | Stuart et al. | |
| 7,027,997 B1 | 4/2006 | Robinson et al. | |
| 7,043,529 B1 | 5/2006 | Simonoff | |
| 7,054,891 B2 | 5/2006 | Cole | |
| 7,237,188 B1 | 6/2007 | Leung | |
| 7,249,042 B1 | 7/2007 | Doerr et al. | |
| 7,272,637 B1 | 9/2007 | Himmelstein | |
| 7,379,934 B1 | 5/2008 | Forman et al. | |
| 7,383,320 B1 | 6/2008 | Silberstein et al. | |
| 7,415,664 B2 | 8/2008 | Aureglia et al. | |
| 7,461,077 B1 | 12/2008 | Greenwood | |
| 7,489,976 B2 | 2/2009 | Adra | |
| 7,685,152 B2 | 3/2010 | Chivukula et al. | |
| 7,707,514 B2 | 4/2010 | Forstall et al. | |
| 7,710,290 B2 | 5/2010 | Johnson | |
| 7,770,100 B2 | 8/2010 | Chamberlain et al. | |
| 7,827,476 B1 | 11/2010 | Roberts et al. | |
| 7,916,157 B1 * | 3/2011 | Kelley ................ | G06Q 10/109 345/660 |
| 7,954,064 B2 | 5/2011 | Forstall et al. | |
| 8,046,703 B2 | 10/2011 | Busch et al. | |
| 8,078,955 B1 | 12/2011 | Gupta | |
| 8,082,274 B2 | 12/2011 | Steinglass et al. | |
| 8,108,241 B2 | 1/2012 | Shukoor | |
| 8,136,031 B2 | 3/2012 | Massand | |
| 8,151,213 B2 | 4/2012 | Weitzman et al. | |
| 8,223,172 B1 * | 7/2012 | Miller .................. | G06F 3/0481 345/660 |
| 8,286,072 B2 | 10/2012 | Chamberlain et al. | |
| 8,365,095 B2 | 1/2013 | Bansal et al. | |
| 8,375,327 B2 | 2/2013 | Lorch et al. | |
| 8,386,960 B1 | 2/2013 | Eismann et al. | |
| 8,423,909 B2 | 4/2013 | Zabielski | |
| 8,548,997 B1 | 10/2013 | Wu | |
| 8,560,942 B2 * | 10/2013 | Fortes ................. | G06F 40/103 715/238 |
| 8,566,732 B2 | 10/2013 | Louch et al. | |
| 8,572,173 B2 | 10/2013 | Briere et al. | |
| 8,578,399 B2 | 11/2013 | Khen et al. | |
| 8,601,383 B2 | 12/2013 | Folting et al. | |
| 8,620,703 B1 | 12/2013 | Kapoor et al. | |
| 8,738,414 B1 | 5/2014 | Nagar et al. | |
| 8,812,471 B2 | 8/2014 | Akita | |
| 8,819,042 B2 | 8/2014 | Samudrala et al. | |
| 8,862,979 B2 | 10/2014 | Hawking | |
| 8,863,022 B2 | 10/2014 | Rhodes et al. | |
| 8,869,027 B2 | 10/2014 | Louch et al. | |
| 8,937,627 B1 * | 1/2015 | Otero .................. | G09B 29/005 345/619 |
| 8,938,465 B2 | 1/2015 | Messer | |
| 8,954,871 B2 | 2/2015 | Louch et al. | |
| 9,007,405 B1 * | 4/2015 | Eldar .................. | G06F 3/0485 345/666 |
| 9,015,716 B2 | 4/2015 | Fletcher et al. | |
| 9,026,897 B2 | 5/2015 | Zarras | |
| 9,043,362 B2 | 5/2015 | Weissman et al. | |
| 9,129,234 B2 | 9/2015 | Campbell et al. | |
| 9,172,738 B1 | 10/2015 | daCosta | |
| 9,239,719 B1 | 1/2016 | Feinstein et al. | |
| 9,244,917 B1 | 1/2016 | Sharma et al. | |
| 9,253,130 B2 | 2/2016 | Zaveri | |
| 9,286,246 B2 | 3/2016 | Saito et al. | |
| 9,292,587 B2 | 3/2016 | Kann et al. | |
| 9,336,502 B2 | 5/2016 | Mohammad et al. | |
| 9,342,579 B2 | 5/2016 | Cao et al. | |
| 9,361,287 B1 | 6/2016 | Simon et al. | |
| 9,390,059 B1 | 7/2016 | Gur et al. | |
| 9,424,287 B2 | 8/2016 | Schroth | |
| 9,424,333 B1 | 8/2016 | Bisignani et al. | |
| 9,430,458 B2 | 8/2016 | Rhee et al. | |
| 9,449,031 B2 | 9/2016 | Barrus et al. | |
| 9,495,386 B2 | 11/2016 | Tapley et al. | |
| 9,558,172 B2 | 1/2017 | Rampson et al. | |
| 9,613,086 B1 | 4/2017 | Sherman | |
| 9,635,091 B1 | 4/2017 | Laukkanen et al. | |
| 9,679,456 B2 | 6/2017 | East | |
| 9,727,376 B1 | 8/2017 | Bills et al. | |
| 9,760,271 B2 | 9/2017 | Persaud | |
| 9,798,829 B1 | 10/2017 | Baisley | |
| 9,866,561 B2 * | 1/2018 | Psenka ................. | H04L 63/10 |
| 9,870,136 B2 | 1/2018 | Pourshahid | |
| 10,043,296 B2 | 8/2018 | Li | |
| 10,067,928 B1 | 9/2018 | Krappe | |
| 10,176,154 B2 | 1/2019 | Ben-Aharon et al. | |
| 10,235,441 B1 | 3/2019 | Makhlin et al. | |
| 10,255,609 B2 | 4/2019 | Kinkead et al. | |
| 10,282,405 B1 | 5/2019 | Silk et al. | |
| 10,282,406 B2 | 5/2019 | Bissantz | |
| 10,311,080 B2 | 6/2019 | Folting et al. | |
| 10,347,017 B2 | 7/2019 | Ruble et al. | |
| 10,372,706 B2 | 8/2019 | Chavan et al. | |
| 10,380,140 B2 | 8/2019 | Sherman | |
| 10,445,702 B1 | 10/2019 | Hunt | |
| 10,452,360 B1 | 10/2019 | Burman et al. | |
| 10,474,317 B2 | 11/2019 | Ramanathan et al. | |
| 10,489,391 B1 | 11/2019 | Tomlin | |
| 10,489,462 B1 | 11/2019 | Rogynskyy et al. | |
| 10,496,737 B1 | 12/2019 | Sayre et al. | |

(56) References Cited

U.S. PATENT DOCUMENTS

| | | |
|---|---|---|
| 10,528,599 B1 | 1/2020 | Pandis et al. |
| 10,534,507 B1 | 1/2020 | Laukkanen et al. |
| 10,540,152 B1 | 1/2020 | Krishnaswamy et al. |
| 10,540,434 B2 | 1/2020 | Migeon et al. |
| 10,564,622 B1 | 2/2020 | Dean et al. |
| 10,573,407 B2 | 2/2020 | Ginsburg |
| 10,628,002 B1 | 4/2020 | Kang et al. |
| 10,698,594 B2 | 6/2020 | Sanches et al. |
| 10,706,061 B2 | 7/2020 | Sherman et al. |
| 10,719,220 B2 | 7/2020 | Ouellet et al. |
| 10,740,117 B2 | 8/2020 | Ording et al. |
| 10,747,950 B2 | 8/2020 | Dang et al. |
| 10,748,312 B2 | 8/2020 | Ruble et al. |
| 10,754,688 B2 | 8/2020 | Powell |
| 10,761,691 B2 | 9/2020 | Anzures et al. |
| 10,795,555 B2 | 10/2020 | Burke et al. |
| 10,817,660 B2 | 10/2020 | Rampson et al. |
| D910,077 S | 2/2021 | Naroshevitch et al. |
| 10,963,578 B2 | 3/2021 | More et al. |
| 11,042,363 B1 | 6/2021 | Krishnaswamy et al. |
| 11,042,699 B1 | 6/2021 | Sayre et al. |
| 11,048,714 B2 | 6/2021 | Sherman et al. |
| 2001/0008998 A1 | 7/2001 | Tamaki et al. |
| 2001/0032248 A1 | 10/2001 | Krafchin |
| 2002/0075309 A1 | 6/2002 | Michelman et al. |
| 2002/0082892 A1 | 6/2002 | Raffel et al. |
| 2002/0138528 A1 | 9/2002 | Gong et al. |
| 2003/0033196 A1 | 2/2003 | Tomlin |
| 2003/0041113 A1 | 2/2003 | Larsen |
| 2003/0051377 A1 | 3/2003 | Chirafesi, Jr. |
| 2003/0058277 A1 | 3/2003 | Bowman-Amuah |
| 2003/0065662 A1 | 4/2003 | Cosic |
| 2003/0093408 A1 | 5/2003 | Brown et al. |
| 2003/0135558 A1 | 7/2003 | Bellotti et al. |
| 2003/0187864 A1 | 10/2003 | McGoveran |
| 2003/0200215 A1 | 10/2003 | Chen et al. |
| 2004/0032432 A1 | 2/2004 | Baynger |
| 2004/0098284 A1 | 5/2004 | Petito et al. |
| 2004/0133441 A1 | 7/2004 | Brady et al. |
| 2004/0138939 A1 | 7/2004 | Theiler |
| 2004/0172592 A1 | 9/2004 | Collie et al. |
| 2004/0212615 A1 | 10/2004 | Uthe |
| 2004/0215443 A1 | 10/2004 | Hatton |
| 2004/0268227 A1 | 12/2004 | Brid |
| 2005/0034058 A1 | 2/2005 | Mills et al. |
| 2005/0034064 A1 | 2/2005 | Meyers et al. |
| 2005/0039001 A1 | 2/2005 | Hudis et al. |
| 2005/0039033 A1 | 2/2005 | Meyers et al. |
| 2005/0044486 A1 | 2/2005 | Kotler et al. |
| 2005/0066306 A1 | 3/2005 | Diab |
| 2005/0086360 A1 | 4/2005 | Mamou et al. |
| 2005/0091314 A1 | 4/2005 | Blagsvedt et al. |
| 2005/0096973 A1 | 5/2005 | Heyse et al. |
| 2005/0114305 A1 | 5/2005 | Haynes et al. |
| 2005/0125395 A1 | 6/2005 | Boettiger |
| 2005/0165600 A1 | 7/2005 | Kasravi et al. |
| 2005/0171881 A1 | 8/2005 | Ghassemieh et al. |
| 2005/0257204 A1 | 11/2005 | Bryant et al. |
| 2005/0278297 A1 | 12/2005 | Nelson |
| 2005/0289342 A1 | 12/2005 | Needham et al. |
| 2005/0289453 A1 | 12/2005 | Segal et al. |
| 2006/0009960 A1 | 1/2006 | Valencot et al. |
| 2006/0015806 A1 | 1/2006 | Wallace |
| 2006/0031148 A1 | 2/2006 | O'Dell et al. |
| 2006/0047811 A1 | 3/2006 | Lau et al. |
| 2006/0053096 A1 | 3/2006 | Subramanian et al. |
| 2006/0053194 A1 | 3/2006 | Schneider et al. |
| 2006/0069604 A1 | 3/2006 | Leukart et al. |
| 2006/0069635 A1 | 3/2006 | Ram et al. |
| 2006/0080594 A1 | 4/2006 | Chavoustie et al. |
| 2006/0090169 A1 | 4/2006 | Daniels et al. |
| 2006/0106642 A1 | 5/2006 | Reicher et al. |
| 2006/0107196 A1 | 5/2006 | Thanu et al. |
| 2006/0111953 A1 | 5/2006 | Setya |
| 2006/0129415 A1 | 6/2006 | Thukral et al. |
| 2006/0136828 A1 | 6/2006 | Asano |
| 2006/0173908 A1 | 8/2006 | Browning et al. |
| 2006/0190313 A1 | 8/2006 | Lu |
| 2006/0224542 A1 | 10/2006 | Yalamanchi |
| 2006/0224568 A1 | 10/2006 | Debrito |
| 2006/0224946 A1 | 10/2006 | Barrett et al. |
| 2006/0250369 A1 | 11/2006 | Keim |
| 2006/0253205 A1 | 11/2006 | Gardiner |
| 2006/0287998 A1 | 12/2006 | Folting et al. |
| 2006/0294451 A1 | 12/2006 | Kelkar et al. |
| 2007/0050322 A1 | 3/2007 | Vigesaa et al. |
| 2007/0050379 A1 | 3/2007 | Day et al. |
| 2007/0073899 A1 | 3/2007 | Judge et al. |
| 2007/0101291 A1 | 5/2007 | Forstall et al. |
| 2007/0106754 A1 | 5/2007 | Moore |
| 2007/0118527 A1 | 5/2007 | Winje et al. |
| 2007/0118813 A1 | 5/2007 | Forstall et al. |
| 2007/0143169 A1 | 6/2007 | Grant et al. |
| 2007/0168861 A1 | 7/2007 | Bell et al. |
| 2007/0174228 A1 | 7/2007 | Folting et al. |
| 2007/0174760 A1 | 7/2007 | Chamberlain et al. |
| 2007/0220119 A1 | 9/2007 | Himmelstein |
| 2007/0256043 A1 | 11/2007 | Peters et al. |
| 2007/0282522 A1 | 12/2007 | Geelen |
| 2007/0282627 A1 | 12/2007 | Greenstein et al. |
| 2007/0283259 A1 | 12/2007 | Barry et al. |
| 2007/0294235 A1 | 12/2007 | Millett |
| 2007/0299795 A1 | 12/2007 | Macbeth et al. |
| 2007/0300174 A1 | 12/2007 | Macbeth et al. |
| 2007/0300185 A1 | 12/2007 | Macbeth et al. |
| 2008/0004929 A9 | 1/2008 | Raffel et al. |
| 2008/0005235 A1 | 1/2008 | Hegde et al. |
| 2008/0033777 A1 | 2/2008 | Shukoor |
| 2008/0034314 A1 | 2/2008 | Louch et al. |
| 2008/0065460 A1 | 3/2008 | Raynor |
| 2008/0077530 A1 | 3/2008 | Banas et al. |
| 2008/0104091 A1 | 5/2008 | Chin |
| 2008/0126389 A1 | 5/2008 | Mush et al. |
| 2008/0148140 A1 | 6/2008 | Nakano |
| 2008/0155547 A1 | 6/2008 | Weber et al. |
| 2008/0163075 A1 | 7/2008 | Beck et al. |
| 2008/0186173 A1 | 8/2008 | Gates et al. |
| 2008/0195948 A1 | 8/2008 | Bauer |
| 2008/0216022 A1 | 9/2008 | Lorch et al. |
| 2008/0222192 A1 | 9/2008 | Hughes |
| 2008/0256014 A1 | 10/2008 | Gould et al. |
| 2008/0270597 A1 | 10/2008 | Tenenti |
| 2008/0282189 A1 | 11/2008 | Hofmann et al. |
| 2008/0295038 A1 | 11/2008 | Helfman et al. |
| 2008/0301237 A1 | 12/2008 | Parsons |
| 2009/0006171 A1 | 1/2009 | Blatchley et al. |
| 2009/0006283 A1 | 1/2009 | Labrie et al. |
| 2009/0013244 A1 | 1/2009 | Cudich et al. |
| 2009/0019383 A1 | 1/2009 | Riley et al. |
| 2009/0024944 A1 | 1/2009 | Louch et al. |
| 2009/0044090 A1 | 2/2009 | Gur et al. |
| 2009/0048896 A1 | 2/2009 | Anandan |
| 2009/0049372 A1 | 2/2009 | Goldberg |
| 2009/0077164 A1 | 3/2009 | Phillips et al. |
| 2009/0077217 A1 | 3/2009 | McFarland et al. |
| 2009/0132470 A1 | 5/2009 | Vignet |
| 2009/0150813 A1 | 6/2009 | Chang et al. |
| 2009/0174680 A1 | 7/2009 | Anzures et al. |
| 2009/0198715 A1 | 8/2009 | Barbarek |
| 2009/0248710 A1 | 10/2009 | McCormack et al. |
| 2009/0276692 A1 | 11/2009 | Rosner |
| 2009/0313201 A1 | 12/2009 | Huelsman et al. |
| 2009/0313537 A1* | 12/2009 | Fu ............... G06F 40/18 715/212 |
| 2009/0313570 A1 | 12/2009 | Po et al. |
| 2009/0319882 A1 | 12/2009 | Morrison et al. |
| 2009/0327240 A1 | 12/2009 | Meehan et al. |
| 2009/0327851 A1 | 12/2009 | Raposo |
| 2009/0327875 A1 | 12/2009 | Kinkoh |
| 2010/0017699 A1 | 1/2010 | Farrell et al. |
| 2010/0070895 A1 | 3/2010 | Messer |
| 2010/0083164 A1 | 4/2010 | Martin et al. |
| 2010/0088636 A1 | 4/2010 | Yerkes et al. |
| 2010/0095298 A1 | 4/2010 | Seshadrinathan et al. |

(56) References Cited

U.S. PATENT DOCUMENTS

| | | |
|---|---|---|
| 2010/0100427 A1 | 4/2010 | McKeown et al. |
| 2010/0100463 A1 | 4/2010 | Molotsi et al. |
| 2010/0114926 A1 | 5/2010 | Agrawal et al. |
| 2010/0149005 A1 | 6/2010 | Yoon et al. |
| 2010/0174678 A1 | 7/2010 | Massand |
| 2010/0228752 A1 | 9/2010 | Folting et al. |
| 2010/0241477 A1 | 9/2010 | Nylander et al. |
| 2010/0241948 A1 | 9/2010 | Andeen et al. |
| 2010/0241990 A1 | 9/2010 | Gabriel et al. |
| 2010/0251090 A1 | 9/2010 | Chamberlain et al. |
| 2010/0257015 A1 | 10/2010 | Molander |
| 2010/0262625 A1 | 10/2010 | Pittenger |
| 2010/0287221 A1 | 11/2010 | Battepati et al. |
| 2010/0324964 A1 | 12/2010 | Callanan et al. |
| 2011/0016432 A1 | 1/2011 | Helfman |
| 2011/0028138 A1 | 2/2011 | Davies-Moore et al. |
| 2011/0047484 A1 | 2/2011 | Mount et al. |
| 2011/0055177 A1 | 3/2011 | Chakra et al. |
| 2011/0066933 A1 | 3/2011 | Ludwig |
| 2011/0071869 A1 | 3/2011 | O'Brien et al. |
| 2011/0106636 A1 | 5/2011 | Spear et al. |
| 2011/0119352 A1 | 5/2011 | Perov et al. |
| 2011/0179371 A1 | 7/2011 | Kopycinski et al. |
| 2011/0205231 A1 | 8/2011 | Hartley et al. |
| 2011/0208324 A1 | 8/2011 | Fukatsu |
| 2011/0208732 A1 | 8/2011 | Melton et al. |
| 2011/0219321 A1 | 9/2011 | Gonzalez et al. |
| 2011/0225525 A1 | 9/2011 | Chasman et al. |
| 2011/0289397 A1 | 11/2011 | Eastmond et al. |
| 2011/0289439 A1 | 11/2011 | Jugel |
| 2011/0298618 A1 | 12/2011 | Stahl et al. |
| 2011/0302003 A1 | 12/2011 | Shirish et al. |
| 2012/0029962 A1 | 2/2012 | Podgurny et al. |
| 2012/0035974 A1 | 2/2012 | Seybold |
| 2012/0036462 A1 | 2/2012 | Schwartz et al. |
| 2012/0079408 A1 | 3/2012 | Rohwer |
| 2012/0084798 A1 | 4/2012 | Reeves et al. |
| 2012/0086716 A1 | 4/2012 | Reeves et al. |
| 2012/0086717 A1 | 4/2012 | Liu |
| 2012/0089914 A1 | 4/2012 | Holt et al. |
| 2012/0089992 A1 | 4/2012 | Reeves et al. |
| 2012/0096389 A1 | 4/2012 | Flam et al. |
| 2012/0096392 A1 | 4/2012 | Ording et al. |
| 2012/0102432 A1 | 4/2012 | Breedvelt-Schouten et al. |
| 2012/0102543 A1 | 4/2012 | Kohli et al. |
| 2012/0110515 A1 | 5/2012 | Abramoff et al. |
| 2012/0116834 A1 | 5/2012 | Pope et al. |
| 2012/0116835 A1 | 5/2012 | Pope et al. |
| 2012/0124749 A1 | 5/2012 | Lewman |
| 2012/0131445 A1 | 5/2012 | Oyarzabal et al. |
| 2012/0151173 A1 | 6/2012 | Shirley et al. |
| 2012/0158744 A1 | 6/2012 | Tseng et al. |
| 2012/0198322 A1 | 8/2012 | Gulwani et al. |
| 2012/0210252 A1 | 8/2012 | Fedoseyeva et al. |
| 2012/0215574 A1 | 8/2012 | Driessnack et al. |
| 2012/0215578 A1 | 8/2012 | Swierz, III et al. |
| 2012/0233533 A1 | 9/2012 | Yücel et al. |
| 2012/0239454 A1 | 9/2012 | Taix et al. |
| 2012/0246170 A1 | 9/2012 | Lantorno |
| 2012/0254252 A1 | 10/2012 | Jin et al. |
| 2012/0254770 A1 | 10/2012 | Ophir |
| 2012/0260190 A1 | 10/2012 | Berger et al. |
| 2012/0278117 A1 | 11/2012 | Nguyen et al. |
| 2012/0297307 A1 | 11/2012 | Rider et al. |
| 2012/0303262 A1* | 11/2012 | Alam ................ G01C 21/3667 |
| | | 701/410 |
| 2012/0304098 A1 | 11/2012 | Kuulusa |
| 2012/0311496 A1 | 12/2012 | Cao et al. |
| 2013/0018952 A1 | 1/2013 | McConnell et al. |
| 2013/0018953 A1 | 1/2013 | McConnell et al. |
| 2013/0024760 A1 | 1/2013 | Vogel et al. |
| 2013/0036369 A1 | 2/2013 | Mitchell et al. |
| 2013/0041958 A1 | 2/2013 | Post et al. |
| 2013/0055113 A1 | 2/2013 | Chazin et al. |
| 2013/0086460 A1 | 4/2013 | Folting et al. |
| 2013/0090969 A1 | 4/2013 | Rivere |
| 2013/0104035 A1 | 4/2013 | Wagner et al. |
| 2013/0111320 A1 | 5/2013 | Campbell et al. |
| 2013/0117268 A1 | 5/2013 | Smith et al. |
| 2013/0159832 A1 | 6/2013 | Ingargiola et al. |
| 2013/0159907 A1 | 6/2013 | Brosche et al. |
| 2013/0211866 A1 | 8/2013 | Gordon et al. |
| 2013/0238968 A1 | 9/2013 | Barrus |
| 2013/0262527 A1 | 10/2013 | Hunter |
| 2013/0268331 A1 | 10/2013 | Bitz et al. |
| 2013/0297468 A1 | 11/2013 | Hirsch et al. |
| 2013/0318424 A1 | 11/2013 | Boyd |
| 2014/0006326 A1 | 1/2014 | Bazanov |
| 2014/0019842 A1 | 1/2014 | Montagna et al. |
| 2014/0043331 A1 | 2/2014 | Makinen et al. |
| 2014/0046638 A1 | 2/2014 | Peloski |
| 2014/0052749 A1 | 2/2014 | Rissanen |
| 2014/0068403 A1* | 3/2014 | Bhargav ................ G06F 3/0485 |
| | | 715/212 |
| 2014/0074545 A1 | 3/2014 | Minder et al. |
| 2014/0108985 A1 | 4/2014 | Scott et al. |
| 2014/0109012 A1* | 4/2014 | Choudhary ........... G06F 3/0483 |
| | | 715/838 |
| 2014/0115518 A1* | 4/2014 | Abdukalykov ...... G06Q 10/109 |
| | | 715/772 |
| 2014/0129960 A1 | 5/2014 | Wang et al. |
| 2014/0136972 A1* | 5/2014 | Rodgers ................ G06F 3/1208 |
| | | 715/274 |
| 2014/0137144 A1 | 5/2014 | Järvenpää et al. |
| 2014/0173401 A1 | 6/2014 | Oshlag et al. |
| 2014/0188748 A1 | 7/2014 | Cavoue et al. |
| 2014/0195933 A1 | 7/2014 | Rao DV |
| 2014/0214404 A1 | 7/2014 | Kalla et al. |
| 2014/0249877 A1 | 9/2014 | Hull et al. |
| 2014/0278638 A1 | 9/2014 | Kreuzkamp et al. |
| 2014/0278720 A1 | 9/2014 | Taguchi |
| 2014/0280287 A1 | 9/2014 | Ganti |
| 2014/0281868 A1* | 9/2014 | Vogel .................. G06F 3/04883 |
| | | 715/212 |
| 2014/0281869 A1 | 9/2014 | Yob |
| 2014/0289223 A1 | 9/2014 | Colwell et al. |
| 2014/0304174 A1 | 10/2014 | Scott et al. |
| 2014/0306837 A1 | 10/2014 | Hauck, III |
| 2014/0324497 A1 | 10/2014 | Verma et al. |
| 2014/0324501 A1 | 10/2014 | Davidow et al. |
| 2014/0365938 A1 | 12/2014 | Black et al. |
| 2014/0372932 A1 | 12/2014 | Rutherford et al. |
| 2015/0032686 A1 | 1/2015 | Kuchoor |
| 2015/0033131 A1* | 1/2015 | Peev .................... G06F 3/04842 |
| | | 715/731 |
| 2015/0074721 A1* | 3/2015 | Fishman ............ H04N 21/4314 |
| | | 725/45 |
| 2015/0074728 A1* | 3/2015 | Chai ................... H04L 67/2804 |
| | | 725/61 |
| 2015/0095752 A1 | 4/2015 | Studer et al. |
| 2015/0106736 A1 | 4/2015 | Torman et al. |
| 2015/0125834 A1 | 5/2015 | Mendoza |
| 2015/0142829 A1 | 5/2015 | Lee et al. |
| 2015/0153943 A1 | 6/2015 | Wang |
| 2015/0169531 A1* | 6/2015 | Campbell ............. G06F 3/0488 |
| | | 715/212 |
| 2015/0212717 A1 | 7/2015 | Nair et al. |
| 2015/0242091 A1 | 8/2015 | Lu et al. |
| 2015/0249864 A1 | 9/2015 | Tang et al. |
| 2015/0261796 A1 | 9/2015 | Gould et al. |
| 2015/0278699 A1 | 10/2015 | Danielsson |
| 2015/0281292 A1 | 10/2015 | Murayama et al. |
| 2015/0295877 A1 | 10/2015 | Roman |
| 2015/0317590 A1 | 11/2015 | Karlson |
| 2015/0324453 A1* | 11/2015 | Werner .................. G06F 16/26 |
| | | 707/738 |
| 2015/0331846 A1 | 11/2015 | Guggilla et al. |
| 2015/0363478 A1 | 12/2015 | Haynes |
| 2015/0370540 A1 | 12/2015 | Coslovi et al. |
| 2015/0370904 A1 | 12/2015 | Joshi et al. |
| 2015/0378542 A1 | 12/2015 | Saito et al. |
| 2015/0378711 A1 | 12/2015 | Cameron et al. |
| 2015/0378979 A1 | 12/2015 | Hirzel et al. |

(56) References Cited

U.S. PATENT DOCUMENTS

| | | |
|---|---|---|
| 2016/0012111 A1 | 1/2016 | Pattabhiraman et al. |
| 2016/0018962 A1 | 1/2016 | Low et al. |
| 2016/0026939 A1 | 1/2016 | Schiffer et al. |
| 2016/0027076 A1 | 1/2016 | Jackson et al. |
| 2016/0055134 A1 | 2/2016 | Sathish et al. |
| 2016/0055374 A1 | 2/2016 | Zhang et al. |
| 2016/0063435 A1 | 3/2016 | Shah et al. |
| 2016/0078368 A1 | 3/2016 | Kakhandiki et al. |
| 2016/0088480 A1 | 3/2016 | Chen et al. |
| 2016/0092557 A1 | 3/2016 | Stojanovic et al. |
| 2016/0117308 A1* | 4/2016 | Haider .................. G06F 40/106 715/217 |
| 2016/0170586 A1 | 6/2016 | Gallo |
| 2016/0173122 A1 | 6/2016 | Akitomi et al. |
| 2016/0210572 A1 | 7/2016 | Shaaban et al. |
| 2016/0224532 A1 | 8/2016 | Miller et al. |
| 2016/0246490 A1 | 8/2016 | Cabral |
| 2016/0253982 A1* | 9/2016 | Cheung .................. G09G 5/373 715/789 |
| 2016/0275150 A1 | 9/2016 | Bournonnais et al. |
| 2016/0299655 A1* | 10/2016 | Migos .................. G06T 13/80 |
| 2016/0321235 A1 | 11/2016 | He et al. |
| 2016/0335302 A1 | 11/2016 | Teodorescu et al. |
| 2016/0335303 A1 | 11/2016 | Madhalam et al. |
| 2016/0335731 A1 | 11/2016 | Hall |
| 2016/0335903 A1 | 11/2016 | Mendoza |
| 2016/0350950 A1 | 12/2016 | Ritchie et al. |
| 2017/0031967 A1 | 2/2017 | Chavan et al. |
| 2017/0041296 A1 | 2/2017 | Ford et al. |
| 2017/0052937 A1 | 2/2017 | Sirven et al. |
| 2017/0061342 A1 | 3/2017 | LoRe et al. |
| 2017/0061360 A1 | 3/2017 | Rucker et al. |
| 2017/0063722 A1 | 3/2017 | Cropper et al. |
| 2017/0075557 A1* | 3/2017 | Noble .................. G06F 40/177 |
| 2017/0091337 A1 | 3/2017 | Patterson |
| 2017/0109499 A1 | 4/2017 | Doshi et al. |
| 2017/0111327 A1 | 4/2017 | Wu |
| 2017/0116552 A1 | 4/2017 | Deodhar et al. |
| 2017/0124042 A1 | 5/2017 | Campbell et al. |
| 2017/0124048 A1 | 5/2017 | Campbell et al. |
| 2017/0124055 A1 | 5/2017 | Radakovitz et al. |
| 2017/0126772 A1 | 5/2017 | Campbell et al. |
| 2017/0132296 A1 | 5/2017 | Ding |
| 2017/0139874 A1 | 5/2017 | Chin |
| 2017/0139884 A1 | 5/2017 | Bendig et al. |
| 2017/0153771 A1 | 6/2017 | Chu |
| 2017/0177888 A1 | 6/2017 | Arora et al. |
| 2017/0185668 A1 | 6/2017 | Convertino et al. |
| 2017/0221072 A1 | 8/2017 | AthuluruTlrumala et al. |
| 2017/0228445 A1 | 8/2017 | Chiu et al. |
| 2017/0228460 A1 | 8/2017 | Amel et al. |
| 2017/0236081 A1 | 8/2017 | Grady Smith et al. |
| 2017/0242921 A1 | 8/2017 | Rota |
| 2017/0270970 A1 | 9/2017 | Ho et al. |
| 2017/0272316 A1 | 9/2017 | Johnson et al. |
| 2017/0272331 A1 | 9/2017 | Lissack |
| 2017/0285879 A1 | 10/2017 | Pilkington et al. |
| 2017/0285890 A1 | 10/2017 | Dolman |
| 2017/0315683 A1 | 11/2017 | Boucher et al. |
| 2017/0351252 A1 | 12/2017 | Kleifges et al. |
| 2017/0372442 A1 | 12/2017 | Mejias |
| 2018/0025084 A1 | 1/2018 | Conlan et al. |
| 2018/0032570 A1 | 2/2018 | Miller et al. |
| 2018/0055434 A1 | 3/2018 | Cheung et al. |
| 2018/0075104 A1 | 3/2018 | Oberbreckling et al. |
| 2018/0075115 A1 | 3/2018 | Murray et al. |
| 2018/0075413 A1 | 3/2018 | Culver et al. |
| 2018/0075560 A1 | 3/2018 | Thukral et al. |
| 2018/0081863 A1 | 3/2018 | Bathla |
| 2018/0081868 A1 | 3/2018 | Willcock et al. |
| 2018/0088989 A1 | 3/2018 | Nield et al. |
| 2018/0095938 A1 | 4/2018 | Monte |
| 2018/0096417 A1 | 4/2018 | Cook et al. |
| 2018/0109760 A1 | 4/2018 | Metter et al. |
| 2018/0157455 A1 | 6/2018 | Troy et al. |
| 2018/0157467 A1 | 6/2018 | Stachura |
| 2018/0157468 A1 | 6/2018 | Stachura |
| 2018/0173715 A1 | 6/2018 | Dunne |
| 2018/0181650 A1 | 6/2018 | Komatsuda et al. |
| 2018/0181716 A1 | 6/2018 | Mander et al. |
| 2018/0210936 A1 | 7/2018 | Reynolds et al. |
| 2018/0225270 A1 | 8/2018 | Bhide et al. |
| 2018/0276417 A1 | 9/2018 | Cerezo |
| 2018/0293217 A1 | 10/2018 | Callaghan |
| 2018/0293669 A1 | 10/2018 | Jackson et al. |
| 2018/0329930 A1 | 11/2018 | Eberlein et al. |
| 2018/0357305 A1 | 12/2018 | Kinast et al. |
| 2018/0373434 A1 | 12/2018 | Switzer et al. |
| 2018/0373757 A1 | 12/2018 | Schukovets et al. |
| 2019/0005094 A1 | 1/2019 | Yi et al. |
| 2019/0036989 A1 | 1/2019 | Eirinberg et al. |
| 2019/0050445 A1 | 2/2019 | Griffith et al. |
| 2019/0050812 A1 | 2/2019 | Boileau |
| 2019/0056856 A1* | 2/2019 | Simmons ................ G06F 16/34 |
| 2019/0065545 A1 | 2/2019 | Hazel et al. |
| 2019/0073350 A1 | 3/2019 | Shiotani |
| 2019/0095413 A1 | 3/2019 | Davis et al. |
| 2019/0108046 A1 | 4/2019 | Spencer-Harper et al. |
| 2019/0130611 A1 | 5/2019 | Black et al. |
| 2019/0138588 A1 | 5/2019 | Silk et al. |
| 2019/0138653 A1 | 5/2019 | Roller et al. |
| 2019/0155821 A1 | 5/2019 | Dirisala |
| 2019/0208058 A1 | 7/2019 | Dvorkin et al. |
| 2019/0236188 A1 | 8/2019 | McKenna |
| 2019/0251884 A1 | 8/2019 | Burns et al. |
| 2019/0286839 A1 | 9/2019 | Mutha et al. |
| 2019/0306009 A1 | 10/2019 | Makovsky et al. |
| 2019/0324840 A1 | 10/2019 | Malamut et al. |
| 2019/0347077 A1 | 11/2019 | Huebra |
| 2019/0361879 A1 | 11/2019 | Rogynskyy et al. |
| 2019/0361971 A1 | 11/2019 | Zenger et al. |
| 2019/0364009 A1 | 11/2019 | Joseph et al. |
| 2019/0371442 A1 | 12/2019 | Schoenberg |
| 2020/0005248 A1 | 1/2020 | Gerzi et al. |
| 2020/0005295 A1 | 1/2020 | Murphy |
| 2020/0012629 A1 | 1/2020 | Lereya et al. |
| 2020/0026397 A1 | 1/2020 | Wohlstadter et al. |
| 2020/0042648 A1 | 2/2020 | Rao |
| 2020/0142546 A1 | 5/2020 | Breedvelt-Schouten et al. |
| 2020/0151630 A1 | 5/2020 | Shakhnovich |
| 2020/0159558 A1 | 5/2020 | Bak et al. |
| 2020/0247661 A1 | 8/2020 | Rao et al. |
| 2020/0279315 A1 | 9/2020 | Manggala |
| 2020/0301678 A1 | 9/2020 | Burman et al. |
| 2020/0301902 A1 | 9/2020 | Maloy et al. |
| 2020/0327244 A1 | 10/2020 | Blass et al. |
| 2020/0348809 A1 | 11/2020 | Drescher |
| 2020/0349320 A1 | 11/2020 | Owens |
| 2020/0356873 A1 | 11/2020 | Nawrocke et al. |
| 2020/0380212 A1 | 12/2020 | Butler et al. |
| 2020/0380449 A1 | 12/2020 | Choi |
| 2020/0387664 A1 | 12/2020 | Kusumura et al. |
| 2020/0401581 A1 | 12/2020 | Eubank et al. |
| 2021/0019287 A1 | 1/2021 | Prasad et al. |
| 2021/0021603 A1 | 1/2021 | Gibbons |
| 2021/0042796 A1 | 2/2021 | Khoury et al. |
| 2021/0049555 A1 | 2/2021 | Shor |
| 2021/0055955 A1 | 2/2021 | Yankelevich et al. |
| 2021/0056509 A1 | 2/2021 | Lindy |
| 2021/0072883 A1 | 3/2021 | Migunova et al. |
| 2021/0084120 A1 | 3/2021 | Fisher et al. |
| 2021/0124872 A1 | 4/2021 | Lereya |
| 2021/0149553 A1 | 5/2021 | Lereya et al. |
| 2021/0150489 A1 | 5/2021 | Haramati et al. |
| 2021/0165782 A1 | 6/2021 | Deshpande et al. |
| 2021/0166196 A1 | 6/2021 | Lereya et al. |
| 2021/0166339 A1 | 6/2021 | Mann et al. |
| 2021/0173682 A1 | 6/2021 | Chakraborti et al. |
| 2021/0264220 A1 | 8/2021 | Wei et al. |

FOREIGN PATENT DOCUMENTS

| | | |
|---|---|---|
| CN | 107885656 A | 4/2018 |
| CN | 112929172 A | 6/2021 |

(56) References Cited

FOREIGN PATENT DOCUMENTS

| WO | WO 2004/100015 | A2 | 11/2004 |
|---|---|---|---|
| WO | WO 2006/116580 | A2 | 11/2006 |
| WO | WO 2017202159 | A1 | 11/2017 |
| WO | WO 2020/187408 | A1 | 9/2020 |

OTHER PUBLICATIONS

Rordigo et al., Project Management with Monday.com: a 101 Introduction; Jul. 22, 2019, pp. 1-21, 2019.

International Search Report and Written Opinion of the International Searching Authority in PCT/IB2020/000658, dated Nov. 11, 2020 (12 pages).

International Search Report in PCT/IB2020/000974, dated May 3, 2021 (19 pages).

International Search Report in PCT/IB2021/000090 dated Jul. 27, 2021.

ShowMyPC, "Switch Presenter While Using ShowMyPC"; web archive.org; Aug. 20, 2016.

International Search Report and Written Opinion of the International Search Authority in PCT/IB2020/000024, dated May 3, 2021 (13 pages).

"Pivot table—Wikipedia"; URL: https://en.wikepedia .org/w/index.php?title=Pivot_table&oldid=857163289, originally retrieve on Oct. 23, 2019; retrieved on Jul. 16, 2021.

Vishal Singh, "A Theoretical Framework of a BIM-based Multi-Disciplinary Collaboration Platform", Nov. 5, 2020, Automation in Construction, 20 (2011), pp. 134-144 (Year: 2011).

Edward A. Stohr, Workflow Automation: Overview and Research Issues, 2001, Information Systems Frontiers 3:3, pp. 281-296 (Year: 2001).

International Search Report and Written Opinion of the International Search Authority in PCT/IB2021/000297, dated Oct. 12, 2021 (20 pages).

Dapulse.com "features".extracted from web.archive.or/web/2014091818421/https://dapulse.com/features; Sep. 2014 (Year: 2014).

Stephen Larson et al., Introducing Data Mining Concepts Using Microsoft Excel's Table Analysis Tools, Oct. 2015, [Retrieved on Nov. 19, 2021], Retrieved from the internet: <URL: https://dl.acm.org/doi/pdf/10.5555/2831373.2831394> 3 Pages (127-129) (Year: 2015).

Isaiah Pinchas etal., Lexical Analysis Tool, May 2004, [Retrieved on Nov. 19, 2021], Retrieved from the internet: <URL: https://dl.acm.org/doi/pdf/10.1145/997140.997147> 9 Pages (66-74) (Year: 2004).

Sajjad Bahrebar et al., "A Novel Type-2 Fuzzy Logic for Improved Risk Analysis of Proton Exchange Membrane Fuel Cells in Marine Power Systems Application", Energies, 11, 721, pp. 1-16, Mar. 22, 2018.

* cited by examiner

400A

| Project 1 | Person | Task Details | Status | Due Date | Timeline |
|---|---|---|---|---|---|
| Task 2 | ⊙ | | Stuck | July 31 | Jun 1 – Jul 31 |

| Project 2 | Team | Team Addr. | Progress | Due Date | Timeline |
|---|---|---|---|---|---|
| Task 6 | Team A | Address 1 | In Progress | August 31 | Jul 1 – Aug 31 |
| Task 8 | Team B | Address 2 | Done | August 31 | Jul 4 – Aug 31 |

| Project 3 | Group | Location | Task Status | Due Date | Timeline |
|---|---|---|---|---|---|
| Task 9 | Group I | Location 1 | In Progress | Sep 1 | Aug 1 – Sep 1 |
| Task 13 | Group II | Location 2 | Done | Sep 7 | Aug 1 – Sep 7 |
| Task 25 | Group III | Location 3 | Stuck | Oct 30 | Sep 1 – Oct 30 |

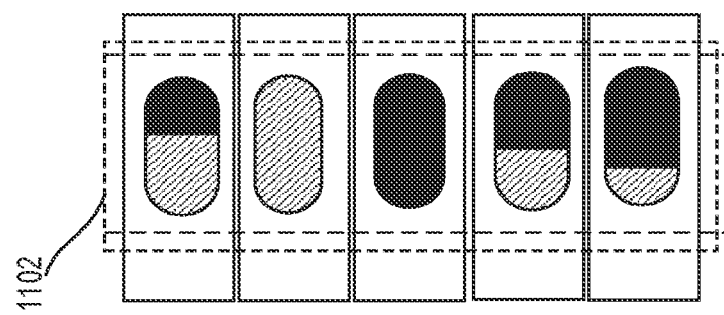
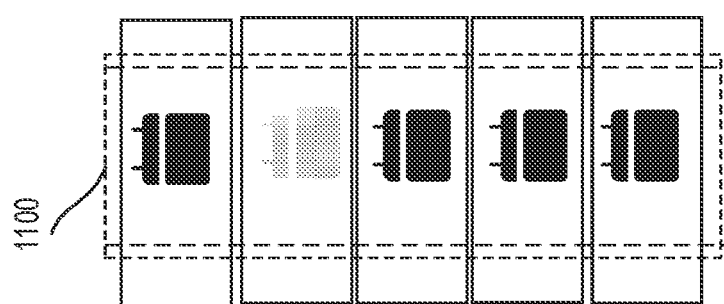
FIG. 11

DIGITAL PROCESSING SYSTEMS AND METHODS FOR HYBRID SCALING/SNAP ZOOM FUNCTION IN TABLE VIEWS OF COLLABORATIVE WORK SYSTEMS

CROSS-REFERENCE TO RELATED APPLICATIONS

This application is a continuation of PCT International Application No. PCT/162021/000090, filed Feb. 11, 2021, which claims the benefit of priority of U.S. Provisional Patent Application No. 62/975,716, filed Feb. 12, 2020, U.S. Provisional Patent Application No. 63/018,593, filed May 1, 2020, U.S. Provisional Patent Application No. 63/019,396, filed May 3, 2020, U.S. Provisional Patent Application No. 63/078,301, filed Sep. 14, 2020, U.S. Provisional Patent Application No. 63/121,803, filed Dec. 4, 2020, and U.S. Provisional Patent Application No. 63/122,439, filed Dec. 7, 2020. This application is also a continuation-in-part of International Patent Application No. PCT/IB2020/000658, filed on Aug. 7, 2020, International Patent Application No. PCT/IB2020/000974, filed on Nov. 17, 2020, and International Patent Application No. PCT/US2021/013393 PCT/IB2021/000024, filed on Jan. 14, 2021. The contents of all the above-listed applications are incorporated herein by reference in their entireties.

TECHNICAL FIELD

The present disclosure relates generally to systems, methods, and computer-readable media for enabling and optimizing workflows in collaborative work systems. Disclosed systems and methods may involve automatically rendering displays and managing tablature across multiple computing devices.

BACKGROUND

Operation of modern enterprises can be complicated and time consuming. In many cases, managing the operation of a single project requires integration of several employees, departments, and other resources of an entity. To manage the challenging operation, project management software applications may be used. Such software applications may enable organizing, planning, and management of resources by providing project-related information to optimize the time and resources spent on each project. In many organizations, project management tools may be divided among many different systems with no practical way (or limited ways) to integrate them. For example, documents, chats, email, calendars, GANTT charts, location tracking, time management, control systems, cost management, capacity management, CRMs, process/order/delivery scheduling, and other functions of an organization may be confined to non-integrated standalone systems or systems that are only partially integrated. It would be useful to improve these software applications to increase operation management efficiency and overall efficiency of computer systems.

Accordingly, various aspects of this disclosure address this issue by providing a platform that integrates many different project management computer operations in a way that improves the efficiency and operation of computer systems, and provides new types of outputs, analytics and/or visualizations previously unavailable and not achievable through manual processes. Some aspects of this disclosure provide systems and methods for managing resources and rendering new information on graphical user interfaces (GUIs) to provide additional, meaningful information, and aggregated displays that may be interactive that enable viewing and altering underlying information in ways not previously achievable. In particular, various embodiments of the present disclosure improve the functionality of computers and networks to increase operation management efficiency and improve computing processes in prior systems through unconventional and interactive displays on GUIs. Further, various embodiments of this disclosure may allow for the organizing, planning, and managing of resources to optimize the time and resources spent related to a process.

In management software applications, it may be desirable to visually represent various aspects of a project to facilitate project management. While project overview tools may be provided in current project management software, these tools generally do not allow direct manipulation of the underlying data. Further, there may be no convenient way to view the status of multiple tasks spread across multiple projects. Embodiments of this disclosure may provide new types of outputs and/or visualizations to provide varying renderings of information that may enable interaction and viewing of the information on varying devices.

SUMMARY

Embodiments consistent with the present disclosure provide systems and methods for collaborative work systems. The disclosed systems and methods may be implemented using a combination of conventional hardware and software as well as specialized hardware and software, such as a machine constructed and/or programmed specifically for performing functions associated with the disclosed method steps. Consistent with other disclosed embodiments, non-transitory computer-readable storage media may store program instructions, which may be executable by at least one processing device and perform any of the steps and/or methods described herein.

Consistent with disclosed embodiments, systems, methods, and computer readable media for merging data from differing tables. Systems, methods, devices, and non-transitory computer readable media may include at least one processor that is configured to maintain a data structure including a plurality of tables, each table of the plurality of tables including a plurality of rows and columns, with each of the plurality of columns having an associated column heading. The at least one processor may receive a request to consolidate information from at least two of the plurality of tables, wherein the at least two of the plurality of tables include similar columns with differing headings and a common data type, and may perform an analysis of data in the similar columns to determine that the data in the similar columns share a common characteristic. The at least one processor may further be configured to aggregate information from the similar columns, and may output the aggregation of information in a manner associating information from the similar columns.

Some embodiments of this disclosure include systems, methods, and computer readable media for a hybrid scaling of tables having differing column types. The embodiments may include maintaining a zoom table having a plurality of columns, which may display differently depending on zoom level. The embodiments may store, for a first column, a first column template associated with a first zoom range. The first column template may be configured to display information in a first format configured to scale within the first zoom range. A second column template may also be stored and associated with the first column, the second zoom range differing from the first zoom range. The second column template may be configured to display information in a second format, which may be different from the first format. Furthermore, the second column template may be configured to scale within the second zoom range. A display view may switch from the first column template to the second column template when the first column is scaled to an outer limit of the first room range. Similarly, a third column template may be configured to scale across the first zoom range and the second zoom range. Such structures may enable simultaneous zooming of the first column and the second column such that, during simultaneous scaling from the first zoom range to the second zoom range, the display format of the first column may change, and the display format of the second column may remain unchanged.

Embodiments of the present disclosure may include systems and methods for facilitating improved data visualization, the system may include at least one processor configured to maintain a plurality of boards, wherein each board of the plurality of boards contains multiple items, at least some of the items being associated with an entity and wherein at least some of the items include calendar-related information. The at least one processor may access a calendar of the entity, perform a lookup across the plurality of boards for the items associated with the entity, perform an analysis of the items associated with the entity to determine whether the items are calendar-related, and may sync the calendar-related items associated with the entity with the accessed calendar by rendering on the calendar, graphical indicators linked to the items. The at least one processor may further be configured to receive a selection of a specific graphical indicator rendered on the calendar, the specific graphical indicator being associated with a specific one of the calendar-related items, and upon receipt of the selection, may activate a specific link associated with the specific graphical indicator to thereby cause a display of information associated with the specific item.

BRIEF DESCRIPTION OF THE DRAWINGS

FIGS. 4A to 4C illustrate examples of tables that that include similar columns, consistent with some embodiments of the present disclosure.

FIG. 8 illustrates example screen shots of hybrid scaling for tables having differing column types, consistent with some embodiments of the present disclosure.

FIG. 11 graphically depicts transformation of a screen display when zooming from a calendar format to a timeline format, consistent with some embodiments of the present disclosure.

DETAILED DESCRIPTION

Figure 1:
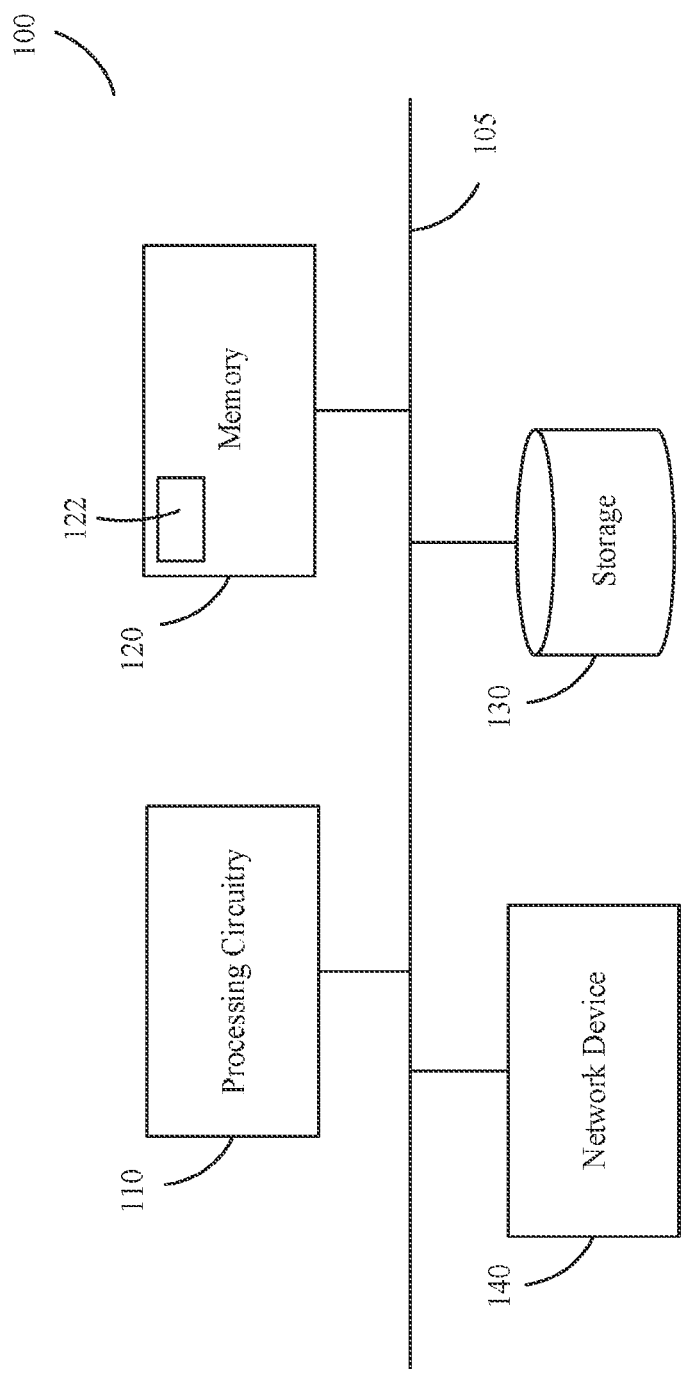
FIG. 1 depicts a block diagram of an exemplary computing device for generating a data structure repository, consistent with some embodiments of the present disclosure.

Exemplary embodiments are described with reference to the accompanying drawings. The figures are not necessarily drawn to scale. While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It should also be noted that as used herein and in the appended claims, the singular forms "a," "an," and "the" include plural references unless the context clearly dictates otherwise.

In the following description, various working examples are provided for illustrative purposes. However, is to be understood the present disclosure may be practiced without one or more of these details.

This disclosure presents various mechanisms for collaborative work systems. Such systems may involve software that enables multiple users to work collaboratively. By way of one example, workflow management software may enable various members of a team to cooperate via a common online platform. It is intended that one or more aspects of any mechanism may be combined with one or more aspect of any other mechanisms, and such combinations are within the scope of this disclosure.

Certain embodiments disclosed herein include devices, systems, and methods for collaborative work systems that may allow a user to interact with information in real time. The platform may allow a user to structure the system in many ways with the same building blocks to represent what the user wants to manage and how the user wants to manage it. This may be accomplished through the use of boards. A board may be a table with items (e.g., individual items presented in horizontal rows) defining objects or entities that are managed in the platform (task, project, client, deal, etc.). Unless expressly noted otherwise, the terms "board" and "table" may be considered synonymous for purposes of this disclosure. In some embodiments, a board may contain information beyond which is displayed in a table. Boards may include sub-boards that may have a separate structure from a board. Sub-boards may be tables with sub-items that may be related to the items of a board. Columns intersecting with rows of items may together define cells in which data associated with each item may be maintained. Each column may have a heading or label defining an associated data type. When used herein in combination with a column, a row may be presented horizontally and a column vertically. However, in the broader generic sense as used herein, the term "row" may refer to one or more of a horizontal and a vertical presentation. A table or tablature as used herein, refers to data presented in horizontal and vertical rows, (e.g., horizontal rows and vertical columns) defining cells in which data is presented. While a table view may be one way to present and manage the data contained on a board, a table's or board's data may be presented in different ways. For example, in some embodiments, dashboards may be utilized to present or summarize data derived from one or more boards. A dashboard may be a non-table form of presenting data, using for example static or dynamic graphical representations. A dashboard may also include multiple non-table forms of presenting data. As discussed later in greater detail, such representations may include various forms of graphs or graphics. In some instances, dashboards (which may also be referred to more generically as "widgets") may include tablature. Software links may interconnect one or more boards with one or more dashboards thereby enabling the dashboards to reflect data presented on the boards. This may allow, for example, data from multiple boards to be displayed and/or managed from a common location. These widgets may provide visualizations that allow a user to update data derived from one or more boards.

Boards (or the data associated with boards) may be stored in a local memory on a user device or may be stored in a local network repository. Boards may also be stored in a remote repository and may be accessed through a network. In some instances, permissions may be set to limit board access to the board's "owner" while in other embodiments a user's board may be accessed by other users through any of the networks described in this disclosure. When one user makes a change in a board, that change may be updated to the board stored in a memory or repository and may be pushed to the other user devices that access that same board. These changes may be made to cells, items, columns, boards, dashboard views, logical rules, or any other data associated with the boards. Similarly, when cells are tied together or are mirrored across multiple boards, a change in one board may cause a cascading change in the tied or mirrored boards or dashboards of the same or other owners.

Various embodiments are described herein with reference to a system, method, device, or computer readable medium. It is intended that the disclosure of one is a disclosure of all. For example, it is to be understood that disclosure of a computer readable medium described herein also constitutes a disclosure of methods implemented by the computer readable medium, and systems and devices for implementing those methods, via for example, at least one processor.

It is to be understood that this form of disclosure is for ease of discussion only, and one or more aspects of one embodiment herein may be combined with one or more aspects of other embodiments herein, within the intended scope of this disclosure.

Embodiments described herein may refer to a non-transitory computer readable medium containing instructions that when executed by at least one processor, cause the at least one processor to perform a method. Non-transitory computer readable medium may include any medium capable of storing data in any memory in a way that may be read by any computing device with a processor to carry out methods or any other instructions stored in the memory. The non-transitory computer readable medium may be implemented as hardware, firmware, software, or any combination thereof. Moreover, the software may preferably be implemented as an application program tangibly embodied on a program storage unit or computer readable medium consisting of parts, or of certain devices and/or a combination of devices. The application program may be uploaded to, and executed by, a machine having any suitable architecture. Preferably, the machine may be implemented on a computer platform having hardware such as one or more central processing units ("CPUs"), a memory, and input/output interfaces. The computer platform may also include an operating system and microinstruction code. The various processes and functions described in this disclosure may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium may be any computer readable medium except for a transitory propagating signal.

The memory may include a Random Access Memory (RAM), a Read-Only Memory (ROM), a hard disk, an optical disk, a magnetic medium, a flash memory, other permanent, fixed, volatile or non-volatile memory, or any other mechanism capable of storing instructions. The memory may include one or more separate storage devices collocated or disbursed, capable of storing data structures, instructions, or any other data. The memory may further include a memory portion containing instructions for the processor to execute. The memory may also be used as a working scratch pad for the processors or as a temporary storage.

Some embodiments may involve at least one processor. A processor may be any physical device or group of devices having electric circuitry that performs a logic operation on input or inputs. For example, the at least one processor may include one or more integrated circuits (IC), including application-specific integrated circuit (ASIC), microchips, microcontrollers, microprocessors, all or part of a central processing unit (CPU), graphics processing unit (GPU), digital signal processor (DSP), field-programmable gate array (FPGA), server, virtual server, or other circuits suitable for executing instructions or performing logic operations. The instructions executed by at least one processor may, for example, be pre-loaded into a memory integrated with or embedded into the controller or may be stored in a separate memory.

In some embodiments, the at least one processor may include more than one processor. Each processor may have a similar construction, or the processors may be of differing constructions that are electrically connected or disconnected from each other. For example, the processors may be separate circuits or integrated in a single circuit. When more than one processor is used, the processors may be configured to operate independently or collaboratively. The processors may be coupled electrically, magnetically, optically, acoustically, mechanically or by other means that permit them to interact.

Consistent with the present disclosure, disclosed embodiments may involve a network. A network may constitute any type of physical or wireless computer networking arrangement used to exchange data. For example, a network may be the Internet, a private data network, a virtual private network using a public network, a Wi-Fi network, a LAN or WAN network, and/or other suitable connections that may enable information exchange among various components of the system. In some embodiments, a network may include one or more physical links used to exchange data, such as Ethernet, coaxial cables, twisted pair cables, fiber optics, or any other suitable physical medium for exchanging data. A network may also include a public switched telephone network ("PSTN") and/or a wireless cellular network. A network may be a secured network or unsecured network. In other embodiments, one or more components of the system may communicate directly through a dedicated communication network. Direct communications may use any suitable technologies, including, for example, BLUETOOTH™, BLUETOOTH LE™ (BLE), Wi-Fi, near field communications (NFC), or other suitable communication methods that provide a medium for exchanging data and/or information between separate entities.

Certain embodiments disclosed herein may also include a computing device for generating features for work collaborative systems, the computing device may include processing circuitry communicatively connected to a network interface and to a memory, wherein the memory contains instructions that, when executed by the processing circuitry, configure the computing device to receive from a user device associated with a user account instruction to generate a new column of a single data type for a first data structure, wherein the first data structure may be a column oriented data structure, and store, based on the instructions, the new column within the column-oriented data structure repository, wherein the column-oriented data structure repository may be accessible and may be displayed as a display feature to the user and at least a second user account. The computing devices may be devices such as mobile devices, desktops, laptops, tablets, or any other devices capable of processing data. Such computing devices may include a display such as an LED display, augmented reality (AR), virtual reality (VR) display.

Certain embodiments disclosed herein may include a processor configured to perform methods that may include triggering an action in response to an input. The input may be from a user action or from a change of information contained in a user's table, in another table, across multiple tables, across multiple user devices, or from third-party applications. Triggering may be caused manually, such as through a user action, or may be caused automatically, such as through a logical rule, logical combination rule, or logical templates associated with a board. For example, a trigger may include an input of a data item that is recognized by at least one processor that brings about another action.

In some embodiments, the methods including triggering may cause an alteration of data and may also cause an alteration of display of data contained in a board or in memory. An alteration of data may include a recalculation of data, the addition of data, the subtraction of data, or a rearrangement of information. Further, triggering may also cause a communication to be sent to a user, other individuals, or groups of individuals. The communication may be a notification within the system or may be a notification outside of the system through a contact address such as by email, phone call, text message, video conferencing, or any other third-party communication application.

FIG. 1 is a block diagram of an exemplary computing device 100 for generating a column and/or row oriented data structure repository for data consistent with some embodiments. The computing device 100 may include processing circuitry 110, such as, for example, a central processing unit (CPU). In some embodiments, the processing circuitry 110 may include, or may be a component of, a larger processing unit implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information. The processing circuitry such as processing circuitry 110 may be coupled via a bus 105 to a memory 120.

The memory 120 may further include a memory portion 122 that may contain instructions that when executed by the processing circuitry 110, may perform the method described in more detail herein. The memory 120 may be further used as a working scratch pad for the processing circuitry 110, a temporary storage, and others, as the case may be. The memory 120 may be a volatile memory such as, but not limited to, random access memory (RAM), or non-volatile memory (NVM), such as, but not limited to, flash memory. The processing circuitry 110 may be further connected to a network device 140, such as a network interface card, for providing connectivity between the computing device 100 and a network, such as a network 210, discussed in more detail with respect to FIG. 2 below. The processing circuitry 110 may be further coupled with a storage device 130. The storage device 130 may be used for the purpose of storing single data type column-oriented data structures, data elements associated with the data structures, or any other data structures. While illustrated in FIG. 1 as a single device, it is to be understood that storage device 130 may include multiple devices either collocated or distributed.

The processing circuitry 110 and/or the memory 120 may also include machine-readable media for storing software. "Software" as used herein refers broadly to any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, may cause the processing system to perform the various functions described in further detail herein.

Figure 2:
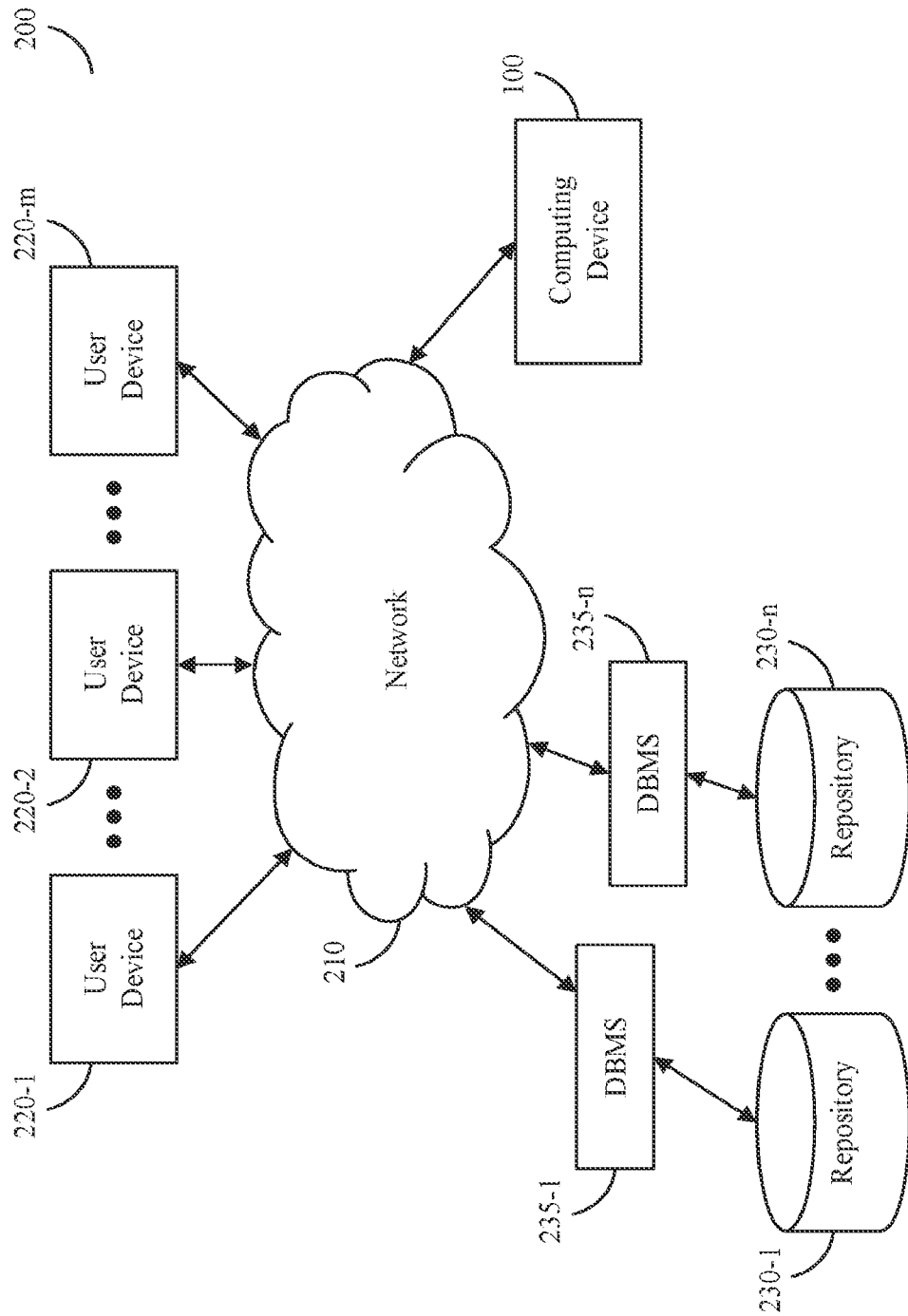
FIG. 2 depicts a block diagram of an exemplary computing architecture for collaborative work systems, consistent with some embodiments of the embodiments of the present disclosure.

FIG. 2 is a block diagram of computing architecture 200 that may be used in connection with various disclosed embodiments. The computing device 100, as described in connection with FIG. 1, may be coupled to network 210. The network 210 may enable communication between different elements that may be communicatively coupled with the computing device 100, as further described below. The network 210 may include the Internet, the world-wide-web (WWW), a local area network (LAN), a wide area network (WAN), a metro area network (MAN), and other networks capable of enabling communication between the elements of the computing architecture 200. In some disclosed embodiments, the computing device 100 may be a server deployed in a cloud computing environment.

One or more user devices 220-1 through user device 220-m, where "m" in an integer equal to or greater than 1, referred to individually as user device 220 and collectively as user devices 220, may be communicatively coupled with the computing device 100 via the network 210. A user device 220 may be for example, a smart phone, a mobile phone, a laptop, a tablet computer, a wearable computing device, a personal computer (PC), a smart television and the like. A user device 220 may be configured to send to and receive from the computing device 100 data and/or metadata associated with a variety of elements associated with single data type column-oriented data structures, such as columns, rows, cells, schemas, and the like.

One or more data repositories 230-1 through data repository 230-n, where "n" in an integer equal to or greater than 1, referred to individually as data repository 230 and collectively as data repository 230, may be communicatively coupled with the computing device 100 via the network 210, or embedded within the computing device 100. Each data repository 230 may be communicatively connected to the network 210 through one or more database management services (DBMS) 235-1 through DBMS 235-n. The data repository 230 may be for example, a storage device containing a database, a data warehouse, and the like, that may be used for storing data structures, data items, metadata, or any information, as further described below. In some embodiments, one or more of the repositories may be distributed over several physical storage devices, e.g., in a cloud-based computing environment. Any storage device may be a network accessible storage device, or a component of the computing device 100.

Aspects of this disclosure may provide a technical solution to the challenging technical problem of project management and may relate to a dynamic system for automatically recognizing and aggregating similar columns for presentation in collaborative work systems, including methods, systems, devices, and computer-readable media. For ease of discussion, some examples are described below with reference to methods, systems, devices, and/or computer-readable media, with the understanding that discussions of each apply equally to the others. For example, some aspects of methods may be implemented by a computing device or software running thereon. Other aspects of such methods may be implemented over a network (e.g., a wired network, a wireless network, or both).

A system consistent with disclosed embodiments may include at least one processor and may involve computer readable media. At least one processor may include any circuitry for performing logical operations on input data as described herein.

Non-transitory computer-readable media may also be used in connection with disclosed embodiments. Non-transitory computer readable media, as described herein, may be implemented as any combination of hardware, firmware, software, or any medium capable of storing data that is readable by any computing device with a processor for performing methods or operations represented by the stored data. In a broadest sense, the examples described herein are not limited to particular physical or electronic instrumentalities, but rather may be accomplished using many differing instrumentalities.

A table having horizontal and vertical rows (e.g., rows and columns) may be one example of two-dimensional tablature. Tablature presented in greater than two dimensions may be simulated on a two-dimensional display or may be presented holographically or through virtual glasses or other virtual displays. Altering tablature displays, as used herein, may refer to any procedure or process of changing a visual presentation form of a display of a table in a collaborative work system. The procedures or processes for altering the tablature displays may involve, for example, any combination of modification, addition, or removal operated on a color, a font, a typeface, a shape, a size, a column-row arrangement, or any visual effect of a visible object in the table. The visible object may include a table cell, a table border line, a table header, or any table elements, and may further include a number, a text, a symbol, a mark, a character, a date, a time, an icon, an avatar, a hyperlink, a picture, a video, an animation, or any visible item included in any table element.

By way of one example, a collaborative work system may utilize workflow management software that enables members of a team to cooperate via a common online platform (e.g., a website). Aspects of this disclosure may display a table with items on a screen of a computing device. A table may be presented, for example, via a display screen associated with a computing device such as a PC, laptop, tablet, projector, cell phone, or personal wearable device. A table may also be presented virtually through AR or VR glasses. Other mechanisms of presenting may also be used to enable a user to visually comprehend presented information.

Consistent with disclosed embodiments, systems, methods, devices, and non-transitory computer readable media for merging data from differing tables may be provided. At least one processor may be configured to maintain a data structure including a plurality of tables. Each table of the plurality of tables may include a plurality of rows and columns, with each of the plurality of columns having an associated column heading. Merging, as used herein, may refer to an operation to combine, unify, unite, consolidate, or solidify multiple objects into a larger object. For example, merging multiple columns may refer to combining the multiple columns into a single column. Differing tables, as used herein, may refer to different tables associated with a single user or multiple users. For example, the differing tables may be associated with at least two different users, such as a first table for presenting information related to a first user and a second table for presenting information related to a second user. In another example, the differing tables may be associated with a single user, each table being used for different purposes, such as a main table for presenting higher-level information and one or more sub-tables for presenting lower-level information. A sub-table, as used herein, refers to a table being a part of another table (e.g., a main table).

A data structure in this disclosure may refer to any collection of information. For example, a data structure may include any collection of data values and relationships among them. The data may be stored linearly, horizontally, hierarchically, relationally, non-relationally, uni-dimensionally, multidimensionally, operationally, in an ordered manner, in an unordered manner, in an object-oriented manner, in a centralized manner, in a decentralized manner, in a distributed manner, in a custom manner, or in any manner enabling data access. By way of non-limiting examples, data structures may include an array, an associative array, a linked list, a binary tree, a balanced tree, a heap, a stack, a queue, a set, a hash table, a record, a tagged union, ER model, and a graph. For example, a data structure may include an XML database, an RDBMS database, an SQL database, or NoSQL alternatives for data storage/search such as, for example, MongoDB, Redis, Couchbase, Datastax Enterprise Graph, Elastic Search, Splunk, Solr, Cassandra, Amazon DynamoDB, Scylla, HBase, and Neo4J. A data structure may be a component of the disclosed system or a remote computing component (e.g., a cloud-based data structure). Data in the data structure may be stored in contiguous or non-contiguous memory. Moreover, a data structure, as used herein, does not require information to be co-located. It may be distributed across multiple servers, for example, that may be owned or operated by the same or different entities. Thus, the term "data structure" as used herein in the singular is inclusive of plural data structures.

A data structure may include a table, aboard, a dashboard, or apart thereof (e.g., a row, a column, a cell, or a widget). A table as used herein includes those items described herein in connection with the term "tablature," and may include horizontal and vertical rows for presenting, displaying, or enabling access to information stored therein. A table may be presented on a screen associated with a computing device or any electronic device that displays or projects information on a surface or virtually. An intersection of multiple rows may represent a cell. For example, the cell may be represented as an intersection of a horizontal row (or referred to as a "horizontal column") and a vertical row (or referred to as a "vertical column"). A cell may contain a value, a color, a word, a graphic, a symbol, a GIF, a meme, any combination thereof, or any other data. In some embodiments, a table may be presented in two dimensions, three dimensions, or more. A column heading associated with a column (referred to as an "associated column heading") in this disclosure may refer to a text associated with a column within a table. For example, the associated column heading may be located in a top cell of the column including the text.

Maintaining a data structure (e.g., a digital data object such as a table, a column of the table, or a cell of the column), as used herein, may refer to any means to store or link the object. For example, a system may store an object or the link to an object in a non-transitory computer-readable medium. In some embodiments, maintaining a table may include storing a form of table, with vertical and/or horizontal row headers defining information to be contained in cells of such rows. Maintaining a table may also include storing values associated with the cells of such rows. In some embodiments, maintaining a table may include one or more of saving, storing, recording, updating, tracking, counting, editing, viewing, displaying, aggregating, combining, or otherwise retaining in a repository information for representation in a table. By way of example with reference to FIG. 1 and FIG. 2, the system may maintain the object by storing it in memory 120, in storage 130, in repository 230-1, or any combination thereof.

Figure 3:
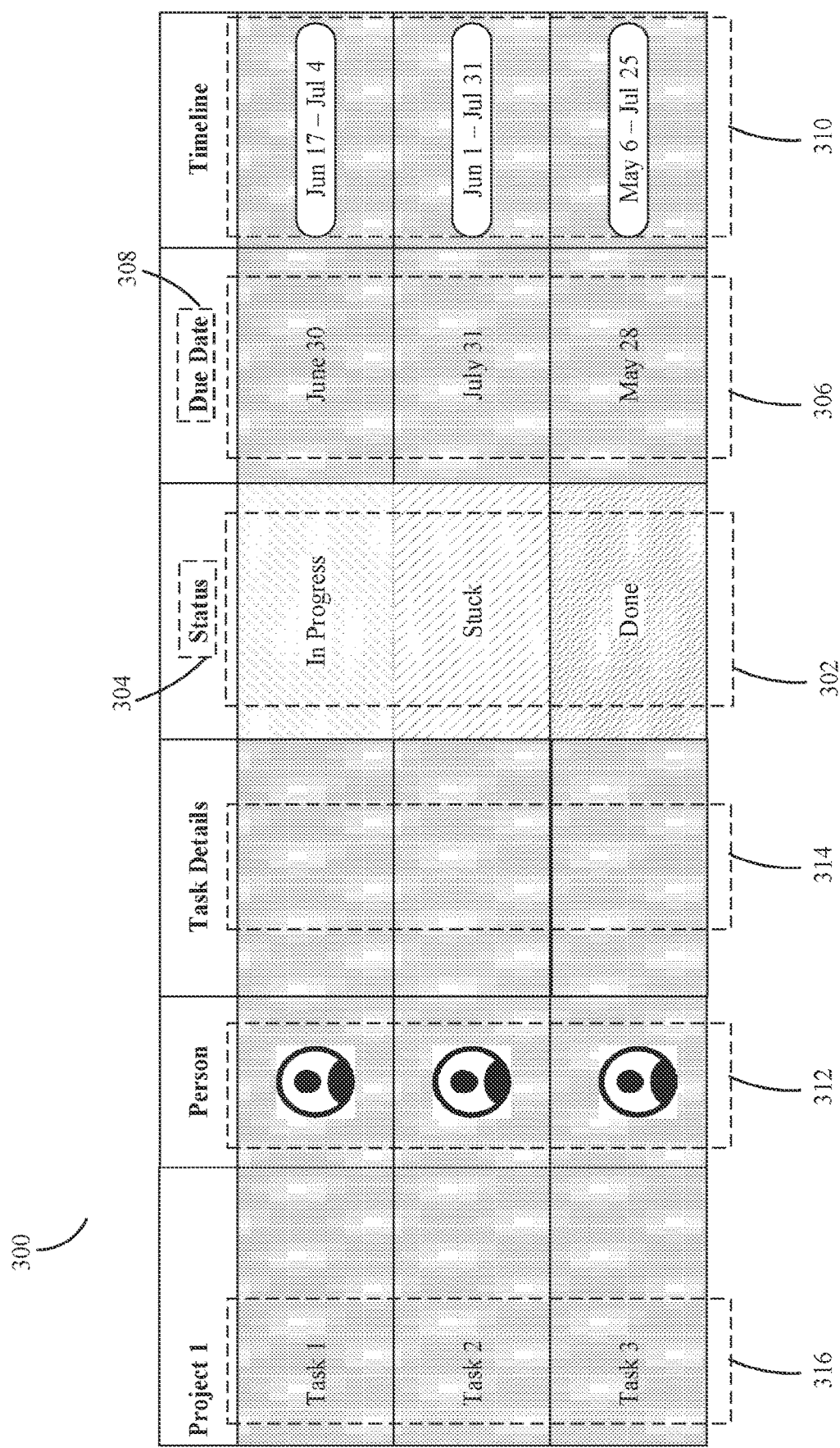
FIG. 3 illustrates an example of a table that includes multiple columns and rows, consistent with some embodiments of the present disclosure.

FIG. 3 illustrates an example table 300 that may include multiple columns and rows, consistent with embodiments of the present disclosure. In some embodiments, the table 300 may be displayed using a computing device (e.g., the computing device 100 illustrated in FIG. 1) or software running thereon. The table 300 may be associated with a project (e.g., "Project 1" in FIG. 3) and may include, in the multiple rows and columns, tasks (e.g., in rows including "Task 1," Task 2," or "Task 3") included in the project, persons (e.g., in a column 312) assigned to the tasks, details (e.g., in a column 314) of the tasks, statuses (e.g., in a column 302) of the tasks, due dates (e.g., in a column 306) of the tasks, timelines (e.g., in a column 310) of the tasks, or any information, characteristic, or associated entity of the project. A task, as used herein, may refer to a part or a portion of a project. A task may be performed by an entity (e.g., an individual or a team). In some embodiments, a task may be represented by a row of cells in a task table. In some embodiments, a task may be represented by a column of cells of a task table.

Any column of the table may display cells of a single data type or of multiple data types. A "data type" of a cell in this disclosure may refer to a type, a category, or a characteristic of data to be included in the cell, such as a numeric value, a character, a symbol, a text, an alphanumeric value, a graphic element, a closed list of element, a value range, or any constraint on the format or type of cell data. A single data type column may be one where all cells are uniform in at least one data type or characteristic. In some embodiments, the first column may be at least a portion of a single data type (e.g., texts) column-oriented data structure. A single data type column-oriented data structure may be a digital data structure of a table that includes columns where all cells of the columns may be programmed to include a single category of data.

In FIG. 3, the table 300 includes, among other columns, a first column 302 that has a first column heading 304 ("Status") and a second column 306 that has a second column heading 308 ("Due Date"). For example, the first column 302 may be a status column type of table 300. Other columns with other characteristics in FIG. 3 may include a due date column type (including a second column 306), a timeline column type (including the column 310), a person column type (including the column 312), and text column types such as the columns 314 and 316.

In FIG. 3, the first column 302 includes three rows, each row including one or more words indicative of a status of each task of the project. The second column 306 includes three rows, each row including a date indicative of a due date of each task of the project. In some embodiments, the computing device that implements the method may enable the user to select the second column heading in the table or through a user interface such as a column store in a manner similar to that of enabling the user to select the first column heading in the table as described above.

As illustrated in FIG. 3, the at least one processor may maintain a data structure that includes a plurality of tables (e.g., including the table 300) and other information (e.g., metadata) associated with the plurality of tables. Each table (e.g., the table 300) of the plurality of tables may include a plurality of rows (e.g., the rows of "Task 1," Task 2," and "Task 3" in the table 300) and columns (e.g., columns 302, 306, 310, 312, 314, and 316 of the table 300). Each of the plurality of columns may have an associated column heading, such as a first column heading 304 associated with a first column 302 or a second column heading 308 associated with a second column 306.

Consistent with disclosed embodiments, the at least one processor may be configured to receive a request to consolidate information from at least two of the plurality of tables, wherein the at least two of the plurality of tables may include similar columns with differing headings and a common data type. Receiving, as used herein, may refer to accepting, taking in, admitting, gaining, acquiring, retrieving, obtaining, reading, accessing, collecting, or any operation for acquisition. A "request" to perform an operation, as used herein, may refer to a message conforming to a protocol, an analog signal, a digital signal, a computer-readable instruction, a computer-readable command, or any kind of communication data prompting the operation. Consolidating, as used herein, may refer to an operation to combine, unify, unite, merge, or solidify multiple objects into a larger object. Unless expressly noted otherwise, the terms "consolidating" and "merging" may be considered synonymous for purposes of this disclosure. A common data type between two or more columns may refer to the same data type of which the data is included in the two or more columns. For example, the similar columns may have the same data type with different values in their cells. In another example, the similar columns may have different data types but a common value (e.g., a common keyword) in their data (e.g., in their column headings). As another example, the similar columns may have the same data type and a common value in their data. By way of example, two columns that hold alphanumeric textual data may be considered as sharing a common data type; two columns that share status indicators may be considered as sharing a common data type; and two columns that hold calendar dates may be considered as sharing a common data type.

Similar columns, as used herein, may refer to columns having a common characteristic. In some embodiments, the at least one processor may determine that at least two of the plurality of columns are similar based on shared column characteristics. For example, a shared column characteristic may include a common data type, a common heading, common data, or a similar format. In some embodiments, the shared column characteristics may include a data type contained in the at least two of the plurality of columns. For example, the data type as the shared column characteristic may be contained (e.g., stored in a database) as metadata (e.g., labels or tags) associated with the at least two of the plurality of columns.

In some embodiments, the shared column characteristics may include relative column positions. A relative column position in this disclosure may refer to a position of a column with respect to a table or another column. For example, if a column is the fourth column counted from the left, the relative column position of this column with respect to the table is four. In another example, if a first column representing first information (e.g., due dates) is located next to a second column representing second information (e.g., task statuses) in the plurality of tables, the at least one processor may determine that first columns representing the first information in at least two of the plurality of tables are similar columns, and that columns next to the first columns and representing the second information are also similar columns.

FIGS. 4A to 4C illustrate example tables 400A, 400B, and 400C that include similar columns, consistent with embodiments of the present disclosure. In some embodiments, the tables 400A, 400B, and 400C may be displayed using a computing device (e.g., the computing device 100 illustrated in FIG. 1) or software running thereon. The computing device 100 may send an output signal to one or more of user devices 220-1 to 220-m to enable viewing of the tables 400A, 400B, and 400C. As illustrated in FIGS. 4A to 4C, the tables 400A, 400B, and 400C are associated with three projects (i.e., "Project 1," "Project 2," and "Project 3"), respectively. In some embodiments, the tables 400A, 400B, and 400C may be associated with the same user (e.g., a manager of multiple projects). In some embodiments, the tables 400A, 400B, and 400C may be associated with different users (e.g., different teams of a company or different companies).

The tables 400A, 400B, and 400C may have the same or different columns and may have the same or different column organization or format. In FIGS. 4A to 4C, as an example, the tables 400A, 400B, and 400C display different columns and formats. The table 400A includes only a row of "Task 2." The table 400B includes rows of "Task 6" and "Task 8." The table 400C includes rows of "Task 9," "Task 13," and "Task 25." In FIGS. 4A to 4C, each of the tasks (rows) of the tables 400A, 400B, and 400C is different from each other, as represented by the different due dates and timelines.

Column-wise, the tables 400A, 400B, and 400C display columns having the same column heading of "Due Date" (e.g., for storing task due dates using a date data type) and "Timeline" (e.g., for storing task timelines using a time range data type). The table 400A further includes a column 402 with a column heading 404 ("Person") for storing person's names using a text (e.g., alphabetical and symbol) data type, a column 406 with a column heading 408 ("Task Details") for storing task details using an address (e.g., a textual string or global positioning system ("GPS") coordinates) data type, and a column 410 with a column heading 412 ("Status") for storing task statuses using a status data type (e.g., having freeform texts or texts selected from a predefined list such as a list of "In Progress," "Done," "Stuck," and "Not Started"). The table 400B further includes a column 414 with a column heading 416 (e.g., "Team") for storing team names using the text data type, a column 418 with a column heading 420 (e.g., "Team Addr.") for storing the team's addresses (e.g., if the teams are in different geographical locations) using the address data type, and a column 422 with a column heading 424 (e.g., "Progress") for storing task statuses using the status data type. The table 400C further includes a column 426 with a column heading 428 (e.g., "Group") for storing group names using the text data type, a column 430 with a column heading 432 (e.g., "Location") for storing the group's locations (e.g., if the groups are in different geographical locations) using the address data type, and a column 434 with a column heading 436 (e.g., "Task Status") for storing task statuses using the status data type.

As illustrated in FIGS. 4A to 4C, at least two of the plurality of tables (e.g., the tables 400A, 400B, and 400C) may include similar columns with differing headings and a common data type. For example, the tables 400A and 400B may include similar columns (e.g., the columns 410 and 422) with differing headings (e.g., the column headings 412 and 424) and a common data type (e.g., the status data type). In another example, the tables 400B and 400C may include similar columns (e.g., the columns 418 and 430) with differing headings (e.g., the column headings 420 and 432) and a common data type (e.g., the address data type). As another example, the tables 400A and 400C may include similar columns (e.g., the columns 410 and 434) with differing headings (e.g., the column headings 412 and 436) and a common data type (e.g., the status data type). By way of example, the at least one processor may receive a request to consolidate information from at least two of the plurality of tables. It should be noted that the plurality of task tables (including the tables 400A, 400B, and 400C) may include more than three tables (not shown).

In some embodiments, the at least one processor may identify the common data type through an identification of similar terms used in the similar columns. Similar terms in this disclosure may include data having exactly the same values or values representing the same semantic meaning (e.g., for data in a text data type). For example, the terms "working on it" and "in progress" may be considered to share the same semantic meaning. In some embodiments, to determine whether terms having different values represent the same semantic meaning, the at least one processor may apply a natural language processing technique (e.g., a support vector machine algorithm, a Bayesian network algorithm, a maximum entropy algorithm, a conditional random field algorithm, a neural network algorithm, or a deep learning algorithm) for analyzing the terms. In some embodiments, the at least one processor may identify the similar terms in column headings of the similar columns. In some embodiments, the at least one processor may identify the similar terms in non-heading cells of the similar columns.

For example, with reference to FIGS. 4A to 4C, to identify the common data type, the at least one processor may compare the data in column headings for all combinations of columns of the tables 400A to 400C to identify similar terms. If the at least one processor identifies the same terms or terms having the same semantic meaning from column headings of a combination of the columns of the tables 400A to 400C, such as identifying the similar terms "Status," "Progress," and "Task Status" in the column headings 412, 424, and 436, respectively, the at least one processor may determine that the columns 410, 422, and 434 have the common data type.

In some embodiments, the data types of columns of a table may be stored (e.g., in a database) as metadata (e.g., labels or tags) associated with the columns. To determine the common data type, the at least one processor may search and compare the metadata. If the metadata of at least two columns indicate the same data type, the at least one processor may determine that the at least two columns have the common data type.

In some embodiments, to determine the common data type, the at least one processor may utilize one or more predetermined templates. The predetermined template may define a format for data. For example, a template defining that a dollar sign followed by a numerical value may represent a currency data type. A template defining that two to three two-digit numbers separated by a colon may represent a time data type. A template defining that strings of characters separated by commas conforming to a postal address format or numbers in degrees, minutes, and seconds (DMS) followed by one of the four letters "E," "W," "S," and "N" may represent an address data type. To determine the common data type of multiple columns, the at least one processor may determine whether contents (e.g., values of the non-heading cells) of the multiple columns are in the one or more predetermined templates. If so, the at least one processor may determine that the multiple columns have the common data type.

Consistent with disclosed embodiments, the at least one processor may be configured to perform an analysis of data in the similar columns to determine that the data in the similar columns share a common characteristic. A common characteristic of the similar columns in this disclosure may include a characteristic of contents of the similar columns, a characteristic of data types of the similar columns, or a characteristic in both contents and data types of the similar columns. For example, a common characteristic of the contents of the similar columns may include a common value (e.g., a keyword or a numeric value) in the column headings or non-heading cells of the similar columns. As another example, a characteristic of the data types of the similar columns may include a common data type (e.g., a text data type, an address data type, or a status data type) of the similar columns. In another example, a characteristic in both contents and data types of the similar columns may include a common value in the column headings of the similar columns and a common data type of the similar columns. The processor may perform the analysis of data in the similar columns to determine a shared common characteristic in any other manner such as determining that the similar columns contain at least one shared common characteristic or a plurality of common characteristics. In other embodiments, performing an analysis may include determining a score for at least one shared common characteristic and determining that columns are similar when the score exceeds a particular threshold.

By way of example, with reference to FIGS. 4A and 4C, the columns 410 and 434 may be the similar columns. The at least one processor may perform an analysis of the data in the columns 410 and 434 to determine that the data in the columns 410 and 434 share a common characteristic. The common characteristic may be a common value in the column headings (e.g., the common keyword "Status"). The common characteristic may be a common data type (e.g., the status data type) of the columns 410 and 434. The common characteristic may be a combination of the common value in the column headings (e.g., the common keyword "Status") and the common data type (e.g., the status data type) of the columns 410 and 434.

In another example, with reference to FIGS. 4B and 4C, the columns 418 and 430 may be the similar columns. The at least one processor may perform an analysis of the data in the columns 418 and 430 to determine that the data in the columns 418 and 430 share a common characteristic. The common characteristic may be a common data type (e.g., the address data type) of the columns 418 and 430.

In some embodiments, to determine the common characteristic, the at least one processor may implement operations in various manners. For example, with reference to FIGS. 4A and 4C, to determine the common characteristic of the contents, the at least one processor may compare the data in corresponding cells (e.g., column headings) of columns of at least two (e.g., the tables 400A and 400C) of the plurality of tables to determine whether a common value exist between at least two columns from the tables being compared. If so, the at least one processor may determine that similar columns exists between the at least two of the plurality of tables, and the similar column share a common characteristic. For example, with reference to FIGS. 4A and 4C, the at least one processor may determine that a common value (e.g., the common keyword "Status") exist between two columns (e.g., the columns 410 and 434) from the tables being compared (e.g., the tables 400A and 400C).

As another example, with reference to FIGS. 4B and 4C, to determine the common characteristic of the data types, the at least one processor may compare the data types in corresponding cells (e.g., non-heading cells) of columns of at least two (e.g., the tables 400B and 400C) of the plurality of tables and determine whether the common data type exists between at least two columns from the tables being compared. If so, the at least one processor may determine that similar columns exists between the at least two of the plurality of tables, and the similar columns share a common characteristic. For example, with reference to FIGS. 4B and 4C, the at least one processor may determine that a common data type (e.g., the address data type) exists between two columns (e.g., the columns 418 and 430) from the tables being compared (e.g., the tables 400B and 400C).

In some embodiments, to determine the common characteristic, the at least one processor may perform a conditional analysis. In an example, the at least one processor may determine whether the data in the similar columns share a common characteristic of data types (e.g., by searching and comparing the metadata associated with the similar columns or by utilizing one or more predetermined templates). If so, the at least one processor may determine that the common characteristic exists between the similar columns. Otherwise, the at least one processor may further determine whether the data in the similar columns share a common characteristic of contents. If so, the at least one processor may determine that the common characteristic exists between the similar columns. Otherwise, the at least one processor may generate options to be presented for a user to review and select which column to be used as the similar columns. It should be noted that operations of such a conditional analysis can be arranged in any order and is not limited to the examples as provided herein. For example, in some embodiments, the at least one processor may determine whether the data in the similar columns share a common characteristic of contents first, and if not, then determine whether the data in the similar columns share a common characteristic of data types.

In some embodiments, the common characteristic can be a location (e.g., a geographical location or a virtual location) in a common pre-stored library of related terms. A geographical location can be represented in various forms, such as a postal address, a city name, or a GPS coordinate. A virtual location be represented in various forms as well, such as a link to a website domain, a storage (e.g., repository for storing files), or any other manner of indicating or linking to any virtual location. A common pre-stored library in this disclosure may include pre-stored data aggregation (e.g., a database) that can be accessed by multiple devices (e.g., including the device having the at least one processor). The common pre-stored library of related terms, as used herein, may refer to a common pre-stored library that stores multiple manners, forms, or ways to represent the same location. For example, the common pre-stored library of related terms may be a database. Each entry of such a database may represent a location, and the entry may include multiple records (e.g., a postal address, a city name, or a GPS coordinate) for representing the location.

Consistent with disclosed embodiments, the at least one processor may be configured to aggregate information from the similar columns. Aggregating, as used herein, may refer to collecting, clustering, gathering, summing, amounting, compiling, accumulating, or any operation to form a collection, a mass, a whole, or a single body of objects from multiple objects. In some embodiments, the at least one processor may enable association of at least two of the plurality of columns having dissimilar headings. The headings may be dissimilar when the content of the headings are not identical in content (e.g., the words themselves are different) or format (e.g., language, font, shading, color, static vs. dynamic, and so on). For example, the content may be different when the text or meaning may be dissimilar (e.g., "Person" vs. "Status"). Another example of dissimilarity may include when the text or meaning are related but the text of the headings are different (e.g., "Deadline" vs. "Date"). In another example, while the meaning of the headings may be similar, one of the headings may be in English while the other of the headings may be in a different language such as in French (e.g., a different format).

By way of example, with reference to FIGS. 4A to 4C, the column headings 412, 424, and 436 (i.e., "Status," "Progress," and "Task Status," respectively) are dissimilar for the columns 410, 422, and 434, the at least one processor may enable association of the columns 410, 422, and 434 because the column headings 412, 424, and 436 include similar terms.

Consistent with disclosed embodiments, the at least one processor may be configured to output the aggregation of information in a manner associating information from the similar columns. The manner associating information from the similar columns may include a new table (or a new board) separated from the plurality of tables, a sub-table in at least one of the plurality of tables, a dashboard for showing the aggregation of information, or any other manner of presentation, storage and/or display associating the information from similar columns. In another example, the manner of associating information from the similar columns may involve treating the information contained in the similar columns as a having unified identity such that the data in the similar columns are summarized, aggregated, or reported in a single identity. For example, similar columns may include a "Status" column and a "Progress" column for tasks contained in two tables. In generating a unified report across the two tables, the data in the "Status" column and the "Progress" column may be unified to report a single summary for the "Status" or "Progress" of all items contained in the two tables.

Figure 5:
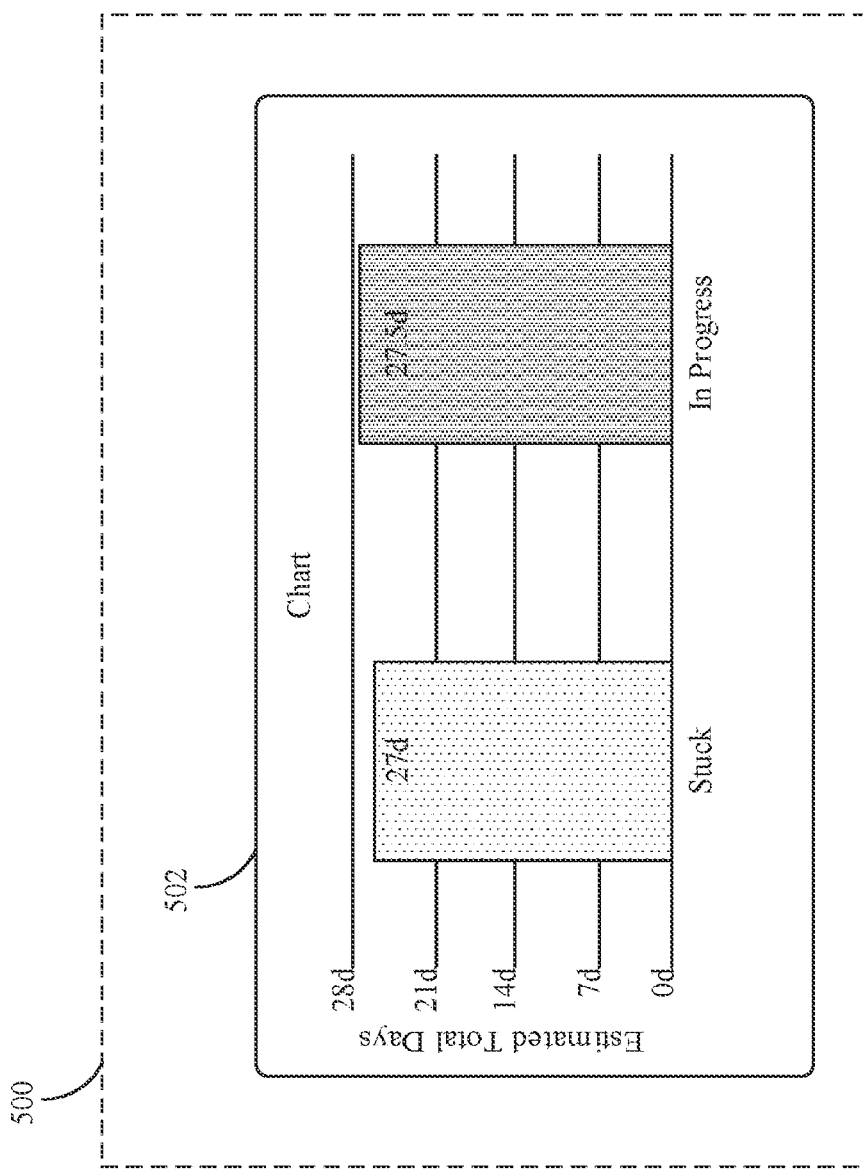
FIG. 5 illustrates an example of presentation of information aggregated from similar columns of multiple tables, consistent with some embodiments of the present disclosure.

FIG. 5 illustrates an example of a presentation of information aggregated from similar columns of multiple tables, consistent with embodiments of the present disclosure. The presentation in FIG. 5 includes a user interface 500 (e.g., a GUI). For example, the user interface 500 may include a webpage displayed on a screen of a device (e.g., a desktop computer or a mobile phone). The user interface 500 includes a dashboard (or a "widget") 502. For example, the dashboard 502 in FIG. 5 is a bar chart. The X-axis of the dashboard 502 may represent the task status information aggregated from the similar columns of the at least two of the plurality of tables (e.g., tables 400A, 400B, and 400C), and the Y-axis of the dashboard 502 may represent the estimated total days (e.g., a sum of the remaining days of the timeline starting from the current day of all the tasks) to complete the tasks. For example, the X-axis of the dashboard 502 includes two bars, labeled as "Stuck" and "In Progress," respectively, which may aggregate all the task statuses in the columns 410, 422, and 434 of FIGS. 4A to 4C. The estimated days to complete with statuses of "Stuck" of all tasks in the tables 400A, 400B, and 400C are summed or aggregated in the bar "Status" in the dashboard 502. The estimated days to complete with statuses of "In Progress" of all tasks in the tables 400A, 400B, and 400C are summed or aggregated in the bar "In Progress" in the dashboard 502.

As can be seen from the description in association with FIGS. 4A to 5, in response to receiving a request to consolidate information from at least two of the plurality of tables, the at least one processor may perform the analysis of the data in the similar columns of the at least two of the plurality of tables to determine that the data in the similar columns share a common characteristic. By aggregating and outputting the information of the similar column, a reviewer (e.g., a project manager) of the aggregated information may review a high-level summary of the information (e.g., the statuses) common to the tasks included in the plurality of tables without manual intervention (e.g., manual selection which tables to be analyzed or manual selection of which columns of the tables to be aggregated).

Consistent with disclosed embodiments, the at least one processor may further enable association of at least two of the plurality of columns containing data having dissimilar characteristics. For example, the plurality of columns may include a first table and a second table, in which the first table includes a first column of estimated time to complete tasks expressed in days, and the second table includes a second column of estimated time to complete tasks expressed in hours. The estimated time to complete tasks expressed in days and the estimated time to complete tasks expressed in hours are dissimilar characteristics. In some embodiments, if the data types of the first and second columns are defined in a predetermined template (e.g., allowing estimated time to complete tasks to be expressed in any unit of time, such as months, weeks, days, hours, minutes, or seconds), the at least one processor may enable association of the first and second columns despite they include dissimilar characteristics. In some embodiments, if the column headings of the first and second columns are the same or having the same semantic meaning, the at least one processor may enable association of the first and second columns even though they include dissimilar characteristics. For example, a first column may include timeline data while a second column may include due date data. While both the first and second columns may share a common heading "Progress," the first and second columns include dissimilar characteristics. Despite the differing column characteristics, the system may be able to associate the first and second columns in any manner, such as associating the last date of the timeline data in the first column as a due date to aggregate and combine the first and second column data.

Consistent with disclosed embodiments, the at least one processor may enable disassociation of at least two of the plurality of columns sharing common characteristics. For example, the at least one processor may receive a first request to consolidate information from a first set (e.g., at least two) of the plurality of tables, and enable association of similar columns of the first set of the plurality of tables. After that, the at least one processor may receive a second request to consolidate information from a second set (e.g., at least two) of the plurality of tables. Before enabling association of similar columns of the second set of the plurality of tables, the at least one processor may enable dissociation of the similar columns of the first set of the plurality of tables.

Consistent with disclosed embodiments, the at least one processor may cause a presentation of default options for merging column data. The presentation of an object, as used herein, may refer to a visual or graphical rendering of the object on a screen of a device. In some embodiments, a first table of the plurality of tables may include multiple columns (e.g., multiple status columns or location columns) that are similar to a column in a second table of the plurality of tables. In such cases, the at least one processor may cause a presentation of default options for merging column data. For example, the default options may include a menu for selecting which column to be used as the similar columns.

Figure 6:
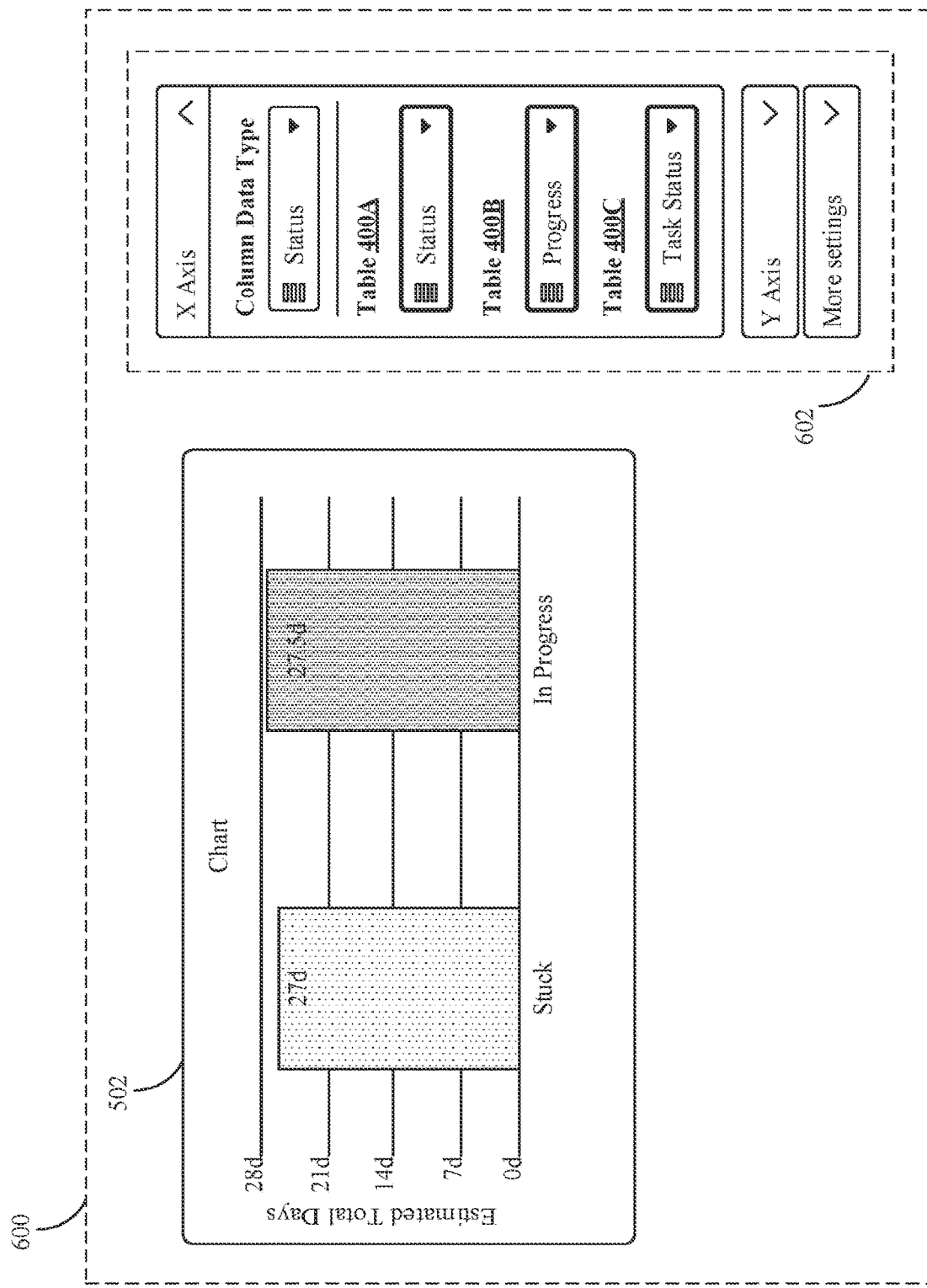
FIG. 6 illustrates an example of a user interface including options for merging column data, consistent with some embodiments of the present disclosure.

FIG. 6 illustrates an example of a user interface 600 including options for merging column data, consistent with embodiments of the present disclosure. The user interface 600 may be associated with the user interface 500 in FIG. 5. In some embodiments, the user interface 600 may be displayed using a computing device (e.g., the computing device 100 illustrated in FIG. 1) or software running thereon.

As illustrated in FIG. 6, the user interface 600 displays the same depiction of the dashboard 502 of FIG. 5, on its top-left portion. The user interface 600 also displays a user interface element 602 associated with the dashboard 500 on its right portion, including a panel for configuring which status columns to be treated as the similar columns for merging column data in the dashboard 502. For example, the user interface 602 (e.g., a floating panel, a popup window, a drop-down menu, or a new webpage) may be activated to be displayed after a user right clicking the dashboard 502 and select an item in a pop-up menu in response to the right click.

As illustrated in FIG. 6, the user interface element 602 may display the default options for merging data. For example, the user interface element 602 displays default options for selecting column data types (e.g., a status data type, an address data type, or a text data type). The user interface element 602 may also display default options for selecting columns having the selected column data type from tables with similar columns identified. For example, the identified similar columns may be the columns 410, 422, and 434 of the tables 400A, 400B, and 400C in FIGS. 4A to 4C, respectively. By providing the default options for selecting column data types and columns having the selected column data types, the at least one processor may provide flexibility for a user to adjust and update the aggregated information. For example, if the table 400C includes two columns showing task statuses (not shown in FIG. 4C), the user may use the user interface element 602 for selecting which column for merging data in the dashboard 502.

Figure 7:
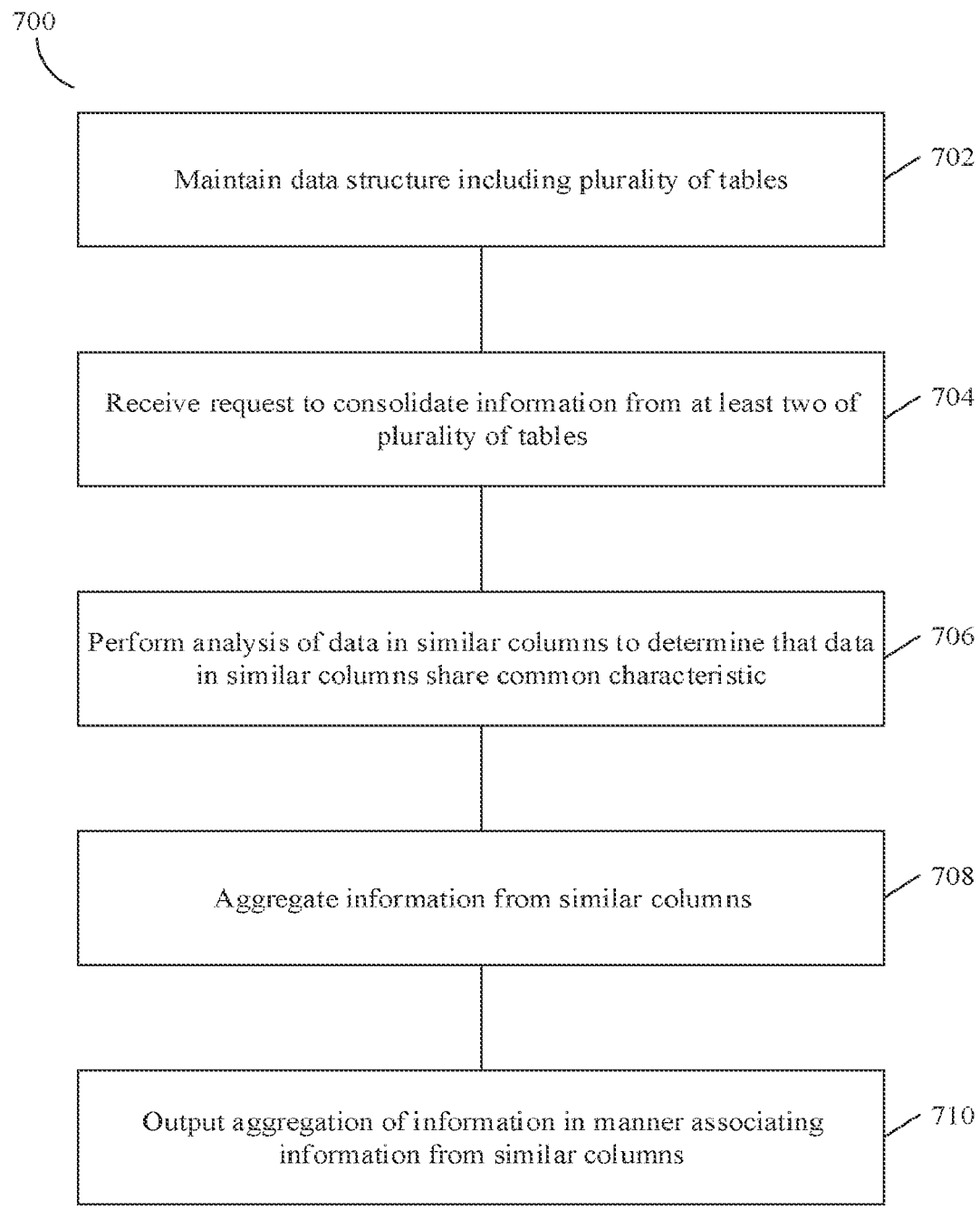
FIG. 7 is a block diagram of an example process for merging data, consistent with some embodiments of the present disclosure.

FIG. 7 illustrates a block diagram of an example process 700 for merging data, consistent with embodiments of the present disclosure. While the block diagram may be described below in connection with certain implementation embodiments presented in other figures, those implementations are provided for illustrative purposes only, and are not intended to serve as a limitation on the block diagram. In some embodiments, the process 700 may be performed by at least one processor (e.g., the processing circuitry 110 in FIG. 1) of a computing device (e.g., the computing device 100 in FIGS. 1-2) to perform operations or functions described herein, and may be described hereinafter with reference to FIGS. 4A to 6 by way of example. In some embodiments, some aspects of the process 700 may be implemented as software (e.g., program codes or instructions) that are stored in a memory (e.g., the memory portion 122 in FIG. 1) or a non-transitory computer-readable medium. In some embodiments, some aspects of the process 700 may be implemented as hardware (e.g., a specific-purpose circuit). In some embodiments, the process 700 may be implemented as a combination of software and hardware.

FIG. 7 includes process blocks 702 to 710. At block 702, at least one processor may maintain a data structure including a plurality of tables. Each table of the plurality of tables may include a plurality of rows and columns, with each of the plurality of columns having an associated column heading.

At block 704, the at least one processor may receive a request to consolidate information from at least two of the plurality of tables. The at least two of the plurality of tables may include similar columns with differing headings and a common data type. In some embodiments, the at least one processor may identify the common data type through an identification of similar terms used in the similar columns.

In some embodiments, the at least one processor may determine that at least two of the plurality of columns are similar based on shared column characteristics. For example, the shared column characteristics may include relative column positions. In another example, the shared column characteristics may include a data type contained in the at least two of the plurality of columns.

At block 706, the at least one processor may perform an analysis of data in the similar columns to determine that the data in the similar columns share a common characteristic. In some embodiments, the common characteristic may be a location in a common pre-stored library of related terms.

At block 708, the at least one processor may aggregate information from the similar columns. In some embodiments, the at least one processor may enable association of at least two of the plurality of columns having dissimilar headings.

At block 710, the at least one processor may output the aggregation of information in a manner associating information from the similar columns.

Consistent with disclosed embodiments, the at least one processor may further enable association of at least two of the plurality of columns containing data having dissimilar characteristics. In addition, the at least one processor may further enable disassociation of at least two of the plurality of columns sharing common characteristics and may additionally cause a presentation of default options for merging column data.

Aspects of this disclosure may provide a technical solution to challenges associated with collaborative work systems. Disclosed embodiments include methods, systems, devices, and computer-readable media. For ease of discussion, example hybrid systems for scaling tables having differing column types are described below with the understanding that aspects of the example systems apply equally to methods, devices, and computer-readable media. For example, some aspects of such systems may be implemented by a computing device or software running thereon. The computing device may include at least one processor (e.g., a CPU, GPU, DSP, FPGA, ASIC, or any circuitry for performing logical operations on input data) to perform the example systems, as described above. Other aspects of such systems may be implemented over a network (e.g., a wired network, a wireless network, or both).

"At least one processor" or a "processor" as used herein may constitute any physical device or group of devices having electric circuitry that performs a logic operation on an input or inputs. For example, the at least one processor may include one or more integrated circuits (IC), including application-specific integrated circuit (ASIC), microchips, microcontrollers, microprocessors, all or part of a central processing unit (CPU), graphics processing unit (GPU), digital signal processor (DSP), field-programmable gate array (FPGA), server, virtual server, or other circuits suitable for executing instructions or performing logic operations. The instructions executed by at least one processor may, for example, be pre-loaded into a memory integrated with or embedded into the controller or may be stored in a separate memory. The memory may include a Random Access Memory (RAM), a Read-Only Memory (ROM), a hard disk, an optical disk, a magnetic medium, a flash memory, other permanent, fixed, or volatile memory, or any other mechanism capable of storing instructions. In some embodiments, the at least one processor may include more than one processor. Each processor may have a similar construction or the processors may be of differing constructions that are electrically connected or disconnected from each other. For example, the processors may be separate circuits or integrated in a single circuit. When more than one processor is used, the processors may be configured to operate independently or collaboratively, and may be co-located or located remotely from each other. The processors may be coupled electrically, magnetically, optically, acoustically, mechanically or by other means that permit them to interact.

Disclosed embodiments may include and/or access a data structure. A data structure consistent with the present disclosure may include any collection of data values and relationships among them. The data may be stored linearly, horizontally, hierarchically, relationally, non-relationally, uni-dimensionally, multidimensionally, operationally, in an ordered manner, in an unordered manner, in an object-oriented manner, in a centralized manner, in a decentralized manner, in a distributed manner, in a custom manner, or in any manner enabling data access. By way of non-limiting examples, data structures may include an array, an associative array, a linked list, a binary tree, a balanced tree, a heap, a stack, a queue, a set, a hash table, a record, a tagged union, ER model, and a graph. For example, a data structure may include an XML database, an RDBMS database, an SQL database, or NoSQL alternatives for data storage/search such as, for example, MongoDB, Redis, Couchbase, Datastax Enterprise Graph, Elastic Search, Splunk, Solr, Cassandra, Amazon DynamoDB, Scylla, HBase, and Neo4J. A data structure may be a component of the disclosed system or a remote computing component (e.g., a cloud-based data structure). Data in the data structure may be stored in contiguous or non-contiguous memory. Moreover, a data structure, as used herein, does not require information to be co-located. It may be distributed across multiple servers, for example, that may be owned or operated by the same or different entities. Thus, the term "data structure" as used herein in the singular is inclusive of plural data structures.

As another example, some aspects of such systems may be implemented as operations or program codes in a non-transitory computer-readable medium. The operations or program codes may be executed by at least one processor. Non-transitory computer readable mediums, as described herein, may be implemented as any combination of hardware, firmware, software, or any medium capable of storing data that is readable by any computing device with a processor for performing methods or operations represented by the stored data. In a broadest sense, the example systems are not limited to particular physical or electronic instrumentalities, but rather may be accomplished using many differing instrumentalities.

Some disclosed embodiments may relate to a hybrid system for scaling tables having differing column types having at least one processor (e.g., a CPU, GPU, DSP, FPGA, ASIC, or any circuitry for performing logical operations on input data) in collaborative work systems, including methods, devices, and computer-readable media. A hybrid system, as used herein, is a system that may exhibit both continuous and discrete modes for scaling, as described in further detail below. The hybrid system is not limited only to exhibiting only hybrid modes of scaling, but may include just continuous or discrete modes of scaling. The hybrid system for scaling may be enabled, adjusted, altered, modified, adapted, or changed manually or automatically between the continuous and/or discrete modes according to users' preferences. Moreover, in another embodiment, the hybrid system may toggle or switch from the continuous mode to the discrete mode, or vice versa. A continuous mode for scaling may refer to smoothly transitioning between differing and/or similar ranges within a scale. A range in a scale, as referred herein, may include but not limited to one or more values that may be represented as numbers, letters of the alphabets, alpha-numeric values, syntax, or mathematical expressions, or any other representation thereof. In another embodiment, the continuous mode of scaling may refer to smoothly transitioning between the range in a scale that may be in consecutive and/or non-consecutive orders. In yet another embodiment, the continuous mode of scaling may refer to smoothly transitioning within the range in a scale that may be arranged in sequences that linearly and/or non-linearly skip over a single unit, multiple units, exponential units, or one or more factors in consecutive and/or non-consecutive orders. The continuous mode of scaling may occur at one or more different rates of change in scaling for the same or different representations. A discrete mode of scaling may refer to jumping, snapping, toggling, or suddenly stopping at one or more ranges that may be in consecutive and/or non-consecutive orders. In another embodiment, the discrete mode of scaling may refer to jumping, snapping, toggling, or suddenly stopping at one or more ranges that may be arranged in sequences that linearly and/or non-linearly skip over single unit, multiple units, exponential units, or one or more factors in a consecutive and/or non-consecutive orders. In yet another embodiment, the discrete mode of scaling may occur at one or more different rates of change in scaling for the same or different representations.

Scaling or scale may refer, as used herein, to one or more linear and/or non-linear geometric transformations that may, separately and/or simultaneously, enlarge and/or diminish one or more images or views of, including but not limited to, one or more cells, rows, columns, icons, tables, boards, dashboards, internet links, folders, timelines, views, schedules, tasks, descriptions, calendars, widgets, or any other data structure or combination thereof. Scaling may occur at different or similar rates of change of one or more images together or separately. Scaling may also include swapping one or more images for one or more cells, rows, columns, icons, tables, boards, dashboards, internet links, folders, timelines, views, schedules, tasks, descriptions, calendars, widgets, or any other data structure of combination thereof, and vice versa. Scaling of a table may be implemented in response to any interaction such as with a gesture (e.g., by hand, a swipe, a tap), any signal from an interface (e.g., a cursor hover, cursor selection, keyboard selection, a touchscreen), or any other interaction with the system or combination thereof. Furthermore, scaling of a table may be implemented by a combination of the preceding options mentioned above.

A table may be synonymous to a board, as described above. A table may include a structure of rows and columns consisting of cells at the intersections of rows and columns, as disclosed herein. Cells may include a box or other space reserved to display information or the absence of information within the table as delineated by the intersection of a horizontal row and a vertical row. A table may refer to one or more tables that may be in the form of a two-dimensional, three-dimensional, and/or multiple dimensional tables. Tables presented in greater than two dimensions may be simulated on a two-dimensional display or may be presented holographically or through virtual glasses or other virtual displays, as described herein. Column types may refer to characteristics associated with one or more columns in one or more tables. A column in a table may display one or more cells in a vertical or horizontal arrangement. Cells in one or more columns may share the same or different characteristics where each cell may share the same or different information in size, color, format, constraints on the format, values, objects, images, views, orientations, or displays. Similarly, columns in one or more table may share the same or different characteristics where each column may share the same or different information in size, color, format, constraints on the format, values, objects, images, views, orientations, or displays. A column type may include one or multiple characteristics. For example, a column type may be associated with a status, person, list of text or numbers, time, timeline, date, icon of checkbox, file location, hyperlink, metadata, address, contact information, a mirrored column (e.g., duplicated information or linked to other sources of information), or any other data type that may be contained in a column. Moreover, a column type may be any combination of one or more previously listed characteristics mentioned above, or any other appropriate characteristics thereof.

Figure 8:
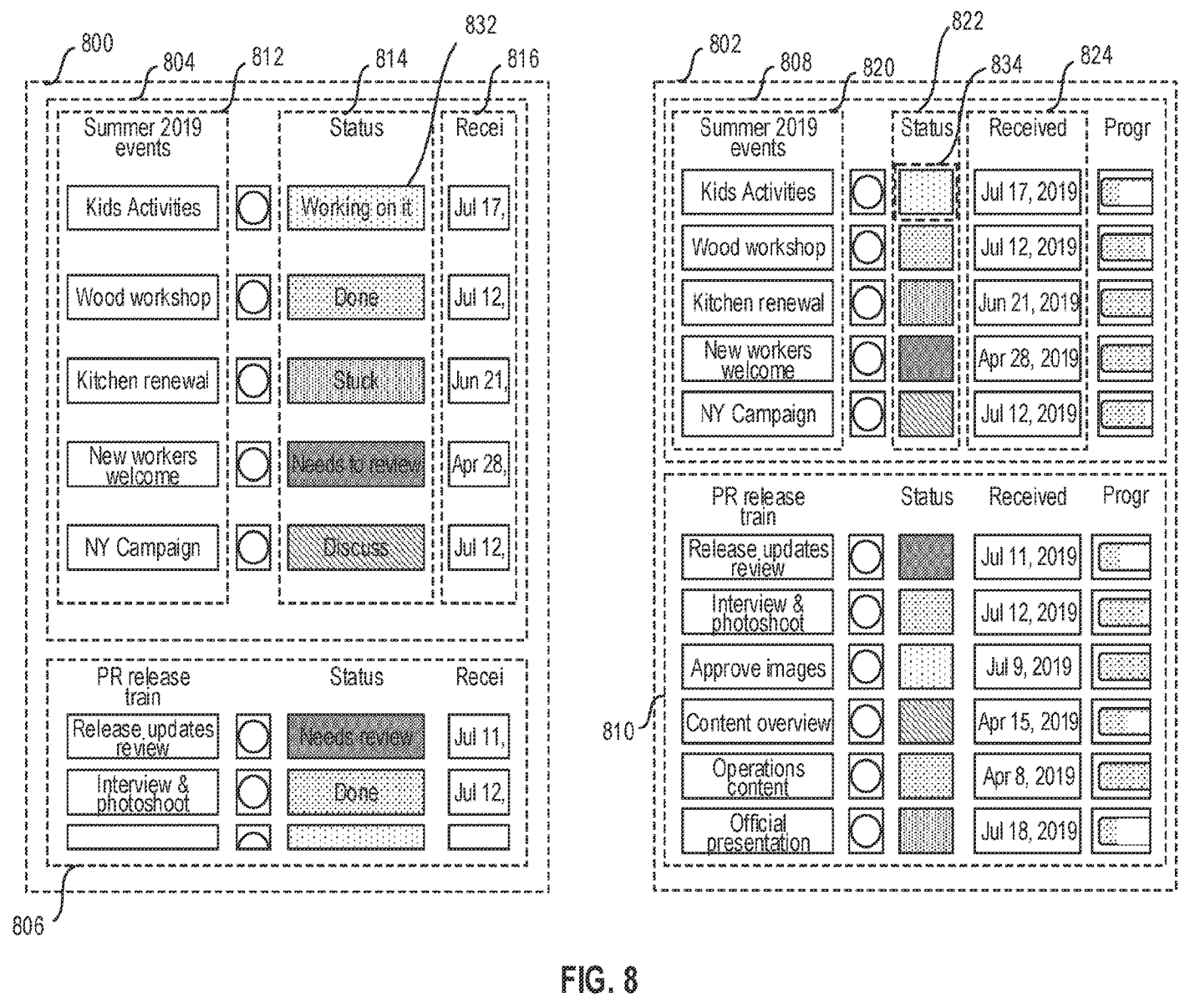

FIG. 8 illustrates exemplary views of hybrid scaling for tables having differing column types, consistent with some embodiments of the present disclosure. FIG. 8 includes zoomed in view 800 displaying zoomed in table 804 to zoomed out table 806 and zoomed out view 802 displaying zoomed out table 808 to table 810. Zoomed in table 804 in zoomed in view 800 may be associated with zoomed out table 808 in zoomed out view 802. Zoomed in table 806 in zoomed in view 800 may also be associated with zoomed out table 810 in zoomed out view 802. Exemplary zoomed in table 804 and zoomed out table 806 may contain one or more columns and may include a different number of columns from each other. Each table from zoomed in view 800 and zoomed out view 802 may contain one or more columns having the same or different column types. For example, event column 812 may purely scale in size from zoomed in view 800 to zoomed out view 802 (i.e., event column 820, while status column 814 may change in rendering (e.g., changing what information is displayed) from zoom in view 800 to zoomed out view 802 (i.e., status column 822).

Consistent with disclosed embodiments, at least one processor of the system may carry out operations that may involve maintaining a zoomable table having a plurality of columns, at least some of which display differently depending on zoom level. Maintaining a table or an object (e.g., digital data objects and/or tables, collectively referred to below as an "object"), as used herein, may refer to any means for the system to store the object or a link to the object. For example, the system may store the object or the link to the object in a non-transitory computer-readable medium or any other memory capable of storing information related to the object.

Zoomable tables having a plurality of columns may refer herein to tables capable of being presented on any graphical user interface (e.g., a display screen and/or holographic display) enabled to be interacted with to adjust the scaling of the display of the table to view modified, enlarged, or diminished presentations of information contained within the tables. Zooming a display of a table may allow panning in two or more dimensions to zoom (enlarge and/or diminish) into and/or away from objects of interest. For example, for zooming a display of a table containing text information (e.g., an email message containing text), the text information may be represented as a small dot (e.g., fully zoomed out), then a thumbnail of the text information (e.g., slightly zoomed in), then a full-sized page of the text information, and finally a magnified view of the text information (e.g., fully enlarged and zoomed in on certain parts of the text information), or vice versa. As used herein, "zoomable" may be synonymous to scaling, as previously discussed above.

In some embodiments, tables may include a plurality of columns, at least some of which display differently depending on zoom level. Columns displaying differently depending on zoom level may refer herein to different columns having different characteristics being presented differently based on a level of enlarging or diminishing the information in each of the columns. For example, a difference in display may include purely changing the size of the information displayed in a column. In other embodiments, the difference in display may include rendering the information in a column completely differently when that column reaches a certain level of enlarging or diminishing in a display. Zoom level may refer herein to an indication of degree of scaling of information contained in any data structure (e.g., a table), as described above. In one embodiment, a room level may be indicated by a percentage (e.g., 100% zoom, 110% zoom, 50% zoom), a range (e.g., 90-100%, 110-115%), a discrete value (e.g., level 1, level 2, level 3), or a combination thereof. Zoom level may refer to one value or multiple ranges in a scaling range. For example, a scaling range may contain one or more zoom levels; thus, a zoom range (e.g., scaling range) may contain one or more zoom levels.

Figure 9:
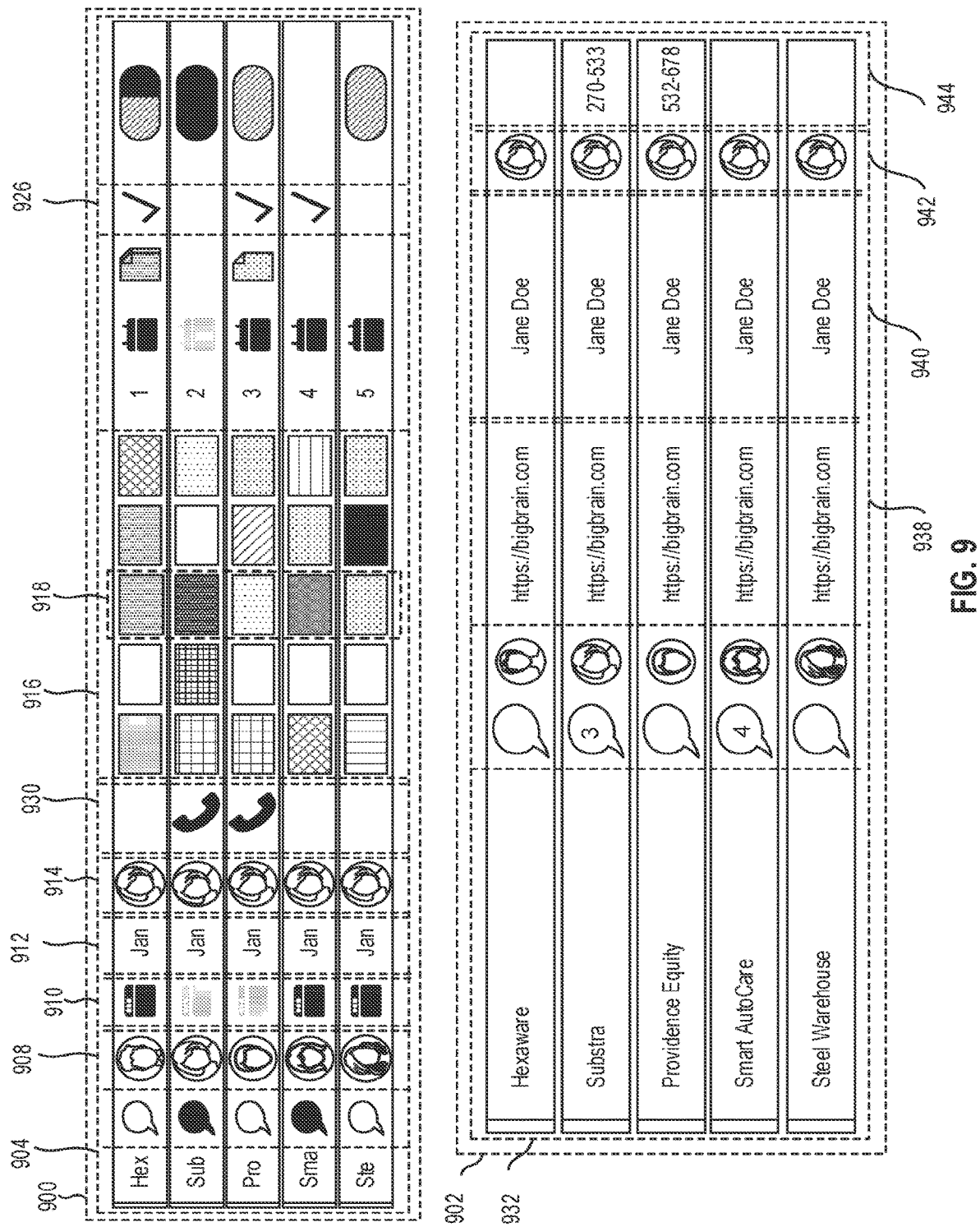
FIG. 9 illustrates example views of a zoomable table having a plurality of columns, consistent with some embodiments of the present disclosure.

By way of example, the system may maintain an object (e.g., a zoomable table) by storing it in the memory 120 in FIG. 1, the storage 130 in FIG. 1, or both. FIG. 9 illustrates example views of a zoomable table having a plurality of columns, consistent with some embodiments of the present disclosure. FIG. 9 may include a zoomed out view 900 and zoomed in view 902. Zoomed out view may include a zoomable table having a plurality of columns such as column 904 to column 930, which may be associated with zoomed in view's plurality of columns. For example, the table in zoomed out view 900 may contain a plurality of columns that may be visible at a first zoom level, but, as a result of scaling to a second zoom level in zoomed in view of 902, fewer columns may be visible. For example, zoomed in view may contain a plurality of status column 916, but the same plurality of status column may not be visible in the zoomed in view. In addition, some of the columns in the zoomed in view may change in size when scaled from one zoom level to another in zoomed out view. For example, the text column 904 in zoomed out view may have a smaller column width; however, the same text column 932 in zoomed out view may have a larger width. Similarly, text column 904 may display fewer texts in the zoomed in view, but the same text column 932 may display more text in zoomed out view.

Consistent with disclosed embodiments, at least one processor of the system may carry out operations that may involve storing for a first column, a first column template associated with a first zoom range, wherein the first column template is configured to display information in a first format configured to scale within the first zoom range. Storing an object (e.g., a digital data object) may refer to any means for the system to persistently save and manage the object or provide a link to the object. For example, the system may store the object or the link to the object in a non-transitory computer-readable medium. By way of example, the system may maintain the object by storing it in a memory of a local device or in a remote repository or storage. A first column, as used herein, may refer to one or more columns in one or more tables, as described above. The first column may also refer to the position or order of one or more columns in one or more tables. A first column template, as used herein, may refer to one or more layouts, styles, characteristics, boilerplates, formats, patterns, overlays, and/or column types for applying and/or displaying the first column, as previously discussed. The first column template may be included for particular zoom levels or ranges and may be provided with a specific rate of scaling. In some embodiments, the first column template may include one or more column types, zoom levels, zoom ranges, or any combination thereof. The first column template may be associated with the first zoom range in the first column of a zoomable table. The first column template may be edited or changed to result in a change in display of the first columns. "Associated with a first zoom range" as used herein may refer to a linkage and/or to processes or procedures of establishing a relationship, link, or connection to one or more zoom levels, as described above, in a zoom range. The zoom range may include a range, as described above, within a scale of consecutive and non-consecutive order of numeric, alphabetic, and/or a combination thereof. In yet another non-limiting example, a zoom range may be associated with a range from 0-50, A-Q, A0-A50; A-Q50, or any combination thereof. Configuring or configure the first column template, as used herein, may refer to a process or procedure to set up the object for operating or displaying in a particular way. Displaying information, as used herein, may include presenting any data or rendering any data virtually through a device with a screen, a projector, augmented reality (AR) or virtual reality (VR) glasses, or through a holographic display. Information may include any data or characterizations of data. Information may reflect representative characteristics or features of values in one or more columns of one or more tables and in at least some detail. A first format, as used herein, may include a manner of display. For example, the first format may refer to an arrangement, typesetting of elements, size standards, standard characteristics, and/or structure of information within at least one cell, at least one column, or a combination thereof. The first format may include one or more of graphical or alphanumerical presentations. In some embodiments, the first column template may display information inside the cells of a first column according to a first format where the first format may remain the same or change within zoom levels in a first zoom range.

The at least one processor of the system may also carry out operations that may include storing for the first column, a second column template associated with a second zoom range different from the first zoom range, wherein the second column template is configured to display information in a second format different from the first format, and wherein the second column template is configured to scale within the second zoom range. A second column template, similar to the first column template, may refer to one or more layouts, styles, characteristics, boilerplates, formats, patterns, overlays, and/or column types for applying and/or displaying the second column. It may differ from the template of the first column template, as described above. The second column template may also include zoom levels, ranges, multiple rates of scaling, and/or zoom ranges, as discussed above. The second column template may also be edited or changed to display the one or more first columns differently from the original first column template. In other exemplary embodiments, the second column template may be the same or different from the first column template.

By way of example, FIG. 8 illustrates example status column 814 in zoomed in view 800 and the same status column 822 in zoomed out view 802. In the zoomed in view, the status column 814 may display a plurality of large colored and textured boxes containing texts; however, in the zoomed out view, the same status column 822 may only display a plurality of small boxes with no text. The first format of status column 814 in zoomed in view may be the color, texture, and font of the text of the boxes. The first zoom range may be one or more zoom levels establishing the sizes of the boxes and texts. Similarly, the second format of status column 822 in zoomed out view may only be the color and texture of the boxes, and the second zoom range may establish the sizes of the boxes. As status column 814 in zoomed in view may be scaled to the same status column 822 in zoomed out view, the display of information transitions from the first format to the second format and from a first zoom range to a second zoom range. For example, a first format template of status column 814 may be configured to maintain the same first format and increase or decrease the sizes of the boxes between zoom levels 50 and 100 in the first zoom range. However, zoomed out view of the same status column 822 may switch to the second column template configured to display the second format between zoom levels 49 to 1. The second zoom range may have a plurality of sizes for the box that may be different from the first zoom range.

In some embodiments, the first format may include a display of words in a column and the second format may substitute graphical indicators for the words. Display of words in a column may include a rendering of a string of one or more letters of the alphabet in any language, numbers, mathematical expressions, symbols, a syntax, equations, or any combination thereof. The display of words may include phrases, clauses, sentences, or any combination thereof. Furthermore, in some embodiments, the display of words may include images or icons forming one or more letters of the alphabet, numbers, mathematical expressions, equations, phrases, clauses, and/or sentences, or any combination thereof. The display of words may be in one or more cells in a column of a zoomable table. "Substitute" may refer to scaling, transforming, swapping, reinterpreting, fading, transitioning, replacing, switching, changing, trading, or a combination thereof. Substituting may occur manually or automatically, according to a default or a user preference. Graphical indicators may refer a rendering of one more visual representations of information that may or may not include alphanumerics. For example, graphical indicators may include representations of images, colors, icons, symbols, shadings, textures, or any other representation that may be displayed, or a combination thereof. Graphical indicators may be displayed graphically or dynamically. Some cells of the zoomable table may include static displays of information while other cells of the zoomable table may include dynamic or animated displays of information. Graphical indicators may be selected from a default pick list or may be customized and uploaded for later application.

By way of example, FIG. 8 illustrates an example of how at least one processor displays a first column 814 in a first format in zoomable table 804 of zoomed in view 800. The first format of column 814 may include the display of words in a cell that may include graphics to indicate information (e.g., status information such as "Working on it" in cell 832). In response to an interaction that may activate a scaling of the zoomable table 804, the at least one processor may substitute the first format in the first column 814 with a second format as illustrated by the same first column 822 of zoomable table 808 in zoomed out view 802. In response to a specific zoom level, the system may substitute and re-render the status column 814, which originally included a display of words, with a new rendering in a second format that removes the words for a purely graphical display, such as the display of cell 834. The second format illustrated in column 822 may include a graphical indicator, such as a smaller colored box, that may represent the same information as cell 832.

In another exemplary embodiment, FIG. 9 illustrates a particular column type displaying words in the second format in the form of one or more weblinks in the first column 938 of zoomed in view 902. The second format of the first column 938 may be substituted for a first format of the same first column 910 in zoomed out view 900 where the display of words may be substituted for a graphical indicator, such as a symbol and/or icon having the same or equivalent meaning to the user that the graphical indicator may refer to one or more weblinks. In another example, the second format may display a first column 944 with alphanumerics (e.g., a telephone number) in zoomed in view 902 that may be substituted for a graphical indicator (e.g., an image or icon of a phone) in the first format of the same first column 930 in zoomed out view 900.

In some embodiments, the first format may include a display of a first volume of information and the second format may include a display of a second volume of information different from the first volume of information. A volume of information may refer, as used herein, to a quantity, size, area, space, substance, shape, proportion, occupancy of information, as described above, in a two or more dimensions. For example, a display of a volume may include a depiction of a two or three dimensional container with varying levels of solids or liquids. In another embodiment, a display of a cell may be one size in a first format, which may be displayed in a second format in the form of a second size. In another example, a display of volume may be represented by a depiction of an increased count of an indication, such as a tally, a static object, a dynamic object, or any other depiction of a count. In yet another example embodiment, a display of volume may occur through a depiction of a gauge, such as a pie chart, a meter, a progress bar, or any other representation of a percentage of progress that may be represented by a volume.

Figure 10:
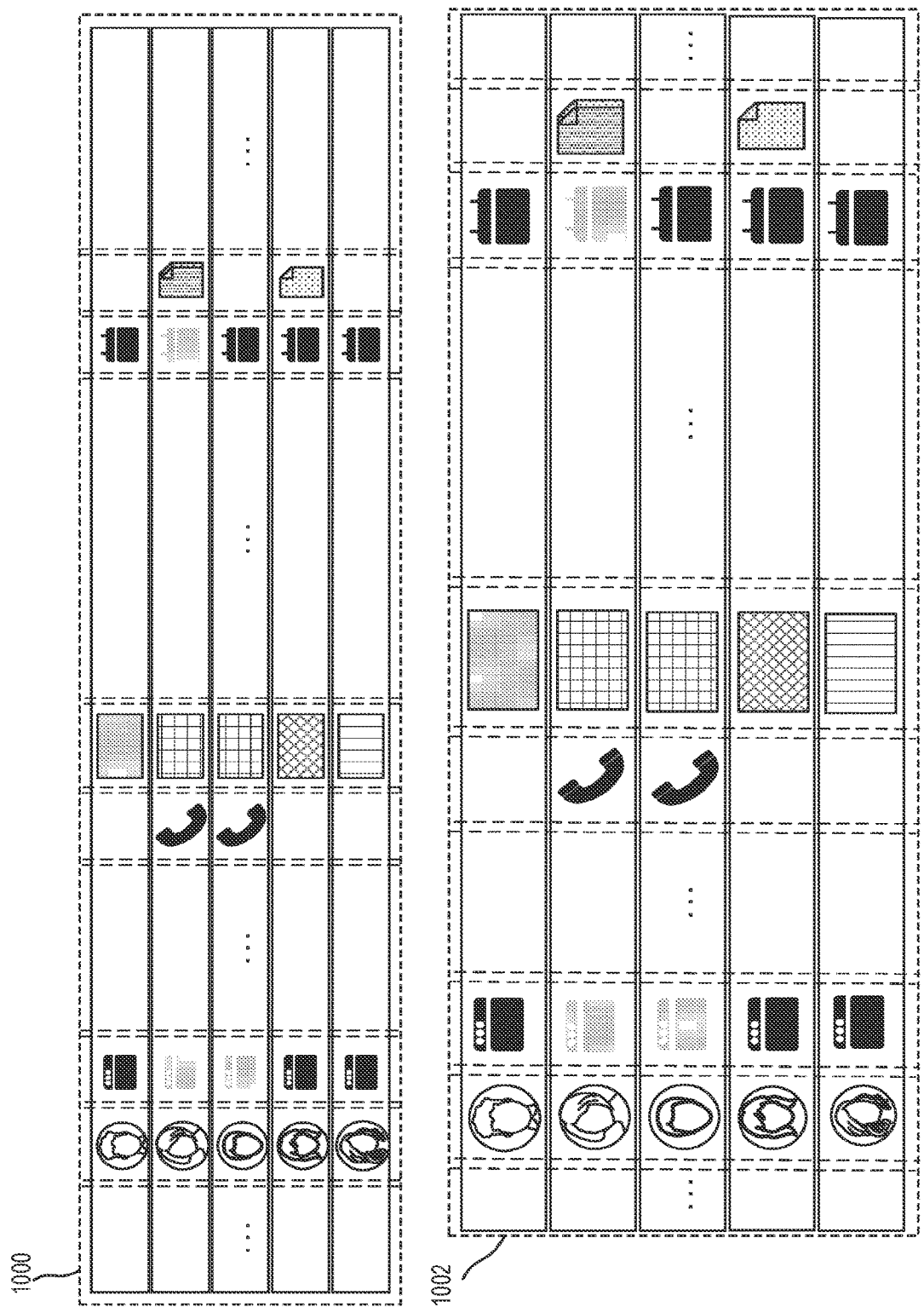
FIG. 10 illustrates example views of a zoomable table having a plurality of scaled volumes of information, consistent with some embodiments of the present disclosure.

FIG. 10 illustrates an example of a first volume of information in zoomed out view 1000 displaying a plurality of small icons in a first format, but the same icons in zoomed in view 1002 may display a second volume of information in a second format that may be larger in size. In another exemplary embodiment, FIG. 9 illustrates a second format for a second volume of information displaying words in small cell sizes in first column 912 of zoom out view 900. However, the first format for the same first column 940 in zoomed in view 902 may display a first format in a first volume of information with words in larger cell sizes. The first volume of information may be the same, similar, or different from the second volume of information.

In some embodiments, the first format is a timeline view and the second format is a calendar view. Timeline view may refer to a display of events in chronological and/or random order. For example, the timeline view may include one or more progress bars that may be labelled with dates (e.g., a start and end date or a date range). Furthermore, the timeline view may be displayed on a Gantt chart in any time scale (e.g., a linear and/or non-linear scale, exponential scale, and/or logarithmic scale). Moreover, the timeline view may refer to the display of one or more sequences of dates and/or time in any geometric organization (e.g., one or more chronological and/or random of events adjacent, on top, below, next to each other). A calendar view may refer to displaying periods of time (e.g., one or more days, one or more weeks, one or more months, one or more years, or any combination thereof) via a graphical representation associated with a calendar, such as a one or more-dimensional table. Furthermore, a calendar view may simply refer to a display of information based on any time increment in any format.

By way of example, FIG. 11 illustrates example first format being a calendar format shown in first column 1100 which may be substituted by a second format being a timeline format of the same first column 1102 in response to scaling the first column.

Consistent with disclosed embodiments, at least one processor of the system may carry out operations that may involve switching from a first column template to a second column template when the first column is scaled to an outer limit of the first zoom range. Switching may be synonymous to substituting, as described above, where the second column template may be swapped for the first column template, or vice versa, when a threshold (one or more points or zoom levels) in a scale or zoom range may be crossed. An outer limit may refer to one or more points or zoom levels that may extend and/or pass beyond a permissible and/or possible threshold. For example, the first zoom range may have zoom levels 1 to 5 where the outer limit, being the zoom level 6, may trigger switching from the first column template or format (e.g., between zoom levels 1 to 5) to the second column template and/or another column template or format (e.g., between zoom levels 6 to 10).

Figure 12:
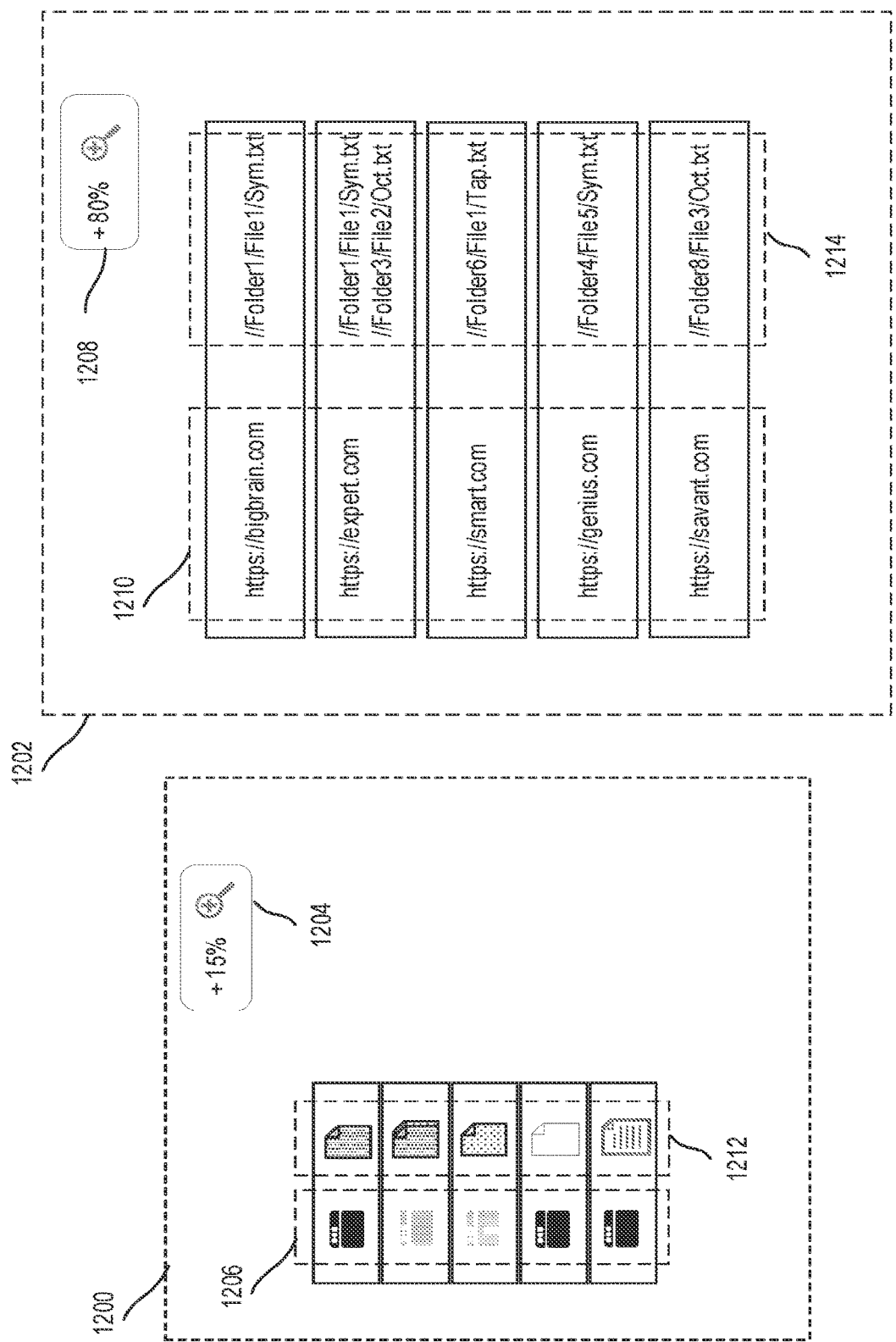
FIG. 12 illustrates an example screen shot of switching from a first column template to a second column template when crossing an outer limit of zoom range, consistent with some embodiments of the present disclosure.

By way of example, FIG. 12 illustrates an example zoom out view 1200 associated with a first zoom range (e.g., zoom levels ranging from 1% to 50%) and zoom in view 1202 associated with a second zoom range (e.g., zoom levels ranging from 51% to 100%). In the zoom out view, a first column template may be displayed with a zoom level 1204 of 15% for weblink column 1206 showing a plurality of weblink icons. As a result of passing a threshold defined by zoom level 50% in the first zoom range of zoom out view, zoom in view with a zoom level 1208 of 80% may display the same weblink column 1210 having switched to the second column template displaying words for weblinks. Similarly, in zoomed in view, file location column 1212 may display a plurality of file icons for a first column template, but when the threshold zoom level of 50% is passed in zoom out view due to simply scaling, the same file location column 1214 may switch to the second column template displaying words for file locations. In another exemplary embodiment, FIG. 9 illustrates switching between column templates that may simply scale the first column template of the first columns 916 in zoomed out view 900 having zoom levels of 1 to 100 for the first zoom range to second column template having the zoom level 0 for the second zoom range where the first columns 916 may not be visible in zoomed in view 902.

In some embodiments, the at least one processor may be further configured to receive a request to replace the second column template with the first column template, the first column template being scalable across the first zoom range and the second zoom range. A request may refer to an electronic signal containing instructions that may be configured to trigger an alteration to data. The request may be in one or more digital, electronic, and/or photonic signals that may be received via a voice command, gesture, touch, tap, swipe, a cursor selection, cursor scrolling, or a combination thereof. "Replace" may be synonymous with substitute, as previously discussed above. "Scalable across" may refer to an ability to scale, consistent with the previous disclosure. For example, where a column may be associated with a first column template at a first zoom range and a second column template at a second zoom range, replacement of the second column template for the first column template may create an experience of the column maintaining the first column template across the first and second zoom ranges. As a result, the column may then purely scale (e.g., changing only in size of the information contained in the column) across the first and second zoom ranges without re-rendering a different display format.

Figure 13:
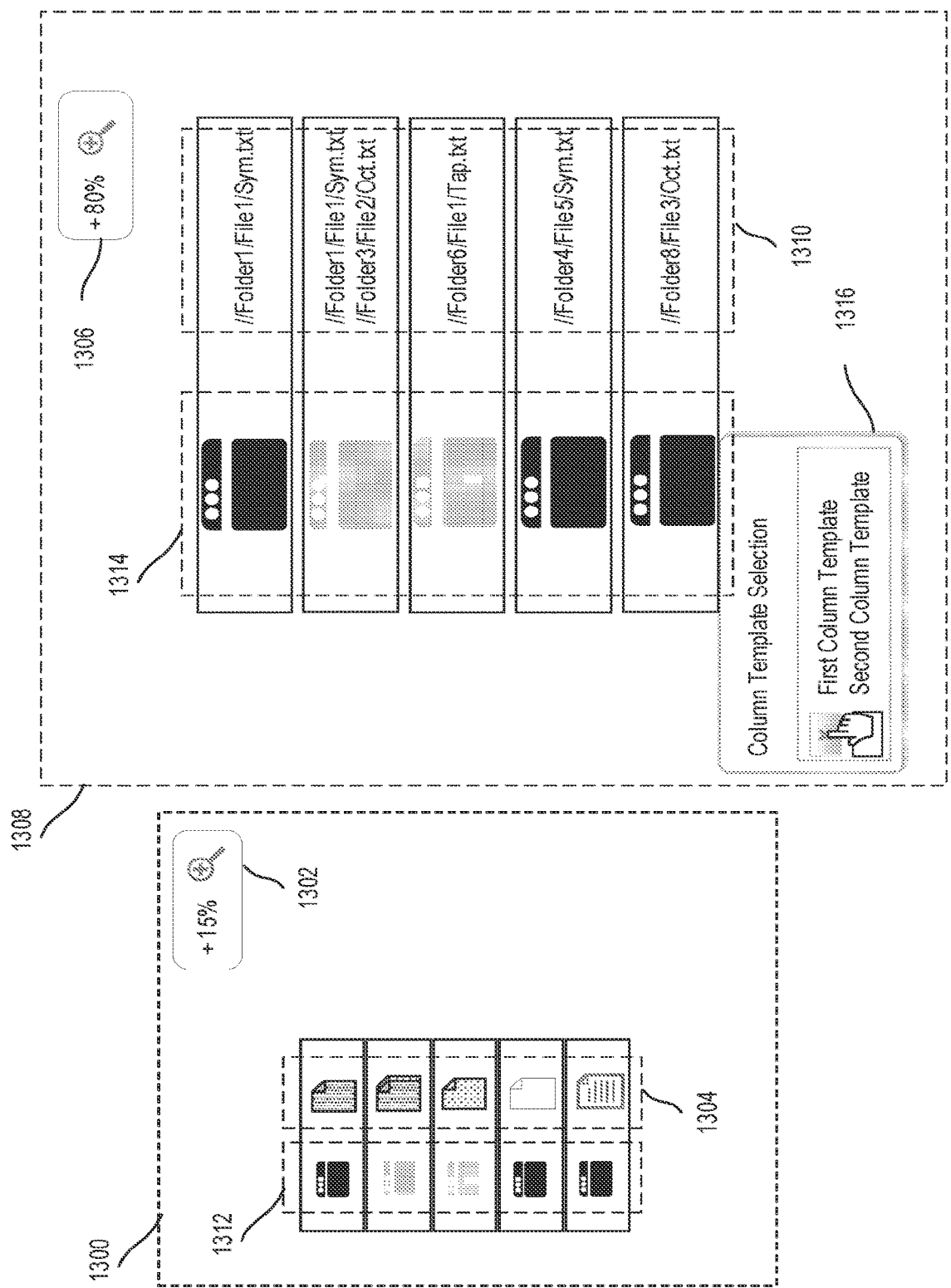
FIG. 13 illustrates a screen shot depicting replacement of a second column template with a first column template scalable across a full zoom range upon a request, consistent with some embodiments of the present disclosure.

By way of example, FIG. 13 illustrates an example of zoomed out view 1300 with zoom level 1302 of 15% displaying file location column 1304 with a plurality of file icons for a first column template. As a result of simply scaling to zoom level 1306 of 80% in zoomed out view 1308, the same file location column 1310 may display words for file locations for a second column template. However, simply scaling across the first zoom range (e.g., zoom levels ranging from 1% to 50%) in zoomed out view to the second zoom range (e.g., zoom levels ranging from 51% to 100%) in zoomed in view may maintain the same first column template for weblink column 1312 displaying a plurality of small icons to the same weblink column 1314 displaying larger icons as a result of requesting the first column template 1316. In other words, in the example of FIG. 13, when scaled from zoomed out view 1300 to zoomed in view 1308, the graphic in column 1312 simply scales-up in size, but the file location column completely changes format from a file icon in column 1304 to a file location in column 1310.

Consistent with disclosed embodiments, at least one processor of the system may carry out operations that may involve storing for a second column, a third column template configured to scale across the first zoom range and the second zoom range. A second column, as used herein, may refer to any column different from a first column, as described above. A third column template, as used herein, may refer to a different template from the first and second column templates as previously discussed. The third column template may also include zoom levels, ranges, rates of scaling, scalings, and/or zoom ranges, as described above. For example, the third column template may be configured to purely scale across a first zoom range (e.g., 0-50%) and a second zoom range (e.g., 51-100%) such that the second column will maintain the same display format and change only in size across a full zoom range (e.g., 1-100%).

FIG. 8 illustrates an example of received date column 816 of table 804, which may be the second column, having a third column template that may scale across a first zoom range and second zoom range such that the same received date column 824 in table 808 may maintain the same format at any zoom level.

Consistent with disclosed embodiments, at least one processor of the system may carry out operations that may involve enabling simultaneous zooming of the first column and the second column such that during simultaneous scaling from the first zoom range to the second zoom range, the display format of the first column changes and the display format of the second column remains unchanged. Enabling, as used herein, may refer to the capacity of the at least one processor to respond or react to events and/or conditions such as a request, as described above, to execute hybrid scaling of zoomable tables having differing column types. Furthermore, enabling may refer to the capacity of the at least one processor to not respond or react to events and/or conditions such as a request to execute hybrid scaling of zoomable tables having differing column types. Simultaneous zooming may refer, as used herein, to the technique of scaling multiple columns (e.g., first column, second column, and/or other column) contained in a table at the same time. Simultaneous scaling may refer, as used herein, to the technique of changing the dimensions of the multiple columns contained in the table at the same time at the same zoom level. Simultaneous scaling may result in different columns scaling at different rates depending on the column template format. For example, a first column may be configured to switch from a first format in a first zoom range (e.g., 1-50%) to a second format in a second zoom range (e.g., 51-100%) while a second column may be configured to maintain a single format (e.g., a third format) that remains unchanged across the entire zoom range (e.g., 1-100%). A format remaining unchanged refers to maintaining the same visual display of the information regardless of the zoom level in a full zoom range.

FIG. 9 illustrates an example of a first column 926 in zoomed out view 900 which may display a first format consisting of a plurality of checkmark icons in the first zoom range (e.g., zoom levels ranging from 1% to 25%), but as a result of scaling to the second zoom range (e.g., zoom levels ranging from 26% to 100%), the same first column 926 may not be visible as a second format in zoomed in view 902. However, while the first column 926 may scale across its zoom ranges in the zoomed out view to the zoomed in view, a second column 908 may simultaneously scale across the first zoom range and second zoom range by displaying the same second column 942 remaining unchanged in its format.

In some embodiments, the at least one processor may be further configured to automatically apply a first column template and a second column template to a newly added column sharing similarities with at least one preexisting column already associated with the first column template and the second column template. Automatically applying a template may refer to associating a template in response to a condition being met. For example, a condition being met may include a recognition that a newly added column matches characteristics with a first column in a table. In response, the system may automatically apply a first format associated with the first column to the newly added column in response to determining that the newly added column matches the characteristics with the first column. In another example, the newly added column may be in close proximity to a first column, which may trigger the at least one processor to assign the first column template associated with the first column to the newly added column. In yet another example, the newly added column may not be in close proximity to a first column, but the at least one processor may assign the first column template associated with a recently used column template in memory. In another example, the at least one processor may apply a column template frequently implemented in a table as a default to the newly added column. Sharing similarities may refer, as used herein, to characteristics associated with a particular column type, such as a column heading, data type contained within the column, or any other information associated with a particular column. A preexisting column may refer, as used herein, to a column within a table that was added prior to the newly added column.

FIG. 9 illustrates an example resulting from at least one processor receiving a request to add a new status column 918 to a preexisting table 904 with preexisting columns. In response to receiving this request, the system may determine that the newly added status column 918 may match characteristics of preexisting columns 916 because it may share similar characteristics with the newly added status column (e.g., both the preexisting column and the newly added columns may contain status information). The preexisting columns 916 of FIG. 9 may be associated with a first column template in a first zoom range and a second column template in a second zoom range, consistent with previously discussed embodiments. As a result of determining that the newly added column 918 may match the preexisting column 916, the system may also associate the first column template in the first zoom range and the second column template in the second zoom range to the newly added column 918 so that the newly added column 918 may render and scale similar to the preexisting status columns 916 at any zoom level.

In some embodiments, the at least one processor may be further configured to determine that a new column may be similar to a second column, and in response, associate a third column template with the new column. Determining that a new column is similar may include assessing, comparing, analyzing, establishing, resolving, and/or verifying that a new column shares similar characteristics, as previously discussed, such as a common column type, column template, display format, scaling characteristics, or any combination thereof. Associating a third column template with the new column in response to the determination may include linking or applying the third column template as a result of the condition being met that the new column is determined to share similarities with the second column according to any of the previously mentioned characteristics.

FIG. 9 illustrates an example of second column 932 that may have a characteristic of being a text column type. The system may determine that newly added column 940 may share a similar column type (e.g., text column) as second column 932, or may share any other similar characteristics. In response to determining the similarity (e.g., same text column type) between new column 940 and second column 932, the system may associate the third column template of the preexisting second column 932 to the new column 940. In this example, the third column template may be configured to maintain the same rendering (e.g., display format) of information throughout a full zoom range (e.g., 1-100%). Therefore, when zooming from zoomed in view 902 to zoomed out view 900, preexisting column 932 and newly added column 940 may maintain the same display format (e.g., the third column template) across a full zoom range (e.g., 1-100%).

Figure 14:
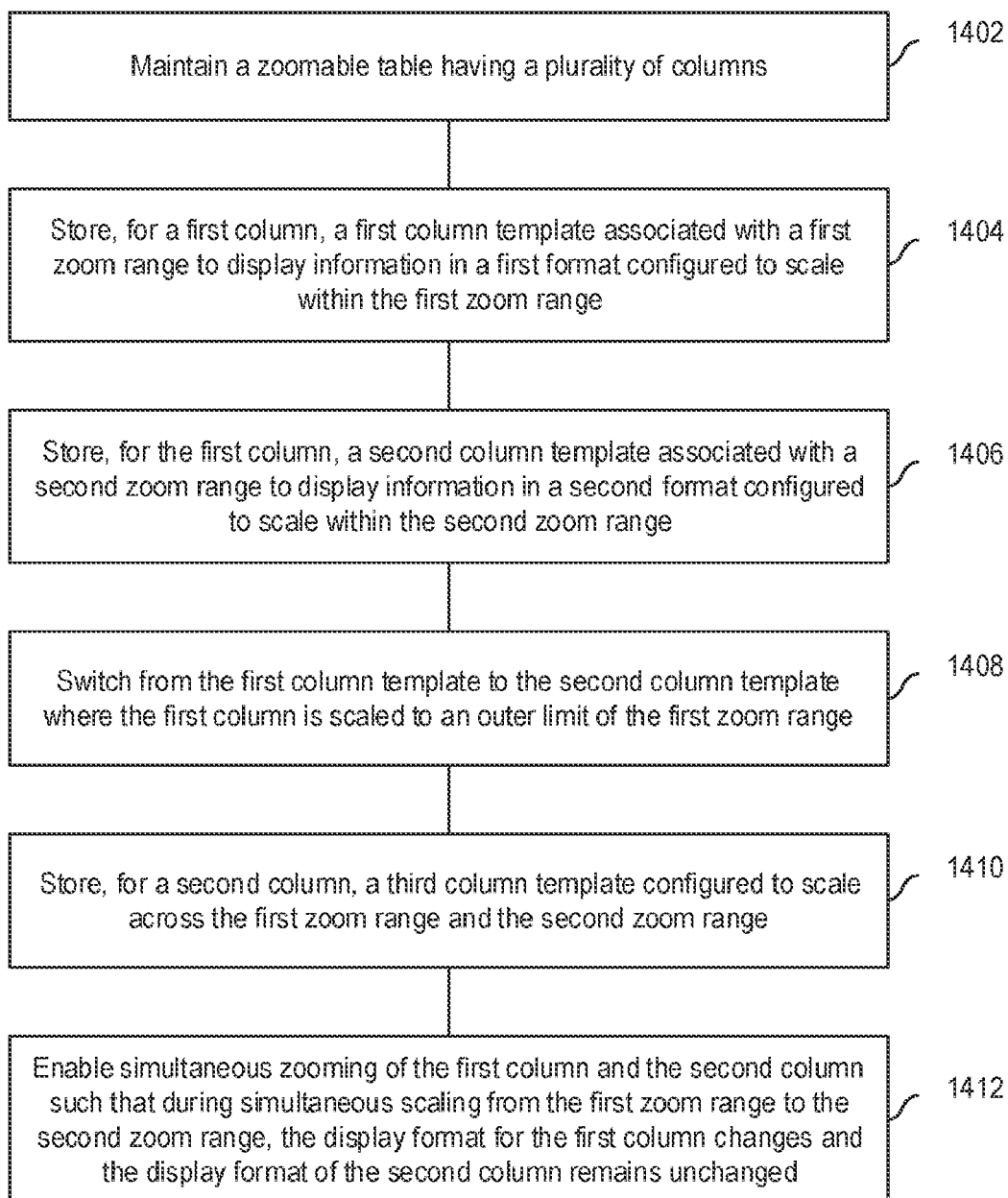
FIG. 14 is a block diagram of an exemplary method for hybrid scaling for tables having differing column types, consistent with some embodiments of the present disclosure.

FIG. 14 illustrates an exemplary block diagram of an exemplary method for hybrid scaling for tables having differing column types, consistent with some embodiments of the present disclosure. As shown at block 1402 in FIG. 14, method 1400 may maintain a zoomable table having a plurality of columns, at least some of which display differently depending on zoom level, as previously discussed. At block 1404, method 1400 may store for a first column, a first column template associated with a first zoom range, wherein the first column template is configured to display information in a first format configured to scale within the first zoom range, as previously discussed. At block 1406, method 1400 may store for the first column, a second column template associated with a second zoom range different from the first zoom range, wherein the second column template is configured to display information in a second format different from the first format, and wherein the second column template is configured to scale within the second zoom range, as previously discussed. At block 1408, method 1400 may switch from the first column template to the second column template when the first column is scaled to an outer limit of the first zoom range, as previously discussed. At block 1410, method 1400 may store for a second column, a third column template configured to scale across the first zoom range and the second zoom range, as previously discussed. At block 1412, method 1400 may enable simultaneous zooming of the first column and the second column such that during simultaneous scaling from the first zoom range to the second zoom range, the display format of the first column changes and the display format of the second column remains unchanged, consistent with the disclosure discussed above.

Aspects of this disclosure may relate to systems, methods, and computer readable media for facilitating improved data visualization. For ease of discussion, some examples are described below with reference to systems, methods, devices, and/or computer-readable media, with the understanding that discussions of each apply equally to the others. For example, some aspects of these methods may be implemented by a computing device or software running thereon. The computing device may include at least one processor as previously described (e.g., a CPU, GPU, DSP, FPGA, ASIC, or any circuitry for performing logical operations on input data) to perform the example methods. Other aspects of such methods may be implemented over a network (e.g., a wired network, a wireless network, or both).

As another example, some aspects of such methods may be implemented as operations or program codes in a non-transitory computer-readable medium. The operations or program codes may be executed by at least one processor. Non-transitory computer readable media, as described herein, may be implemented as any combination of hardware, firmware, software, or any medium capable of storing data that is readable by any computing device with a processor for performing methods or operations represented by the stored data. In a broadest sense, the example methods are not limited to particular physical or electronic instrumentalities, but rather may be accomplished using many differing instrumentalities.

Visualization as used herein may refer to techniques for communication, presentation, and/or display that involves generation or usage of images, diagrams, charts, graphs, animations, calendars, videos, or other viewable graphic elements or media. Visualizations, for example, may be based on data, which may be information, or units of information.

Consistent with disclosed embodiments, at least one processor of the system may carry out operations that may involve maintaining a plurality of boards. The plurality of boards may include boards as described previously, which may include tables with items defining objects or entities that are managed in the platform (task, project, client, deal, or any other indication of an item). Items may be contained in a rows or columns of the boards or may be associated therewith through a link (e.g., a link to another board or sub-board, or to any other data structure) or through metadata. Maintaining an object (e.g., a digital data object such as a task table, a board, a task, or a cell within a task), as used herein, may refer to any means to store or link the object. For example, a processor may store an object or link to an object in memory or a non-transitory computer-readable medium consistent with the disclosure as previously discussed.

In various embodiments, each board of the plurality of boards may contain multiple items, where at least some of the items may be associated with an entity. An entity, as used herein, may refer to an individual, a team, a group, a department, a division, a subsidiary, a company, a contractor, an agent or representative, or any independent, distinct organization (e.g., a business or a government unit) that has an identity separate from those of its members, or a combination thereof. In some embodiments, at least some of the items may include calendar-related information. A calendar, as used here in, may refer to a list, table, register, or other formats for arranging day, weeks, month, years, and/or other interval of times in a given order. For example, a calendar may display days of a year, which may be divided into months, each month being further subdivided into weeks. Days of a month may be arranged in table format, having columns and rows, and each row of days may constitute a week. Examples of calendars may include the Gregorian calendar, Orthodox calendar, Hebrew calendar, Lunar calendar, Islamic calendar, and other similar mechanism of arranging days of a year. A calendar may be in an electronic or digital format. For example, a computer-generated calendar may be based on any of the aforementioned examples calendars, based on data or information of days, months, and/or years. Such a digital calendar may be displayed on various types of display interfaces, such as ones described previously. Calendar-related information may refer to any data or information relating to the calendar, such as days, month, days or week, and/or other date related information used to generate the calendar. Additionally, calendar-related information may also refer to any items associated with particular days, weeks, months, or other units or range of time. These items may be items included in the plurality of boards. Additionally or alternatively, calendar-related information may include data associated with items, such as due dates, assignment dates, appointments dates, date range, and/or other date and time date associated with items. Additionally, or alternative, calendar-related information may include graphics, display features, or other similar interfaces or functions relating to the calendar, such as alarms, task list, prompts, charts (e.g., a bar chart, a pie chart, or a line chart), symbols, notifications, links, picture, timeline, information feed, animation, or any other representation of representative characteristics, features, other similar tools, or interfaces associated with or to be displayed on the calendar.

Figure 15:
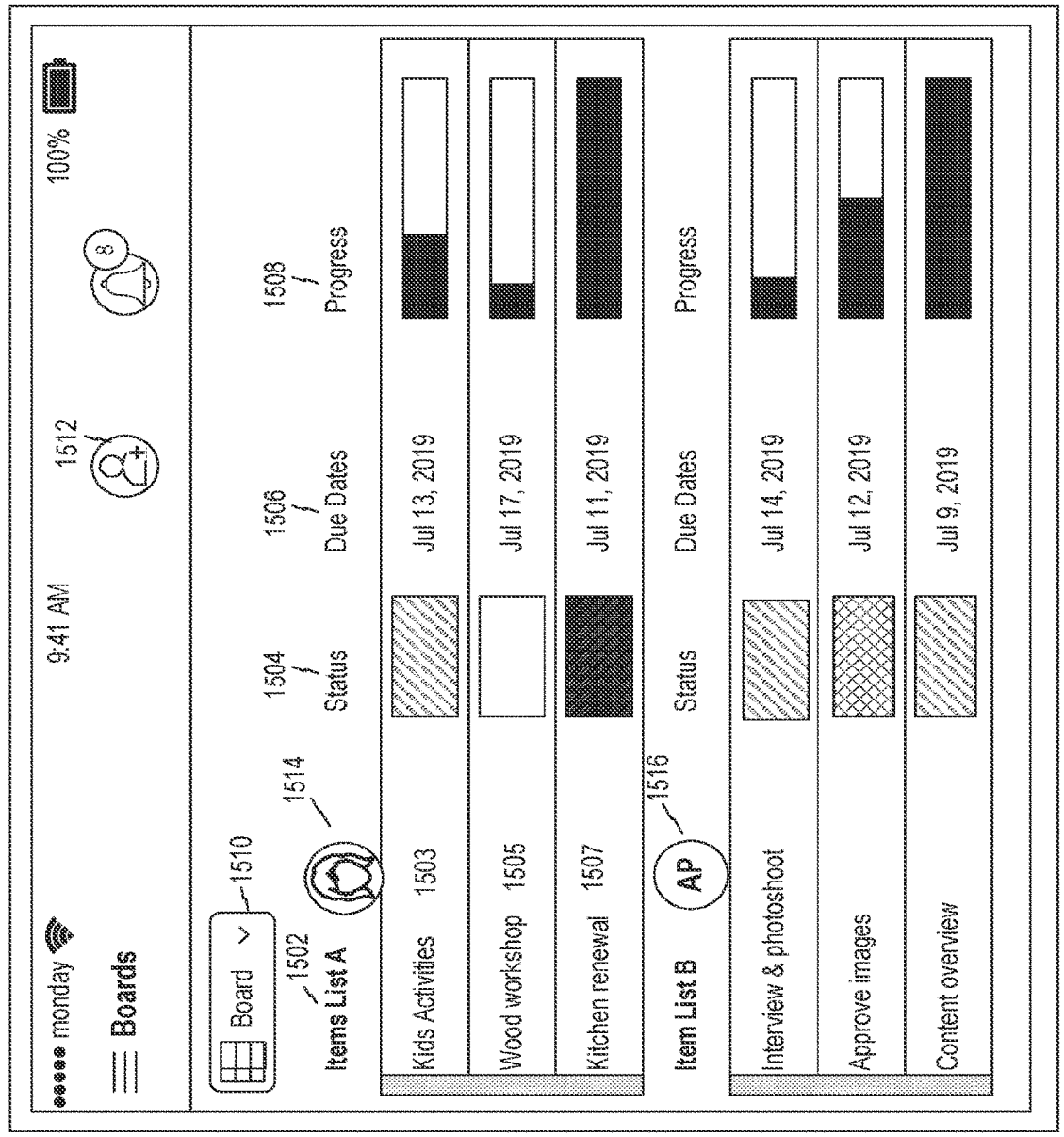
FIG. 15 is an exemplary screen shot of a board including linked items of a calendar, consistent with some embodiments of the present disclosure.
Figure 16:
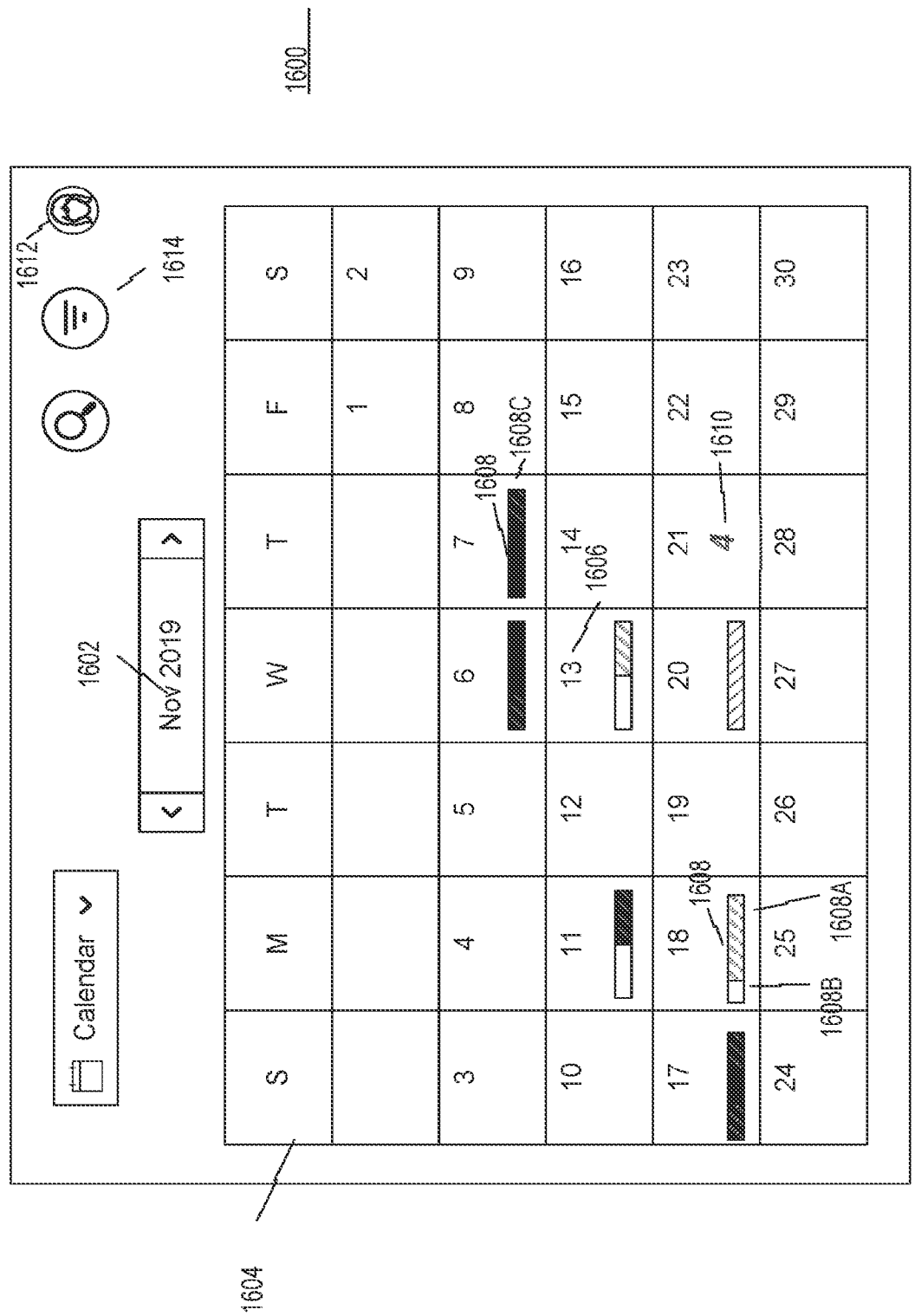
FIG. 16 is a diagram of an exemplary a calendar, consistent with some embodiments of the present disclosure.

By way of example, FIG. 15 depicts a diagram of an exemplary board including items of a calendar, consistent with some embodiments of the present disclosure. Board 1500 may an example of a board, or one of a plurality of boards. Board 1500 may include interface 1510, which may be a pop-up menu, drop-down menu, or any other similar interface that allow the user to switch back to view a calendar, a different board, or a different interface or display. In some embodiments board 1500 may be formatted differently from the plurality of boards. For example, board 1500 may be specially formatted for viewing on a mobile or tablet device that also displays a calendar. Board 1500 may contain and display information of items in tables in columns and rows. Board 1500 may display information of the items in columns and row. For example, column 1502 displays the names of items, column 1504 displays statuses of the items, column 1506 displays due dates (if applicable) of the items, and column 1508 displays a progress (if applicable) of items. In some embodiments, due dates and progress may be examples of calendar-related information, thus items containing data in columns 1506 and 1508 may be examples of the items that include calendar-related information. Each row of board 1500 may display an item. As depicted, items 1503, 1505, and 1507 may each be an example of an item in a board. By way of example, FIG. 16 depicts an illustrative example of a calendar, consistent with the disclosed embodiments. Calendar 1600 may be an example of a digital calendar rendered on a display screen of a display device. Calendar 1600 is configured to present dates in a monthly interval, with each day of the month displayed in a table format, and each day of the month depicted in a cell. As depicted in FIG. 16, calendar 1600 displays the days that are organized in seven columns, each column representing, such as Monday, Tuesday, or any other day. For example, label 1604 indicates that all cells in the column "S" are Sundays of the particular month displayed. In each cell, a label, such as label 1606, indicates that the cell is a particular date.

Consistent with disclosed embodiments, at least one processor of the system may carry out operations that may access a calendar of the entity. As used herein, accessing may refer to gaining authorization or entry to download, upload, copy, extract, update, edit, or otherwise receive or manipulate data or information. For example, when the calendar is a digital calendar, the processor of the system may gain access to the calendar and/or calendar-related information that may be stored in memory, database, or several machines described previously. If accessing the calendar requires authentication or credential information, the processor may provide authentication information as needed.

Calendar 1600 may be associated with an entity. For example, the entity associated may be displayed on the calendar by a picture, an avatar, or alphanumeric texts. Entity 1612 may be the entity associated with calendar 1600, and may be depicted by an avatar, a picture, alphanumerics, or a combination thereof on the calendar.

In some embodiments, authors of at least some of the plurality of boards differ from the entity. An author of a board may refer to an entity that generated the board or board items, or is authorization to edit or update the board or board items. The entity that is associated with the calendar may be a different entity from the author of board. For example, individual A may have created a particular item on a board, while individual B may be associated with the particular item despite not being the author. Thus, a calendar associated with individual B may have access to or may be linked with the item on the board despite that individual B is not the author of the item or the board.

For example, as depicted in FIG. 15, a graphical indicator may depict entity 1512, who may be the author of board 1500. Entity 1512 may be a different entity than entity 1514 or 1516. Thus, entities 1514 and 1516 may be associated with board 1500, but not its author.

Consistent with disclosed embodiments, at least one processor of the system may carry out operations that may perform a lookup across the plurality of boards for the items associated with the entity. As used herein, performing a lookup may refer to a process for identifying or finding pieces of data or information, sometimes based on a pre-defined criteria or parameter. For example, the processor may perform a lookup across the plurality of boards by searching, identifying, and locating data or information associated with items across the plurality of boards. The processor may further parse, extract, or otherwise retrieve these data information once located. When, for example, the plurality of boards contain items associated with different entities (e.g., through a responsibility cell, contact information, or any other information associated with an entity), the processor may perform the lookup process by searching for and locating items that are associated with a particular entity that is associated with a particular calendar. For example, in order for the processor to link a calendar with items belonging to the same individual, the processor may search for all of the items associated with individuals across various boards that may contain a plurality of boards. The lookup process may be performed by a search algorithm executed by the at least one processor (e.g., based on metadata, an entity identification, a responsibility assignment, associations or tags linked to a particular entity, a common location, or any other characteristic to identify a particular entity for a particular calendar).

For example, as depicted in FIG. 15, entity 1514 may be the same individual as entity 1612, thus items 1503, 1505, and 1507 may be examples of items associated with the entity of calendar 1600. The system may perform a similar look-up across multiple boards of entity 1512 for items associated with the entity 1512. In one embodiment, the multiple boards may include multiple boards from entity 1512. In another embodiment, the multiple boards may include multiple boards from differing entities (e.g., from other team members in the same company) such that the system may perform a lookup for items associated with entity 1512 across multiple boards.

Consistent with disclosed embodiments, at least one processor of the system may carry out operations that may perform an analysis of the items associated with an entity to determine whether the items are calendar-related. Performing an analysis may refer to conducting an examination or determination of input data to produce results. As used herein, performing an analysis may involve steps or processes to determine whether items associated with the entity, found during the lookup process described above, are calendar-related. An item may be analyzed and determined to be calendar-related if the item contains information that may be displayed on the calendar, used by one or more functions or features of the calendar, or belong to a pre-defined category of information fitting a criterion. For example, an item may be calendar-related if it is data related to a date or time, may be tagged or indicated by a date or time, or may contain calendar-related information described previously.

In some embodiments, the analysis for determining whether the items are calendar-related includes searching for at least one of a date or a date range. As previously described, an item in a board or sub-board may be represented by a row (e.g., horizontal or vertical), while columns (e.g., vertical or horizontal) may represent categories, type, or kind of data, or vice versa. The rows may intersect with columns to form cells, with each cell enabled to contain data corresponding to an item and/or datatype. In some instances, a board may contain pre-defined columns or added columns, such as, a "date," "range of date," or any other date related datatype configured to contain data describing dates or varying points in time. The processor may search for a data type in cells of these columns or items and make a determination that an item is calendar-related (e.g., an item containing calendar related data) when data containing calendar-related information are present in those cells relating to a particular item. In some embodiments, the processor may identify that an item is calendar-related when a cell associated with an item is merely enabled to contain calendar or date related information (e.g., a cell associated with column with characteristics to contain data type of a date, deadline, timeline, or any other date or time associated information), such that even when the cell is empty, the processor may still recognize that the item is calendar-related. In some embodiments, the processor may execute one or more methods for analyzing data contained (or enabled to be contained) in cells of an item and make a determination that the data contains a date or a date range. For example, the analysis may be performed by executing text classification programs to analyze data in the cells of the item. Text classification programs may be computer programs capable analyzing text data, extracting a context from the text data, or making a determination or classification based on the text data. The text classification program may be a machine learning program, neural networks, or AI based program, such as natural language processing (NLP). For example, using a text classification program, the processor may analyze each cell of an item to determine if a date or a date range is present, and if so, the processor can determine that the item is calendar-related.

For example, in exemplary board 1510 depicted in FIG. 15, column 1506 displays due dates (if applicable) of the items, and column 1508 displays progress (if applicable) of items. The processor may recognize that cells within these columns are configured to store date-related information. The processor may thus determine that each of items 1503, 1505, and 1507 are examples of calendar-related items because column 1506 and/or column 1508 are columns configured to store date-related information. Additionally, or alternatively, the processor may analyze all columns of items 1503, 1505, and 1507 using text classification program, and may determine based on that analysis that items 1503, 1505, and 1507 may contain information in date formats.

In some embodiments, the analysis may involve determining whether the items are calendar-related includes searching for an item due status indicator. An item due status indictor may refer an indicator representing progress, urgency, state of completeness, deadlines, or other time status or milestone time marks associated with an item. For example, an item may have an item due status indicator representing a status associated with a task of an item such as "completed," "work-in-progress," "coming due", "due", or "past due." The status indicator may be presented graphically, with alphanumerics, or a combination thereof. In yet another example, an item may have an item due status indicator indicating that tasks associated with the item requires urgent attention, or does not require urgent attention, such an indicator representative of "stuck." In some embodiments, the status indicator of an item may be assigned manually by users. Alternatively, or additionally, the status indicator of an item may be determined based on other data of the item. For example, an item may include a cell containing data for a "due date," (e.g., a date for a deadline) and the processor may automatically generate an item due status indicator (e.g., an exclamation mark when something is overdue, a checkmark when the item is completed before the deadline, or any other indicator representing a progress of the item relative to a calendar related date or timeline) based on the data for "due date." In some instances, when a date range is associated with an item, the processor may determine the item due status indicator based on a date in the date range (e.g., based on the last date in the date range, or on a combination of the last date and a time on the last date).

By way of example, as depicted in FIG. 15, information under column 1504 may be examples of item due statuses of the associated items. The system may perform an analysis based on the statuses to determine that it is related to calendar information, and thus determine that the items contain calendar-related information. In other embodiments, the system may also determine that items contains calendar-related information based on a characteristic of the status column 1504 (e.g., the column contains status information in relation to a due date) or based on the header of the status column 1504. In another example, the system may also analyze and determine that items are calendar-related based on a recognition of due date-related information contained in due date column 1506 or by recognizing the "Due Date" text in the header of the due date column 1506.

Consistent with disclosed embodiments, at least one processor of the system may carry out operations that may sync the calendar-related items associated with the entity with the accessed calendar by rendering on the calendar, graphical indicators linked to the items. Syncing may refer to an operation or process to cause two or more different objects (such as programming or applications) to be in agreement, be presented together, act in a synchronous state, or share identical set of data. Syncing may involve exchanging of data and information between the different objects, or accessing of a single set of data by the different objects being synced. For example, the processor may access data of the calendar-related items associated with the entity, and pass the data to the accessed calendar for rendering on a display. Thus, for each day of the calendar, the processor may render graphic indicators linked to calendar-related items of the day on the calendar. Syncing may be performed at a predetermined interval, such as once every day, every hour, every minute, or some other interval of time or a combination thereof. Syncing may also be performed as commanded by a user (e.g., manually, scheduled, or automatic according to a setting), or at an instance when a board or a calendar is being initiated, or at an instance when an update to the items, the boards, or the calendar is detected.

Rendering may refer to an operation or process to make or generate objects in a visualization. In the context of rendering graphic objects (such as calendars) by a computerized system, rendering may involve generation of images, animations, videos, and other similar visual media from 2D or 3D models by means of computer programming or applications. In some embodiments, the calendar-related items that are synced with the accessed calendar may be depicted or represented by graphical indicators rendered on the calendar. Graphic indicators may refer to any graphic or visual elements, such as shape, symbols, images, animations, videos, and other similar visual media, rendered by the system to represent data or information. Graphic indicators may be rendered for the purpose of providing visual notifications, reminders, or any other viewing purposes. For example, the processor may render graphic indicators representing items (such as calendar-related items) on a calendar for viewing by a user. The user may be the entity associated with the calendar and rendered calendar-related items or may be a subscriber or team member associated with the calendar. A person of ordinary skill in the art will now appreciate that the user may view and access the rendered calendar-related items directly from the calendar, resulting in improved overall user experience and more efficient user interface. In some embodiments, calendar-related items may be updatable via the calendar. For example, the rendered calendar-related items may be configured to allow the user to edit or update through access via the graphical indicators on the calendar. The various features and interfaces that enable the rendered calendar-related items to be updated are described below in further detail.

By way of example, FIG. 16 depicts exemplary embodiments of graphical indicators rendered on a calendar, such as calendar 1600. Graphical indicators 1608 and 1610 may be examples of graphical indicators representing calendar-related items of a particular date in the form of graphics, alphanumerics, or a combination thereof. In some instances, entity 1612 may be represented as a graphical indicator rendered on calendar 1600 (e.g., an image, an avatar, a photograph), alphanumerically (e.g., entity name), or a combination thereof. Graphic indicator 1614 may be yet another example of a graphic indicator and may be configured, when selected by a user, to generate an additional display containing information presented on calendar 1600.

Figure 17:
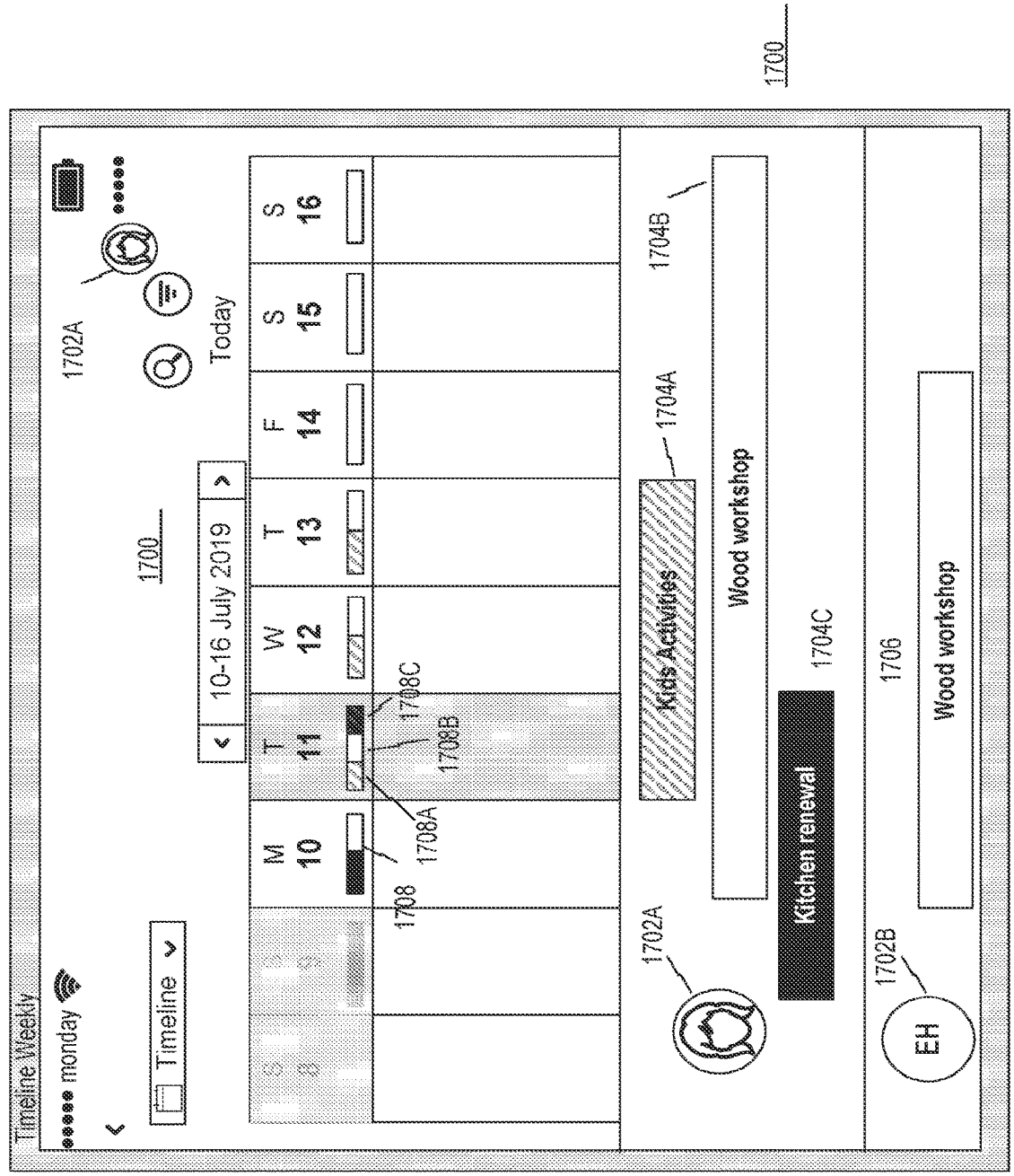
FIG. 17 is a diagram of an exemplary display of information overlay on a calendar, consistent with some embodiments of the disclosed embodiments.

By of example, FIG. 17 also depicts examples of graphical indicators rendered on a calendar, such as calendar 1600. Entities 1702A and 1702B, as well as items 1704A, 1704B, and 1704C may each be represented by graphical indicators.

In some embodiments, graphical indicators may include a plurality of icons, and each icon may represent a differing board item. Icons may refer to graphic symbols that may represent an application, an object (such as a file, item, or person), a link (such as hyperlink or URL link) or a function (such as the command to open, quit, save, etc.). Examples of icons may include alphanumeric symbols, images, shapes, graphic objects, and other suitable visual elements. Each icon rendered on the calendar may represent differing board items. A board item may be one of the calendar-related items described previously, or some other items contained in the plurality of boards. In some embodiments, the processor may render icons to be visually different, such that a user may distinguishing between differing board items by the visually distinguishing their representative icons. Icons may be differentiated by color, shape, size, or other visual cues.

For example, graphical indicators 1608 and 1610 of FIG. 16 and FIG. 17 may be examples of icons in a shape of a bar that may relate to different items or different statuses associated with items. In other examples not shown, the graphical indicators may be presented as icons associated with the items. In a simple example, board items may be represented as a tally in the calendar view in FIG. 16, such that board items associated with a particular day could show a number of tallies associated with the number of items associated with that day. In another example, if items are associated with properties, the icons may be representations of each of the properties in the form of icons in the shape of houses. In another example, if items are associated with individuals in a Human Resources example, the icons may be representations of the individuals (e.g., through an avatar or a photo). Where a board contains multiple types of items (e.g., properties, individuals, tasks, or any other item), each icon representing each item may be presented with a different icon representative of the type of item, such that the calendar-view in FIG. 16 and FIG. 17 would display varying icons relating to varying board items.

In some embodiments, at least some of the graphical indicators may be colorized to convey information. As used herein, colorized may refer to the application to an object of a color, texture, shading, or pattern. Graphical indicators may include a single color, texture, shading, or pattern, or may include a dynamically changing version thereof. For example, the processor may apply one or more colors to the graphic indicators of the calendar to represent information associated with an item. By utilizing different colors, the system may convey certain information about the calendar-related items represented by the graphic indicators. In some embodiments, each color may represent a particular status or state of the item being represented by the graphic indicator, and different colors may be applied to visually distinguish items having differing statuses. In the plurality of boards, users may designate each item as having a status, and the status may be a user-defined parameter. In non-limiting examples, there may be a 'completed' status to indicate that an item has been completed; a 'working on it' status to indicate that an item is currently being worked on; and a 'stuck' status indicating that help is required for an item. When the processor renders the graphic indicators for the calendar-related items, based on the different status, the processor may assign a first color to the items having 'completed' status, a second color to items having 'working on it' status, and third color to items having 'stuck' status. Thus, by viewing the calendar having colorized graphic indicators, a user may readily be able to tell the status of calendar-related items, which may enable the user to estimate his/her expected workload for the day, and may enable the user to better plan his/her work flow. A person of ordinary in the art will now appreciate that a user may define the statuses of items as needed, or create new statuses to represent a state or progress of items.

As depicted in FIG. 1600, graphical indicators may be represented with colors or patterns, with different colors or patterns conveying information, such as a status of a calendar-related item. For example, graphic indicator 1608 for "November 7" contains only a single color or pattern, indicating that all calendar-related items associated with "November 7" have the same status. In another example, graphic indicator for "November 18" has two different colors, represented by a first color for a first indicator 1608A and a second color for a second indicator 1608B. The first indicator 1608A may represent items having one status (e.g., a first status), and the second indicator 1608B may represent items having a different status (e.g., a second status).

As depicted in FIG. 16, the presentation of the first indicator 1608A may be rendered with a larger size than the presentation of the second indicator 1608B. The relative sizes of graphical indicator (e.g., the varying colors in the calendar view) may represent a priority, weight, item size, or any other characteristic of the item associated with the graphical indicator. In some instances, for the particular date, there may be more calendar-related items associated with the first status than calendar-related items associated with the second status, thus the first indicator 1608A is rendered to appear larger relative to the second indicator 1608B, as to allow a user to readily ascertain a proportion of calendar-related items having a particular status at a glance of the calendar. For example, if the first status is a 'completed' status, and the second status is an 'in progress' status, then a user viewing calendar 1610 would be informed by a quick glance that the level of workload expected for November 18, and the user may plan the day accordingly. If, for example, a third indicator 1608C representing a third status (e.g., 'urgent') the user would be informed by viewing calendar 1600 that all calendar-related items for November 7 are 'urgent,' and would thus plan the day accordingly to deal with urgent tasks.

In some embodiments, at least some of the graphical indicators are sized to convey information. By rendering different graphic indicators having different relative sizes, the processor may convey certain information about the items represented by the graphic indicators, such as their relative urgency, importance, value, or other parameters as defined by the user. For example, the processor may adjust rendering the relative size of the graphic indicators based on the number of calendar-related items being represented by the graphical indicator (e.g., graphical indicator may appear larger when number of items are higher). Additionally, or alternatively, in some cases, a calendar-related item may be assigned a priority value, with some items being assigned higher priority than other items. The graphic indicators may be sized so that graphic indicators representing higher prioritized calendar-related items appear larger in size that graphic indicators representing lower prioritized calendar-related items.

As depicted in FIG. 16, the relative sizes of indicators 1608A, 1608B, and 1608C may be based on the number of calendar-related items each graphic indictor represents. For example, if there are ten calendar-related items total associated with a particular day, with eight items having the first status, and two items having the second status, the system may render graphical indicator 1608 such that the first indicator 1608A occupies 80% the size of graphical indicator 1608, and the second indicator 1608B occupies 20% the size of graphical indicator 1608.

In some embodiments, at least some of the graphical indicators may include alphanumeric information. Alphanumeric information is information represented by numbers and/or letters. In some embodiments, the alphanumeric information includes at least one digit reflective of a number of items associated with a particular calendar day. For example, there may be four calendar-related items associated with a particular day on the calendar, thus the processor may render a graphic indicator that is the number '4' in the calendar space of that particular day to indicate that there are five calendar-related items. Such numbers may be integrated into graphic indicators. For example, although not illustrated, in split indicators of November 18 in FIG. 16, the number '2' might be displayed on or in association with second indicator 1608B, and the number '8" might be displayed on or in association with first indicator 1608A. This might indicate that on November 18, an associated individual has two items to complete in the second category and eight items to complete in the first category.

Alternatively, as depicted FIG. 16, graphical indicator 1610 may be an example of a graphical indicator including alphanumeric information. For example, "4" may indicate that there are four calendar-related items associated with the date "November 21."

In some embodiments, an activatable drop down menu may be associated with at least some of the graphical indicators, and the drop down menu may include a plurality of items. An activatable drop down menu (also known as a drop-down list, drop menu, pull-down list, picklist, or pop-up menu) may include a graphical user element that appears on an interface when activated by a user presenting one more move values or choice to the user, and allows the user to choose one or more of the values or choices presented (e.g., the items). The values may be presented in a table, list, or other formats. In some embodiments, when a drop down menu is inactive, it may display a single value. When activated, the drop down menu may display (e.g., drop down) a list or table of values or items from which the user may select one of the presented values. In some embodiments, when the user selects a new value, the drop down menu may revert to its inactive state, displaying the selected value. In some embodiments, when the drop down menu is activated and includes a plurality of items, a user may be enabled to then directly access the plurality of items to view additional information from the underlying board and directly make edits to the items of the underlying table from the calendar view.

By way of example in FIG. 16, graphical interface 1602 may be an example of an element that when selected, presents a drop-down menu. In this case, it may present month and year, enabling a user to navigate to different views of calendar, such as to a different month and/or year. In some embodiments, graphical interface 1602, when selected by a user, may activate a drop-down menu containing a list of months and/or years to allow the user to navigate to the selected month and/or year. Drop-down menus may be associated with graphical indicators. For example in FIG. 17, in response to interacting with graphical indicator 1608, a drop down menu may be activated to present a list of items associated with that day. The drop-down menu may contain a list of items from an underlying board or boards to enable a user to directly view additional information associated with the items and directly make alterations to the items in the underlying board without viewing the underlying board(s). The drop-down menu may be presented in any number of ways. For example, a drop-down menu may include all of the information relating to a single item so that a user may view and alter the information pertaining to the single item. In other examples, the drop down menu may include information from multiple items to enable a user to view and alter the information relating to the multiple items. In some embodiments at least some of the graphical indicators may be associated with a drop down menu. In other embodiments, all (or none) of the graphical indicators may be associated with a drop down menu.

Consistent with disclosed embodiments, at least one processor of the system may receive a selection of a specific graphical indicator rendered on the calendar, the specific graphical indicator being associated with a specific one of the calendar-related items. A selection may be a user input indicating a desire to interact with a specific graphical indicator. For example, when the calendar and the specific graphical indicator is rendered on a touch interface, the pressing or touching of the specific graphical indicator may be a selection. Additionally, or alternatively, when other input peripheral devices (e.g., mouse, stylus, virtual reality (VR) controller, or any other interface) are connected to the display of the calendar and the specific graphical indicator, selection by the user may be received by these input peripheral devices. As discussed previously, each graphical indicator may represent of one or more calendar-related items, and a user may select a specific graphical indicator in order to access the calendar-related items being represented.

For example, as depicted in FIG. 17, when a user selects or otherwise interacts with a single calendar day, display 1700 may appear containing a display of items 1704A, 1704B, 1704C, and 1706. In another exemplary embodiment (not shown), a user may select a particular graphical indicator of 1608 to select the particular item associated with the particular graphical indicator. For example in FIG. 17, if a user were to select the dark graphical indicator of indicator 1608 the associated Costumes item 1704C may be selected for further viewing or altering in an interface without viewing the underlying board. In other words, the costumes entry is extracted for display from a linked board, with only the costumes linked information is presented from that board.

Consistent with disclosed embodiments, at least one processor of the system may, upon receipt of the selection, activate a specific link associated with the specific graphical indicator to thereby cause a display of information associated with the specific item. The specific link may be any means of electronically linking, such as a hyperlink, to activate one or more functions, applications, programs, or renderings. The specific link may also link the specific graphic indictor to the specific item that is being represented by the specific graphical indicator. The specific link may cause the system to activate a display of information relating to the linked specific item. The display of information may be a separate display apart from the calendar. For example, the display of information may be a pop-up display that appears to overlay on top of the calendar. The display of information may include text, images, charts, icons, and other visual displays related to the specific items. Such linked information may be drawn from a table or board, without displaying the entire board.

By way of example, FIG. 17 depicts a display including an aggregate of linked items associated with a particular calendar day, consistent with the disclosed embodiments. As depicted, display 1700 may be an example of a display of information, displaying an aggregate of linked items associated with a particular calendar day (e.g., July 11), without the full view of a board, such as board 1500. The processor may generate display 1700, for example, when a user interacts with graphic indicator 1608 (such as pressing on a touch screen, clicking by a mouse, a cursor hover, or any other interaction). As depicted in FIG. 17, display 1700 includes items 1704A, 1704B, and 1704C. Items may be colorized or displayed with pattern to indicate the associated status. For example, item 1704A may have a first status, item 1704B may have a second status, and item 1704C may have a third status. The color or pattern of items in display 1700 may correspond to the color or pattern of graphical indicator 1608. For example, item 1704A shares the color or pattern of graphical indicator 1608A, item 1704B shares the color and pattern of graphical indicator 1608B, and so forth. As depicted in FIG. 17, July 11 includes calendar-related items having three different statues, thus graphical indicator 1608 is rendered with three different colors/patters. July 10, on the other hand, includes calendar-related items having two different statutes, thus graphical indicator 1608 is rendered with two different colors/patterns. July 8 is not associated with any calendar-related item, hence no graphical indicator is rendered for that day.

Additionally, or alternatively, display 1700 may depict a date range of linked items associated with a particular calendar day item. For example, item 1704A extends from July 11 to July 13, item 1704B extends from July 10 to July 16, and item 1704C extends from July 9 to July 11. Additionally, or alternatively, display 1700 may depict linked items associated with a particular calendar day according to entities associated with the items. For example, items 1704A, 1704B, and 1704C are associated with entity 1702A. Entity 1702A may be the entity associated with the calendar (such as entity 1608). Alternatively, entity 1702A may be an author of the associated items, or some other associated entity. The entities may be depicted with alphanumeric symbols, such as letters representing names or initials of the entity. The entities may also be depicted with graphical indicators, such as an avatar or image, or by a combination of graphics and alphanumerics. In some embodiments, display 1700 may depict multiple entities associated with linked items of a particular calendar day. For example, display 1700 may further include entity 1702B, which is associated with item 1706. An entity may be depicted by an image, such as a photo, avatar or portrait of entity 1702B. In some instances, it may be desirable for the user to view calendar-related items of a different entity, such as when multiple individuals may collaborate on the same item. In the example depicted in FIG. 17, the calendar is associated with entity 1702A. As depicted, both entities 1702A and 1702B may collaborate on item "Wood workshop." Therefore, display 1700 may also render item 1706 of entity 1702B for viewing by entity 1702A, so as to inform entity 1702A of the on-going collaboration. In some embodiments, item 1706 may not completely overlap with item 1704B. For example, entity 1702A may be expected to work on item 1704B between July 10 and July 16, while entity 1702B may be expected to only work on item 1706 from July 10 to July 14.

In some embodiments, causing the display includes presenting the linked item. For example, the display may present information related to the linked item and may enable the user to view or access information associated with the linked item. The information may include data stored in cells of the linked item, as previously described.

In some embodiments, causing the display includes presenting an aggregate of linked items associated with a particular calendar day. For example, when user activates the display associated with an item on a particular day, the system may generate the display so that all items of the particular day appears, and thus may enable the user to navigate, view, access or otherwise manipulate items belonging to the particular calendar day.

For example, as depicted in FIG. 17, items are associated with the particular day and may be presented as items 1704A 1704B, and 1704C. The presentation of items may be of a single item, as previously discussed above, or may include an aggregate of some or all of the linked items associated with a particular calendar day, as shown in FIG. 17. In some embodiments, items 1704A, 1704B, and 1704C may be represented by icons, which may be linked to a board or boards containing items 1704A, 1704B, and 1704C. For example, entity 1702A may be the same entity as 1514 of FIG. 15, and items 1704A, 1704B, and 1704C may correspond to items 1503, 1505, 1507 of board 1500 shown in FIG. 15. When a user clicks, presses, or otherwise activates any one of items 1704A, 1704B, and 1704C on display 1700, a link may be activated to cause board 1500 to be displayed for viewing on the display device.

In some embodiments, causing the display may include presenting aboard on which the linked item is contained. For example, the board may be one of the plurality of boards that contains the linked item. This may enable to the user to view or access other items contained in the board that may not be calendar items and which would not otherwise be rendered on the calendar. On the display, the user may navigate, view, access or otherwise manipulate items included in the board being displayed.

For example, when any of items 1704A, 1704B, and 1704C are selected, the board containing the items selected may appear on the display. Board 1500 of FIG. 15 may be an example of the board that may be presented in the display.

In some embodiments, the calendar may be enabled to be updated via the board. As previously discussed, items rendered on the calendar may be calendar related items, and the calendar related item may be located by the system across a plurality of boards. Thus, when the information associated with the calendar-related items are changed in the plurality of boards, the items rendered on the board may be updated as well, such as during syncing between the calendar-related items and the calendar. For example, when items having calendar information (such as dates) are added or removed in the plurality of boards, the items rendered on the calendar may update accordingly. Additionally, when calendar information of an item rendered on the calendar changes in the plurality of boards changes (such as a date change or a status change), the item may be rendered on a different day on the calendar or may be colorized differently.

For example, as depicted in FIG. 15, each linked item may be a graphical indicator that may enable interaction with a user. For example, a user may select (e.g., press or click) on "Jul. 17, 2019" of "Kids Activities" to change the due date for the item "Kids Activities." By changing the "Dates," calendar 1600 may render "Kids Activities" on an updated date. Similarly, the user may select item 1504A to change a status of "Kids Activities" to a different color or pattern, which may result the color or pattern of the corresponding graphical indicator to update accordingly on calendar 1600.

Figure 18:
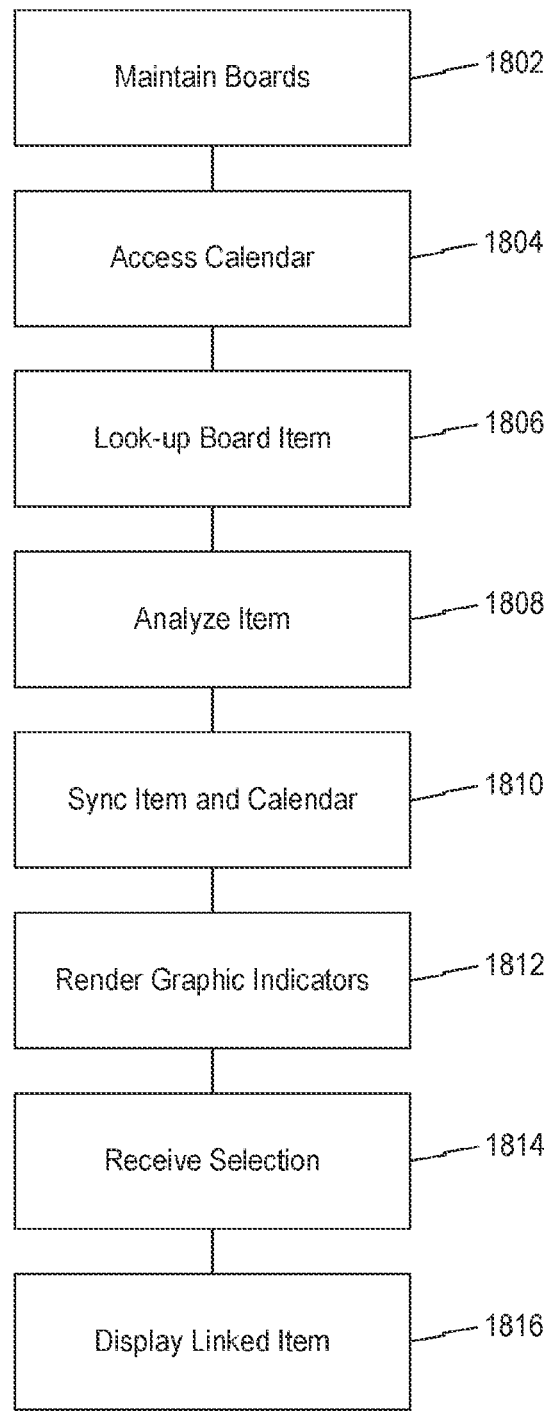
FIG. 18 is a block diagram of an exemplary process for facilitating improved data visualization, consistent with some embodiments of the present disclosure.

FIG. 18 depicts a flow chart of an exemplary process for facilitating improved data visualization, consistent with the present disclosure.

At block 1802, processing circuitry 110 may access, store or link boards that include tables with items defining objects or entities that are managed in the platform (task, project, client, deal, etc.) as describes previously. For example, processing circuitry 110 may access, store or link boards in a non-transitory computer-readable medium.

At block 1804, processing circuitry 110 may access a calendar associated with an entity by gaining authorization or entry to download, upload, copy, extract, update, edit, or otherwise receive or manipulate data or information associate the calendar of the entity. For example, when the calendar is a digital calendar, processing circuitry 110 may gain access to the calendar and/or calendar data stored in memory, database, or non-transitory computer-readable medium. Accessing the calendar may include providing the authentication information.

At block 1806, processing circuitry 110 may perform a lookup across the plurality of boards for the items associated with the entity. For example, processing circuitry 110 may search, identify, and locate items associated with the entity of the calendar across the plurality of boards.

At block 1808, processing circuitry 110 may perform an analysis of the items associated with the entity found in step 1806 to determine whether these items are calendar-related. For example, an item may be calendar related if it is data related to a date or time, be tagged or indicated by a date or time. For example, an item may be calendar related if it contains data such as a date or a date range.

At block 1810, processing circuitry 110 may sync the calendar-related items associated with the entity with the accessed calendar. Syncing may involve exchanging of data and information between the different objects or accessing a single set of data by all the different objects. For example, the system may access data of the calendar-related items associated with the entity and pass these data to the associated accessed calendar.

At block 1812, processing circuitry 110 may render on the calendar, graphical indicators linked to the synced items in step 1810. Processing circuitry 110 may generate graphic indicators, such as images, animations, videos, and other similar visual media, on the calendar representing the calendar-related items. The graphical indicators may be configured to receive user selections by various means of inputs. For example, the graphical indicators may include icons, which may be linked to access calendar-related items via user interaction. In some embodiments, graphical indicators may include drop-down menus.

Processing circuitry 110 may render graphical indicators in different colors and patterns to convey information. For example, calendar-related items may be represented by graphical indicators having different colors or patterns. Processing circuitry 110 may also render graphical indicators with varying size to convey information. For example, graphical indicators may be sized based on the number calendar-related items that the corresponding graphical indicators represent. In some embodiments, graphical indicators may be alphanumeric symbols. For example, graphical indicators may be numeral digits, with the digit indicating the number of calendar-related item being represented by the corresponding graphical indicator.

At block 1814, processing circuitry 110 may receive a selection of a specific graphical indicator rendered on the calendar, the specific graphical indicator being associated with a specific one of the calendar-related items. For example, when the calendar and the specific graphical indicator is rendered on a touch interface, the pressing or touching of the graphical indicator may be a selection.

At block 1816 processing circuitry 110 may, in response to a selection in step 1814, display calendar-related items linked to the selected graphical indicator. In some embodiments, processing circuitry 110 displays a linked item. For example, the processing circuitry 110 may display in an interface all data and information of the linked item. In some embodiments, processing circuitry 110 may display a board on which the linked item is contained. In some embodiments, processing circuitry 110 may display an aggregate of all calendar-related items for the particular day associated with the linked item. For example, if the linked item is on "December 25," processing circuitry 110 may display all calendar-related item for December 25.

Unless otherwise defined, all technical and scientific terms used herein have the same meaning as commonly understood by one of ordinary skill in the art. The materials, methods, and examples provided herein are illustrative only and not intended to be limiting.

Implementation of the method and system of the present disclosure may involve performing or completing certain selected tasks or steps manually, automatically, or a combination thereof. Moreover, according to actual instrumentation and equipment of preferred embodiments of the method and system of the present disclosure, several selected steps may be implemented by hardware (HW) or by software (SW) on any operating system of any firmware, or by a combination thereof. For example, as hardware, selected steps of the disclosure could be implemented as a chip or a circuit. As software or algorithm, selected steps of the disclosure could be implemented as a plurality of software instructions being executed by a computer using any suitable operating system. In any case, selected steps of the method and system of the disclosure could be described as being performed by a data processor, such as a computing device for executing a plurality of instructions.

As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

Although the present disclosure is described with regard to a "computing device", a "computer", or "mobile device", it should be noted that optionally any device featuring a data processor and the ability to execute one or more instructions may be described as a computing device, including but not limited to any type of personal computer (PC), a server, a distributed server, a virtual server, a cloud computing platform, a cellular telephone, an IP telephone, a smartphone, a smart watch or a PDA (personal digital assistant). Any two or more of such devices in communication with each other may optionally comprise a "network" or a "computer network".

To provide for interaction with a user, the systems and techniques described here can be implemented on a computer having a display device (a LED (light-emitting diode), or OLED (organic LED), or LCD (liquid crystal display) monitor/screen) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

It should be appreciated that the above described methods and apparatus may be varied in many ways, including omitting or adding steps, changing the order of steps and the type of devices used. It should be appreciated that different features may be combined in different ways. In particular, not all the features shown above in a particular embodiment or implementation are necessary in every embodiment or implementation of the invention. Further combinations of the above features and implementations are also considered to be within the scope of some embodiments or implementations of the invention.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

Disclosed embodiments may include anyone of the following bullet-pointed features alone or in combination with one or more other bullet-pointed features, whether implemented as a method, by at least one processor, and/or stored as executable instructions on non-transitory computer-readable media:

- maintaining a data structure including a plurality of tables, each table of the plurality of tables including a plurality of rows and columns, with each of the plurality of columns having an associated column heading;
- receiving a request to consolidate information from at least two of the plurality of tables;
- wherein the at least two of the plurality of tables include similar columns with differing headings and a common data type;
- performing an analysis of data in the similar columns to determine that the data in the similar columns share a common characteristic;
- aggregating information from the similar columns;
- outputting the aggregation of information in a manner associating information from the similar columns;
- identifying the common data type through an identification of similar terms used in the similar columns;
- wherein the common characteristic is a location in a common pre-stored library of related terms;
- enabling association of at least two of the plurality of columns having dissimilar headings;
- enabling association of at least two of the plurality of columns containing data having dissimilar characteristics;
- enabling disassociation of at least two of the plurality of columns sharing common characteristics;
- determining that at least two of the plurality of columns are similar based on shared column characteristics;
- wherein the column characteristics include relative column positions;
- wherein the column characteristics include data type contained in the at least two of the plurality of columns;
- causing a presentation of default options for merging column data;
- maintaining a zoomable table having a plurality of columns, at least some of which display differently depending on zoom level;
- storing for a first column, a first column template associated with a first zoom range;
- wherein the first column template is configured to display information in a first format configured to scale within the first zoom range;
- storing for the first column, a second column template associated with a second zoom range different from the first zoom range;
- wherein the second column template is configured to display information in a second format different from the first format;
- wherein the second column template is configured to scale within the second zoom range;
- switching from the first column template to the second column template when the first column is scaled to an outer limit of the first zoom range;
- storing for a second column, a third column template configured to scale across the first zoom range and the second zoom range;
- enabling simultaneous zooming of the first column and the second column such that during simultaneous scaling from the first zoom range to the second zoom range, the display format of the first column changes and the display format of the second column remains unchanged;
- wherein the first format includes a display of words in a column and the second format substitutes graphical indicators for the words;
- wherein the first format includes a display of a first volume of information and wherein the second format includes a display of a second volume of information different from the first volume of information;
- wherein the first format is a timeline view and the second format is a calendar view;
- receiving a request to replace the second column template with the first column template, the first column template being scalable across the first zoom range and the second zoom range;
- automatically applying the first column template and the second column template to a newly added column sharing similarities with at least one preexisting column already associated with the first column template and the second column template;

determining that a new column is similar to the second column, and in response, associating the third column template with the new column;
maintaining a plurality of boards;
wherein each board of the plurality of boards contains multiple items, at least some of the items being associated with an entity;
wherein at least some of the items include calendar-related information;
accessing a calendar of the entity;
performing a lookup across the plurality of boards for the items associated with the entity;
performing an analysis of the items associated with the entity to determine whether the items are calendar-related;
syncing the calendar-related items associated with the entity with the accessed calendar by rendering on the calendar, graphical indicators linked to the items;
receiving a selection of a specific graphical indicator rendered on the calendar, the specific graphical indicator being associated with a specific one of the calendar-related items;
upon receipt of the selection, activating a specific link associated with the specific graphical indicator to thereby cause a display of information associated with the specific item;
wherein causing the display includes presenting a board on which the linked item is contained;
wherein causing the display includes presenting the linked item;
wherein causing the display includes presenting an aggregate of linked items associated with a particular calendar day;
wherein authors of at least some of the plurality of boards differ from the entity;
wherein the analysis of the items associated with the entity to determine whether the items are calendar-related includes searching for at least one of a date or a date range;
wherein the analysis of the items associated with the entity to determine whether the items are calendar-related includes searching for an item due status indicator;
wherein the graphical indicators include a plurality of icons;
wherein each icon represents a differing board item;
wherein at least some of the graphical indicators are colorized to convey information;
wherein at least some of the graphical indicators are sized to convey information;
wherein at least some of the graphical indicators include alphanumeric information;
wherein the alphanumeric information includes at least one digit reflective of a number of items associated with a particular calendar day;
wherein an activatable drop down menu is associated with at least some of the graphical indicators;
wherein the drop down menu includes a plurality of items;
wherein items are updatable via the calendar;
wherein the calendar is enabled to be updated via the board.

Systems and methods disclosed herein involve unconventional improvements over conventional approaches. Descriptions of the disclosed embodiments are not exhaustive and are not limited to the precise forms or embodiments disclosed. Modifications and adaptations of the embodiments will be apparent from consideration of the specification and practice of the disclosed embodiments. Additionally, the disclosed embodiments are not limited to the examples discussed herein.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure may be implemented as hardware alone.

It is appreciated that the above described embodiments can be implemented by hardware, or software (program codes), or a combination of hardware and software. If implemented by software, it can be stored in the above-described computer-readable media. The software, when executed by the processor can perform the disclosed methods. The computing units and other functional units described in the present disclosure can be implemented by hardware, or software, or a combination of hardware and software. One of ordinary skill in the art will also understand that multiple ones of the above described modules/units can be combined as one module or unit, and each of the above described modules/units can be further divided into a plurality of sub-modules or sub-units.

The block diagrams in the figures illustrate the architecture, functionality, and operation of possible implementations of systems, methods, and computer hardware or software products according to various example embodiments of the present disclosure. In this regard, each block in a flowchart or block diagram may represent a module, segment, or portion of code, which includes one or more executable instructions for implementing the specified logical functions. It should be understood that in some alternative implementations, functions indicated in a block may occur out of order noted in the figures. For example, two blocks shown in succession may be executed or implemented substantially concurrently, or two blocks may sometimes be executed in reverse order, depending upon the functionality involved. Some blocks may also be omitted. It should also be understood that each block of the block diagrams, and combination of the blocks, may be implemented by special purpose hardware-based systems that perform the specified functions or acts, or by combinations of special purpose hardware and computer instructions.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as example only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

It will be appreciated that the embodiments of the present disclosure are not limited to the exact construction that has been described above and illustrated in the accompanying drawings, and that various modifications and changes may be made without departing from the scope thereof.

Other embodiments will be apparent to those skilled in the art from consideration of the specification and practice of the disclosed embodiments disclosed herein. It is intended that the specification and examples be considered as exemplary only, with a true scope and spirit of the disclosed embodiments being indicated by the following claims.

Computer programs based on the written description and methods of this specification are within the skill of a software developer. The various programs or program modules can be created using a variety of programming techniques. One or more of such software sections or modules can be integrated into a computer system, non-transitory computer readable media, or existing software.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application. These examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. A hybrid system for scaling tables having differing column types, the system comprising:
   at least one processor configured to:
   maintain a zoomable table having a plurality of columns, at least some of which display differently depending on zoom level;
   store for a first column, a first column template associated with a first zoom range, wherein the first column template is configured to display information in a first format configured to scale within the first zoom range;
   store for the first column, a second column template associated with a second zoom range different from the first zoom range, wherein the second column template is configured to display information in a second format different from the first format, and wherein the second column template is configured to scale within the second zoom range;
   switch from the first column template to the second column template when the first column is scaled to an outer limit of the first zoom range;
   store for a second column, a third column template configured to scale across the first zoom range and the second zoom range;
   enable simultaneous zooming of the first column and the second column such that during simultaneous scaling from the first zoom range to the second zoom range, the display format of the first column changes and the display format of the second column remains unchanged; and
   determine that a new column is similar to the second column, and in response, associate the third column template with the new column.

2. The system of claim 1, wherein the first format includes a display of words in a column and the second format substitutes graphical indicators for the words.

3. The system of claim 1, wherein the first format includes a display of a first volume of information and wherein the second format includes a display of a second volume of information different from the first volume of information.

4. The system of claim 1, wherein the first format is a timeline view and the second format is a calendar view.

5. The system of claim 1, wherein the at least one processor is further configured to receive a request to replace the second column template with the first column template, the first column template being scalable across the first zoom range and the second zoom range.

6. A non-transitory computer readable medium containing instructions that when executed by at least one processor, cause the at least one processor to perform operations for scaling tables having differing column types, the operations comprising:
   maintaining a zoomable table having a plurality of columns, at least some of which display differently depending on zoom level;
   storing for a first column, a first column template associated with a first zoom range, wherein the first column template is configured to display information in a first format configured to scale within the first zoom range;
   storing for the first column, a second column template associated with a second zoom range different from the first zoom range, wherein the second column template is configured to display information in a second format different from the first format, and wherein the second column template is configured to scale within the second zoom range;
   switching from the first column template to the second column template when the first column is scaled to an outer limit of the first zoom range;
   storing for a second column, a third column template configured to scale across the first zoom range and the second zoom range;
   enabling simultaneous zooming of the first column and the second column such that during simultaneous scaling from the first zoom range to the second zoom range, the display format of the first column changes and the display format of the second column remains unchanged; and
   determining that a new column is similar to the second column, and in response, associating the third column template with the new column.

7. The non-transitory computer readable medium of claim 6, wherein the first format includes a display of words in a column and the second format substitutes graphical indicators for the words.

8. The non-transitory computer readable medium of claim 6, wherein the first format includes a display of a first volume of information and wherein the second format includes a display of a second volume of information different from the first volume of information.

9. The non-transitory computer readable medium of claim 6, wherein the first format is a timeline view and the second format is a calendar view.

10. The non-transitory computer readable medium of claim 6, wherein the operations further comprise receiving a request to replace the second column template with the first column template such that for the first column, the first column template being scalable across the first zoom range and the second zoom range.

11. The non-transitory computer readable medium of claim 6, wherein the operations further comprise automatically applying the first column template and the second column template to a second newly added column sharing similarities with at least one preexisting column already associated with the first column template and the second column template.

12. A method for scaling tables having differing column types, the method comprising:
maintaining a zoomable table having a plurality of columns, at least some of which display differently depending on zoom level;
storing for a first column, a first column template associated with a first zoom range, wherein the first column template is configured to display information in a first format configured to scale within the first zoom range;
storing for the first column, a second column template associated with a second zoom range different from the first zoom range, wherein the second column template is configured to display information in a second format different from the first format, and wherein the second column template is configured to scale within the second zoom range;
switching from the first column template to the second column template when the first column is scaled to an outer limit of the first zoom range;
storing for a second column, a third column template configured to scale across the first zoom range and the second zoom range; enabling simultaneous zooming of the first column and the second column such that during simultaneous scaling from the first zoom range to the second zoom range, the display format of the first column changes and the display format of the second column remains unchanged; and
determining that a new column is similar to the second column, and in response, associating the third column template with the new column.

13. The method of claim 12, wherein the first format includes a display of words in a column and the second format substitutes graphical indicators for the words.

14. The method of claim 12, wherein the first format includes a display of a first volume of information and wherein the second format includes a display of a second volume of information different from the first volume of information.

15. The method of claim 12, wherein the first format is a timeline view and the second format is a calendar view.

16. The method of claim 12, further comprising automatically applying the first column template and the second column template to a second newly added column sharing similarities with at least one preexisting column already associated with the first column template and the second column template.

17. A hybrid system for scaling tables having differing column types, the system comprising:
at least one processor configured to:
maintain a zoomable table having a plurality of columns, at least some of which display differently depending on zoom level;
store for a first column, a first column template associated with a first zoom range, wherein the first column template is configured to display information in a first format configured to scale within the first zoom range;
store for the first column, a second column template associated with a second zoom range different from the first zoom range, wherein the second column template is configured to display information in a second format different from the first format, and wherein the second column template is configured to scale within the second zoom range;
switch from the first column template to the second column template when the first column is scaled to an outer limit of the first zoom range;
store for a second column, a third column template configured to scale across the first zoom range and the second zoom range;
enable simultaneous zooming of the first column and the second column such that during simultaneous scaling from the first zoom range to the second zoom range, the display format of the first column changes and the display format of the second column remains unchanged; and
automatically apply the first column template and the second column template to a newly added column sharing similarities with at least one preexisting column already associated with the first column template and the second column template.

18. The system of claim 17, wherein the first format includes a display of words in a column and the second format substitutes graphical indicators for the words.

19. The system of claim 17, wherein the first format includes a display of a first volume of information and wherein the second format includes a display of a second volume of information different from the first volume of information.

20. The system of claim 17, wherein the first format is a timeline view and the second format is a calendar view.

* * * * *